US011981019B2

(12) United States Patent
Brocket et al.

(10) Patent No.: US 11,981,019 B2
(45) Date of Patent: May 14, 2024

(54) TOOL CONTAINER STORAGE SYSTEM

(71) Applicant: BLACK & DECKER INC., New Britain, CT (US)

(72) Inventors: Stephen Brocket, Darlington (GB); Alfred Yan Leung But, Hong Kong (CN); Leo Xiao, Huizhou (CN); Weigang Hao, Zhuhai Guangdong (CN); Marco Lourenco, Baltimore, MD (US); Lauren M. Austin, Owings Mills, MD (US); Yosi Sabbag, Holon (IL)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/993,374

(22) Filed: Nov. 23, 2022

(65) Prior Publication Data

US 2023/0092514 A1 Mar. 23, 2023

Related U.S. Application Data

(63) Continuation of application No. 17/333,325, filed on May 28, 2021, now Pat. No. 11,534,905, which is a (Continued)

(51) Int. Cl.
*B25H 3/02* (2006.01)
*B25H 3/00* (2006.01)
*B65D 21/02* (2006.01)

(52) U.S. Cl.
CPC ............ *B25H 3/021* (2013.01); *B25H 3/003* (2013.01); *B25H 3/02* (2013.01); *B25H 3/028* (2013.01); *B65D 21/02* (2013.01)

(58) Field of Classification Search
CPC . B25H 3/00; B25H 3/003; B25H 3/02; B25H 3/021; B25H 3/028; B25H 3/06; B65D 21/02
(Continued)

(56) References Cited

U.S. PATENT DOCUMENTS 263,561 A 8/1882 Mower
RE13,408 E * 4/1912 Sine .............................. 206/379
(Continued)

FOREIGN PATENT DOCUMENTS

DE 3517308 A1 9/1985
DE 202014105326 U1 11/2014
(Continued)

OTHER PUBLICATIONS

Extended European Search Report, EP 18210190.7, May 3, 2019, 7 pages, EPO.

*Primary Examiner* — Bryon P Gehman
(74) *Attorney, Agent, or Firm* — Scott B. Markow

(57) ABSTRACT

A tool container system includes a first tool container and a second tool container. The first tool container has a first base, a first cover pivotably attached to the first base by a first hinge portion, a first base locking member coupled to the base, a first cover locking member coupled to the first cover, and a first latch coupled to the first base and moveable between a first unlocked position in which the first cover is movable relative to the first base between a closed position and an open position, and a first locked position in which the first latch engages the first cover locking member and the first cover is locked to the first base in the closed position. The second tool container is stackable on the first cover of the first tool container and having a second locking member. When the second tool container is stacked on the first tool container, the second tool container is lockable to the first tool container when the first latch is moved to the first locked position to engage both the first cover locking member and the second locking member.

20 Claims, 47 Drawing Sheets

Related U.S. Application Data continuation of application No. 16/791,153, filed on Feb. 14, 2020, now abandoned, which is a continuation of application No. 16/208,637, filed on Dec. 4, 2018, now Pat. No. 10,603,783, which is a continuation-in-part of application No. 29/628,269, filed on Dec. 4, 2017, now Pat. No. Des. 882,952, and a continuation-in-part of application No. 29/628,267, filed on Dec. 4, 2017, now Pat. No. Des. 882,950, and a continuation-in-part of application No. 29/628,268, filed on Dec. 4, 2017, now Pat. No. Des. 882,951.

(60) Provisional application No. 62/594,414, filed on Dec. 4, 2017.

(58) Field of Classification Search
USPC ........................................ 206/372, 373, 379
See application file for complete search history.

(56) References Cited

U.S. PATENT DOCUMENTS

| | | | | |
|---|---|---|---|---|
| 4,619,363 | A | 10/1986 | Wolfseder | |
| 4,643,494 | A | 2/1987 | Marleau | |
| 4,863,222 | A | 9/1989 | Posso | |
| 5,570,784 | A | 11/1996 | Sidabras et al. | |
| 5,617,953 | A | 4/1997 | Cope | |
| 5,676,254 | A * | 10/1997 | Cheng | B25H 3/003 206/751 |
| 5,803,254 | A | 9/1998 | Vasudeva | |
| 5,887,715 | A | 3/1999 | Vasudeva | |
| 5,890,613 | A | 4/1999 | Williams | |
| 5,934,466 | A | 8/1999 | Loeffler | |
| 6,082,539 | A | 7/2000 | Lee | |
| 6,271,320 | B1 | 8/2001 | Keller et al. | |
| 6,349,827 | B1 | 2/2002 | Feder | |
| 6,371,320 | B2 | 4/2002 | Sagol | |
| 6,543,613 | B2 | 4/2003 | Belanger | |
| D477,714 | S | 7/2003 | Cunningham et al. | |
| D481,868 | S | 11/2003 | Cunningham et al. | |
| 6,868,967 | B2 | 3/2005 | Lam | |
| 6,889,838 | B2 | 5/2005 | Meier et al. | |
| D516,808 | S | 3/2006 | Brunson et al. | |
| D527,523 | S | 9/2006 | Cornwell et al. | |
| D528,793 | S | 9/2006 | Cornwell et al. | |
| D530,092 | S | 10/2006 | Roesler | |
| 7,219,969 | B2 | 5/2007 | Bezzubov | |
| 7,237,673 | B2 | 7/2007 | Wikle et al. | |
| D552,352 | S | 10/2007 | Lin | |
| 7,322,470 | B2 | 1/2008 | Brunson | |
| D563,102 | S | 3/2008 | Cornwell et al. | |
| D563,670 | S | 3/2008 | Cornwell et al. | |
| D563,671 | S | 3/2008 | Cornwell et al. | |
| D563,672 | S | 3/2008 | Cornwell et al. | |
| D569,616 | S | 5/2008 | Lin | |
| D569,617 | S | 5/2008 | Lin | |
| D572,479 | S | 7/2008 | Buck et al. | |
| D578,759 | S | 10/2008 | Grenier et al. | |
| D599,112 | S | 9/2009 | Wenchel et al. | |
| D600,015 | S | 9/2009 | Wenchel et al. | |
| 7,661,390 | B2 | 2/2010 | Mortensen | |
| 7,690,856 | B2 | 4/2010 | Mortensen | |
| D645,663 | S | 9/2011 | Henley et al. | |
| D648,531 | S | 11/2011 | Finnigan et al. | |
| 8,322,354 | B2 | 12/2012 | Parker | |
| 8,336,708 | B2 | 12/2012 | Potterfield et al. | |
| 8,459,495 | B2 | 6/2013 | Koenig et al. | |
| 8,505,729 | B2 | 8/2013 | Sosnovsky et al. | |
| 8,602,217 | B2 | 8/2013 | Sosnovsky et al. | |
| 8,561,769 | B2 | 10/2013 | Andochick | |
| 8,590,704 | B2 | 11/2013 | Koenig et al. | |
| 8,714,355 | B2 | 5/2014 | Huang | |
| 8,875,888 | B2 | 11/2014 | Koenig et al. | |
| 8,979,100 | B2 | 3/2015 | Bensman et al. | |
| D733,429 | S | 7/2015 | Grenier et al. | |
| D738,106 | S | 9/2015 | Shitrit | |
| 9,375,835 | B1 | 6/2016 | Lin | |
| 9,469,024 | B2 | 10/2016 | Bensman et al. | |
| D773,184 | S | 12/2016 | Ko | |
| D781,584 | S | 3/2017 | Kinskey | |
| 9,701,008 | B2 | 7/2017 | Cho | |
| 9,725,209 | B1 | 8/2017 | Ben-Gigi | |
| D805,775 | S | 12/2017 | Tsai | |
| RE47,022 | E | 9/2018 | Sosnovsky et al. | |
| D858,103 | S | 9/2019 | Seibert et al. | |
| D872,479 | S | 1/2020 | Seibert et al. | |
| D873,019 | S | 1/2020 | Seibert | |
| D874,143 | S | 2/2020 | Seibert | |
| D874,823 | S | 2/2020 | Christen et al. | |
| 10,583,962 | B2 | 3/2020 | Brunner et al. | |
| 10,603,783 | B2 | 3/2020 | Brocket et al. | |
| D882,950 | S | 5/2020 | Austin et al. | |
| D882,951 | S | 5/2020 | Austin et al. | |
| D882,952 | S | 5/2020 | Austin et al. | |
| 10,703,534 | B2 | 7/2020 | Brunner et al. | |
| 10,710,235 | B1 * | 7/2020 | Cantlon | B25H 3/025 |
| 10,722,012 | B2 | 7/2020 | Kraus | |
| 10,981,696 | B2 | 4/2021 | Brunner et al. | |
| 11,008,136 | B2 | 5/2021 | Brunner et al. | |
| 11,230,410 | B2 | 1/2022 | Brunner et al. | |
| 2002/0017947 | A1 | 2/2002 | Ooishi et al. | |
| 2002/0179473 | A1 | 12/2002 | Chao | |
| 2003/0094392 | A1 | 5/2003 | Meier et al. | |
| 2004/0188322 | A1 | 9/2004 | Chen | |
| 2006/0249412 | A1 * | 11/2006 | Hernandez | B25H 3/02 206/379 |
| 2008/0067095 | A1 * | 3/2008 | Mueller | B25H 3/023 206/372 |
| 2008/0210593 | A1 * | 9/2008 | Cornwell | B25H 3/003 206/234 |
| 2009/0145786 | A1 | 6/2009 | Panosian et al. | |
| 2011/0139665 | A1 | 6/2011 | Madsen | |
| 2011/0155613 | A1 | 6/2011 | Koenig et al. | |
| 2012/0152944 | A1 | 6/2012 | Vilkomirski et al. | |
| 2015/0353231 | A1 | 12/2015 | Brunner | |
| 2016/0052125 | A1 * | 2/2016 | Steele | B65D 25/205 206/349 |
| 2016/0075010 | A1 | 3/2016 | Gonzales et al. | |
| 2016/0194115 | A1 | 7/2016 | Stuart et al. | |
| 2017/0259422 | A1 | 9/2017 | Takeyama et al. | |
| 2019/0308772 | A1 | 10/2019 | Gonitianer et al. | |
| 2020/0180140 | A1 | 6/2020 | Brocket et al. | |

FOREIGN PATENT DOCUMENTS

| | | | |
|---|---|---|---|
| DE | 202016103774 | U1 | 10/2017 |
| EP | 1736416 | A2 | 12/2006 |

* cited by examiner

TOOL CONTAINER STORAGE SYSTEM

CROSS REFERENCE TO RELATED APPLICATIONS

This application claims priority under 35 U.S.C. § 120, as a continuation of U.S. patent application Ser. No. 17/333,325, filed May 28, 2021, now pending, which is a continuation of U.S. patent application Ser. No. 16/791,153, filed Feb. 14, 2020, now abandoned, which is a continuation of U.S. patent application Ser. No. 16/208,637, filed Dec. 4, 2018, now U.S. Pat. No. 10,603,783, which claims priority, under 35 U.S.C. § 119(e), to U.S. Provisional Application No. 62/594,414, filed Dec. 4, 2017, and which claims priority, under 35 U.S.C. § 120, as a continuation-in-part of U.S. Design patent application Ser. No. 29/628,267, filed Dec. 4, 2017, titled "Tool Bit Container," of U.S. Design patent application Ser. No. 29/628,268, filed Dec. 4, 2017, titled "Tool Bit Container," and of U.S. Design patent application Ser. No. 29/628,269, filed Dec. 4, 2017, titled "Tool Bit Container." Each of the aforementioned patent applications is incorporated herein by reference.

TECHNICAL FIELD

This application relates to tool containers and a tool container system for holding tools and tool bits, such as power tool accessories.

BACKGROUND

This section provides background information related to the present disclosure which is not necessarily prior art. Users typically have multiple tool accessory containers having varying shapes and sizes, which can make organization of the containers difficult and can make the containers easy to misplace.

SUMMARY

In an aspect, a tool container system includes a first tool container and a second tool container. The first tool container has a first base, a first cover pivotably attached to the first base by a first hinge portion, a first base locking member coupled to the base, a first cover locking member coupled to the first cover, and a first latch coupled to the first base and moveable between a first unlocked position in which the first cover is movable relative to the first base between a closed position and an open position, and a first locked position in which the first latch engages the first cover locking member and the first cover is locked to the first base in the closed position. The second tool container is stackable on the first cover of the first tool container and having a second locking member. When the second tool container is stacked on the first tool container, the second tool container is lockable to the first tool container when the first latch is moved to the first locked position to engage both the first cover locking member and the second locking member.

Implementations of this aspect may include one or more of the following features. The first latch may be pivotable between the first unlocked position and the first locked position. The first cover locking member may include a first cover projection and the first latch may have a first recess configured to engage the first cover projection when the first latch is in the first locked position. The second locking member may include a second projection and the first latch may have a second recess configured to engage the second projection when the second tool container is stacked on the first tool container and the first latch is in the first locked position. One of the first cover portion and the second base portion may include a first lip and the other of the first cover portion and the second tool container may include a second lip that is configured to engage the first lip when the second tool container is stacked on the first tool container. The first cover portion may have at least one depression and the second base portion may have at least one foot configured to engage the at least one depression when the second tool container is stacked on the first tool container. The first tool container may have a first length and a first width that are the same as a second length and a second width of the second tool container. The first tool container may have a first length and a first width that each are greater than a second length and second width of the second tool container.

The second tool container may include a second base, a second cover pivotably attached to the second base by a second hinge portion, and a second latch coupled to the second base and moveable between a second unlocked position in which the second cover is movable relative to the second base between a closed position and an open position, and a second locked position in which the second cover is locked to the second base in the closed position, while the second tool container is locked to the first tool container by the first latch.

A third tool container may be stackable on the first tool container together with the second tool container, and may have a third locking member. The first tool container may further include a second base locking member coupled to the first base, a second cover locking member coupled to the first cover, and a second latch coupled to the first base and moveable between a second unlocked position and a second locked position, such that when the third tool container is stacked on the first tool container, the third tool container is lockable to the first tool container when the second latch is moved to the first locked position to engage both the first cover locking member and the third locking member. The second tool container may have a second base and a second cover pivotably attached to the second base by a second hinge, and the third tool container may have a third base and a third cover pivotably attached to the third base by a third hinge. The second tool container and the third tool container may be both stacked on the first tool container. The second tool container and the third tool container may be spaced apart so that the second cover and the third cover can be opened also.

In another aspect, a tool container includes a base, a cover pivotably attached to the base by a hinge portion, a cover locking member coupled to the cover, and a latch coupled to the first base and moveable between an unlocked position in which the cover is movable relative to the base between a closed position and an open position, and a locked position in which the latch engages the cover locking member and the cover is locked to the base in the closed position. The cover is configured to receive a second tool container on top of the cover, such that the second tool container is lockable to the cover when the latch is moved to the locked position to engage both the cover locking member and a second locking member on the second tool container.

Implementations of this aspect may include one or more of the following features. The latch may be pivotable between the unlocked position and the locked position. The cover locking member may include a cover projection and the latch may have a first recess configured to engage the cover projection when the latch is in the locked position. The latch may have a second recess configured to engage the second locking member when the second tool container is received on the cover and the latch is in the locked position. The cover may include a first lip configured to engage a second lip on the second tool container when the second tool container is received on the cover. The cover may have at least one depression configured to be engaged by at least one foot on the second tool container when the second tool container is received on the cover. A second base locking member may be coupled to the base, a second cover locking member may be coupled to the cover, and a second latch may be coupled to the base and moveable between a second unlocked position and a second locked position. The cover may be configured to receive a third tool container on top of the cover, such that the third tool container is lockable to the cover when the second latch is moved to the locked position to engage both the second cover locking member and a third locking member on the third tool container. A base locking member may be coupled to the base. The base may be stackable on a third tool container having a third latch that can engage the base locking member to lock the base on the third tool container.

Advantages may include one or more of the following. The tool container system enables a variety of sizes and configurations of containers to be stacked and releasably locked to one another in a wide variety of arrangements. These and other advantages and features will be apparent from the description, the drawings, and the claims.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 15:
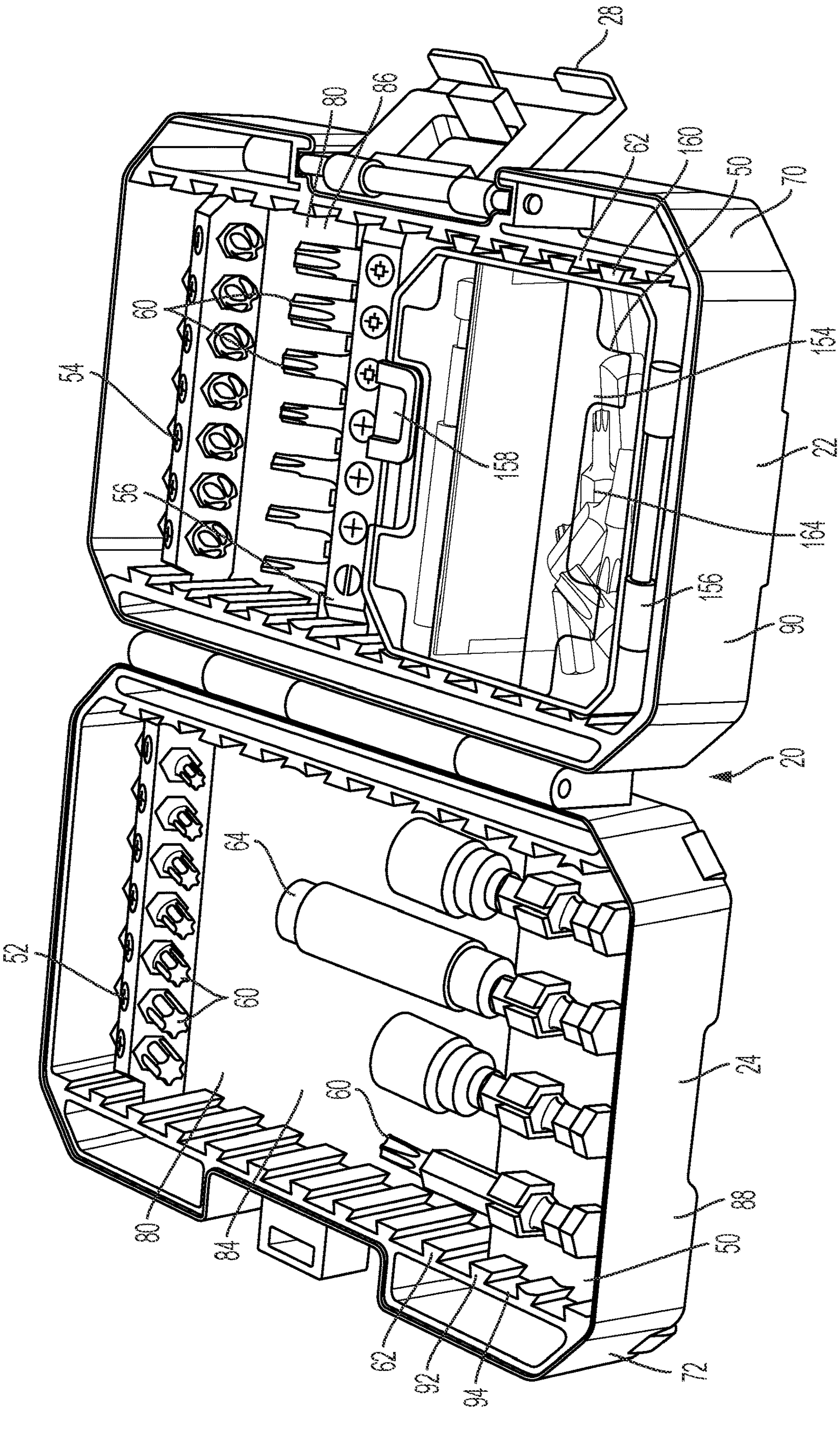
FIG. 15 is a top perspective view of an embodiment of the bulk storage container of FIG. 14 inside one of the tool containers of FIG. 1.

Referring to FIGS. 1-5B and 15, in one embodiment, a tool container system 10 includes one or more tool containers 20 having a relatively small size. Each container 20 includes a base 22 and a cover 24 that are pivotably connected together about a hinge 26 moveable between an open position (as shown in FIG. 15) and a closed position (as shown in e.g., FIGS. 1 and 2). As shown in FIG. 15, the interior of each base 22 and/or cover 24 may include recessed cavities 80 and 82, each defined by base walls 84 and 86 and peripheral walls 88 and 90, respectively. The walls 88, 90 may each define cooperating interlocking elements 62, which may include a plurality of alternating dovetail tenons 92 and corresponding recesses 94. The dovetail shaped tenons 92 and recesses 94 are adapted to receive corresponding dovetail recesses 96 and tenons 98 on the ends of tool bit retaining inserts 50, 52, 54, and 56, each configured to removably hold a plurality of tool bits 60 (e.g., screwdriving bits and/or drill bits) and/or other power tool or hand tool accessories 64 (e.g., tool bit holders). This enables the inserts 50, 52, 54, 56 to be securely, but removably, positioned at multiple locations in the interior of the base 22 and cover 24 so that a myriad of tool bit sizes, types, and configurations may be held in the container 20. The design of the interior of the base 22 and cover 24 and the inserts 50, 52, 54, 56 is similar to the corresponding designs shown in U.S. Pat. No. 6,213,296, which is hereby incorporated by reference.

Figure 1:
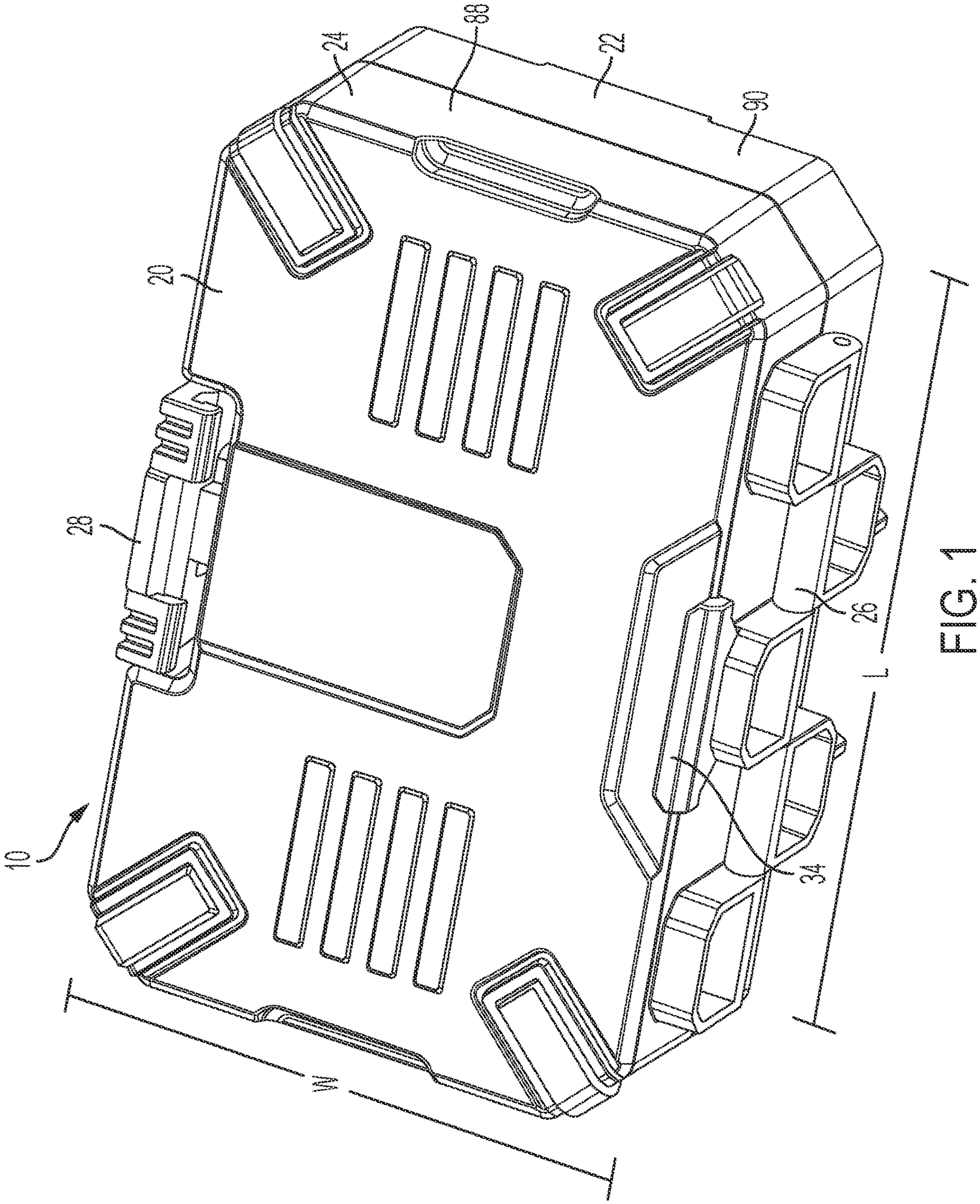
FIG. 1 is a top perspective view of an embodiment of a tool container having a relatively small size.
Figure 2:
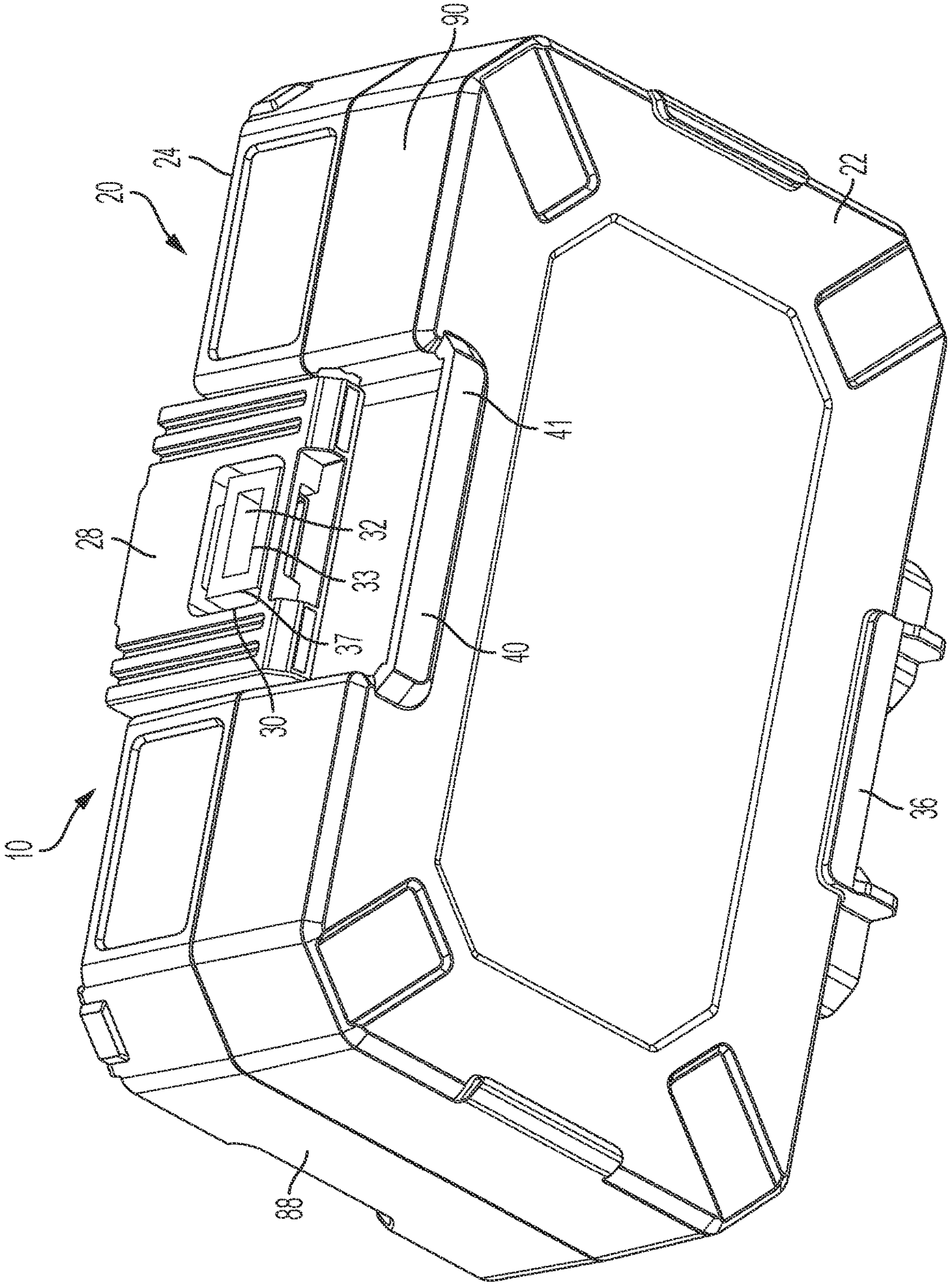
FIG. 2 is a bottom perspective view of the tool container of FIG. 1.
Figure 3:
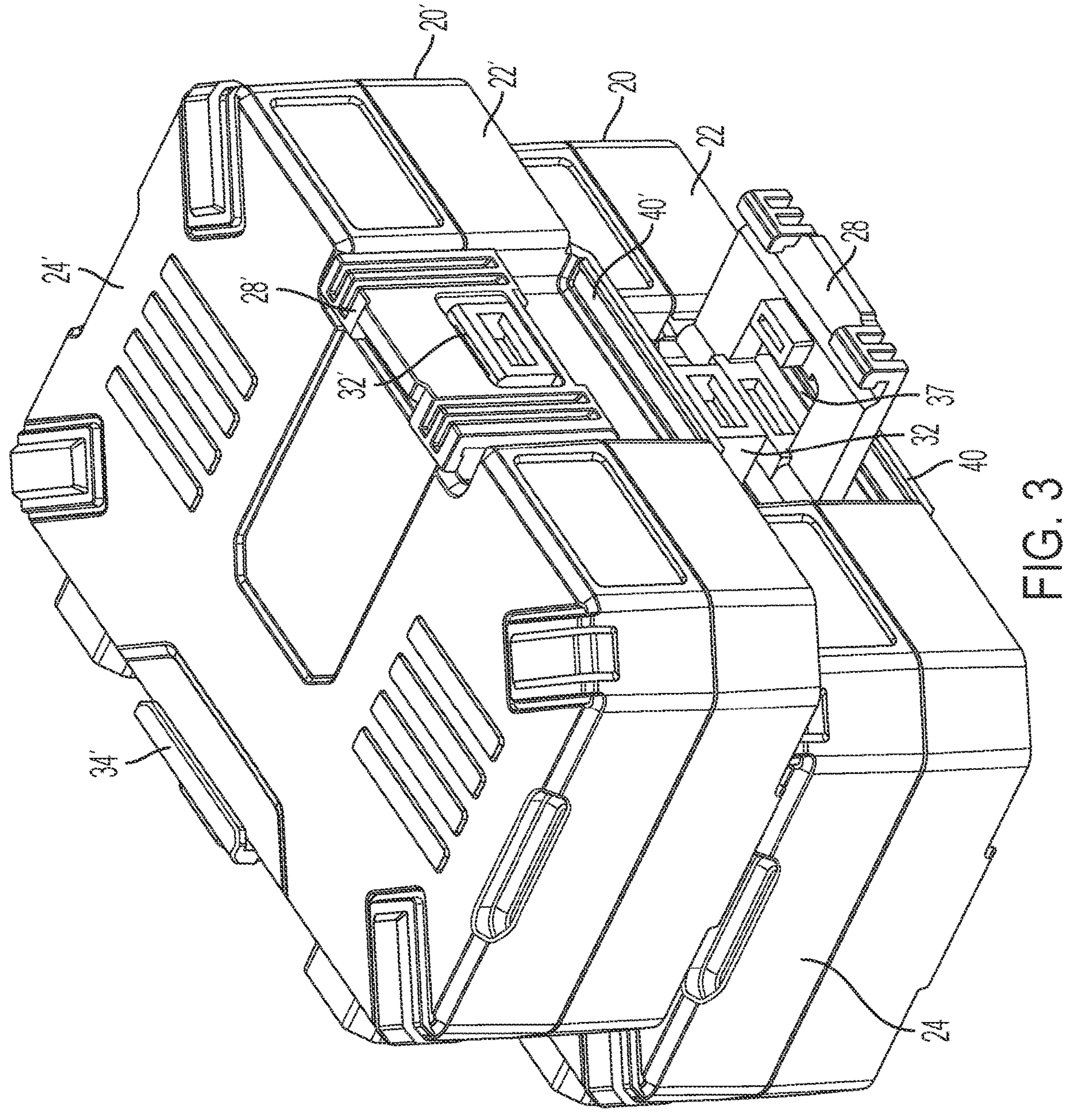
FIG. 3 is a top perspective view of one tool container of FIG. 1 stacked on another tool container of FIG. 1.
Figure 4:
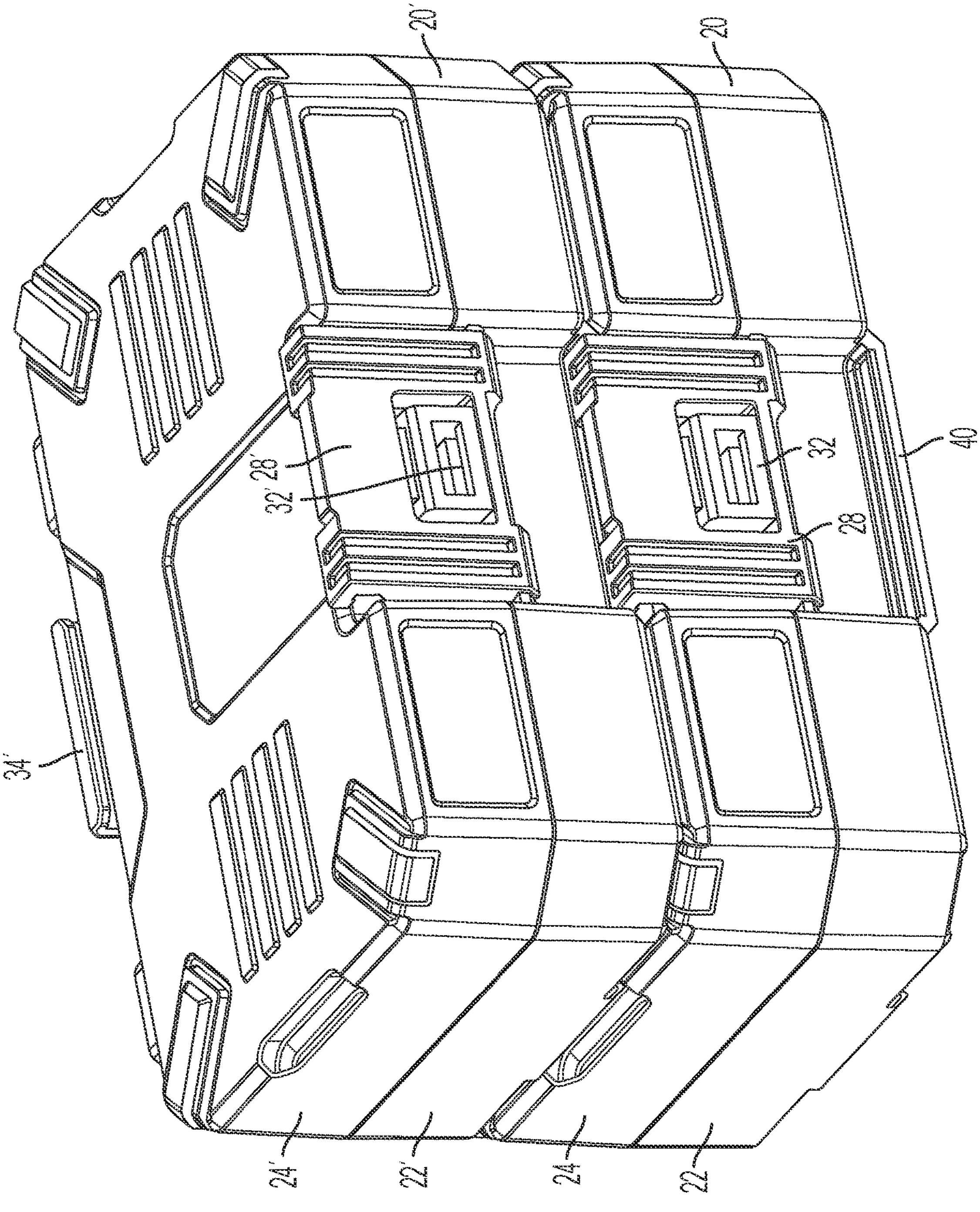
FIG. 4 is a top perspective view of the tool containers of FIG. 3, stacked and locked together.

As shown in FIGS. 1-2 and 5A-5B, an exterior of the base 22 and the cover 24 each has a generally rectangular shape with chamfered corners 70, 72 defined by the peripheral walls 90, and 88. The base 22 and the cover 24 each have a length L and a width W. An exterior of one of the base 22 and the cover 24 includes a first locking member 32 (e.g., a rectangular locking projection 33) and the other of the base 22 and the cover 24 includes a second locking member 40 (e.g., a downward projection 41). The exterior of one of the base 22 and the cover 24 also includes a latch 28 configured to lock the cover 24 and the base 22 together in the closed position. The latch 28 can be coupled to either the base 22 or the cover 24 and movable (e.g., pivotably) between an unlocked position (as shown in FIG. 5) and a locked position (as shown in FIG. 4). The latch 28 includes a first locking latch portion 30 (e.g., a rectangular aperture or recess 37) that is engageable with a first locking member 32 on the other of the base 22 or cover 24 when the latch 28 is in the locked position.

As shown in FIGS. 3-5B, a second container 20' having the same configuration as the first container 20 may be stacked on and removably locked to the first container 20 by the latch 28 of the first container 20. The latch 28 includes a second locking latch portion 31 (e.g., a rectangular locking projection 33 and a lateral groove or recess 35 defined below the locking projection 33) that is engageable with the second locking member 40' on a second container 20' to lock the two containers 20, 20' together, as described further below. As other examples, the first and second locking members 32, 40 on the base 22 and cover 24 and the first and second locking latch portions 30, 31 on the latch 28 can each comprise a variety of other configurations of protrusions, recesses, or both.

The first latch portion 30 and the second latch portion 31 are fixedly positioned relative to each other on the latch 28. In other words, the latch 28 does not include a hinge or similar feature to provide movement of the first latch portion 30 and the second latch portion 31 relative to each other. Similarly, both the first latch portion 30 and the second latch portion 31 of a latch 20 of a container are in the same locked position relative to each other regardless of whether the latch 28 is operating to couple another container to the first container or not. Alternatively, the first latch portion 30 and second latch portion 31 may be moveable (e.g., pivotable) relative to one another (e.g., by a hinge or another feature).

Figure 5A:
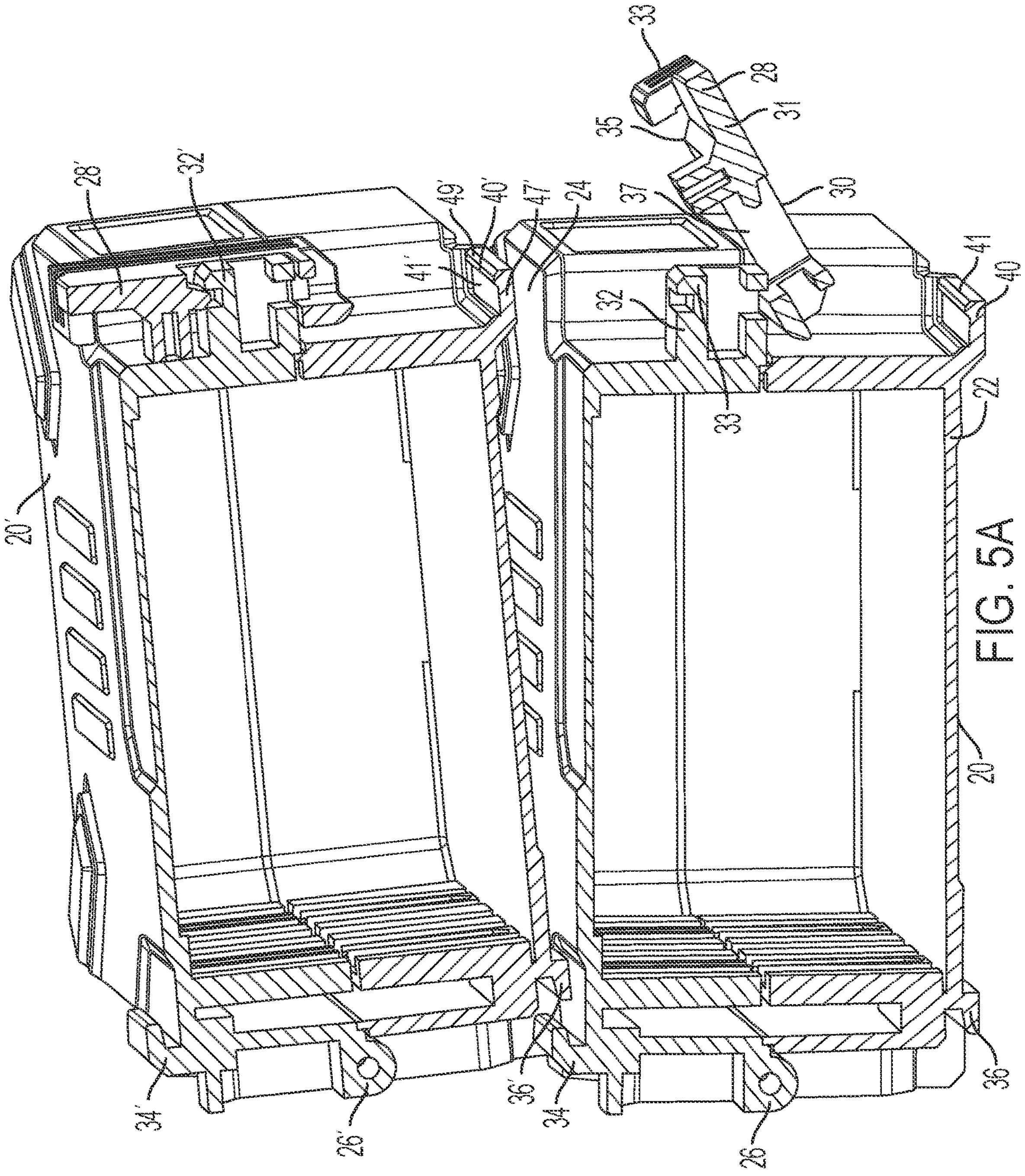
FIG. 5A is a cross-sectional view of the tool containers of FIG. 3, stacked and unlocked.
Figure 5B:
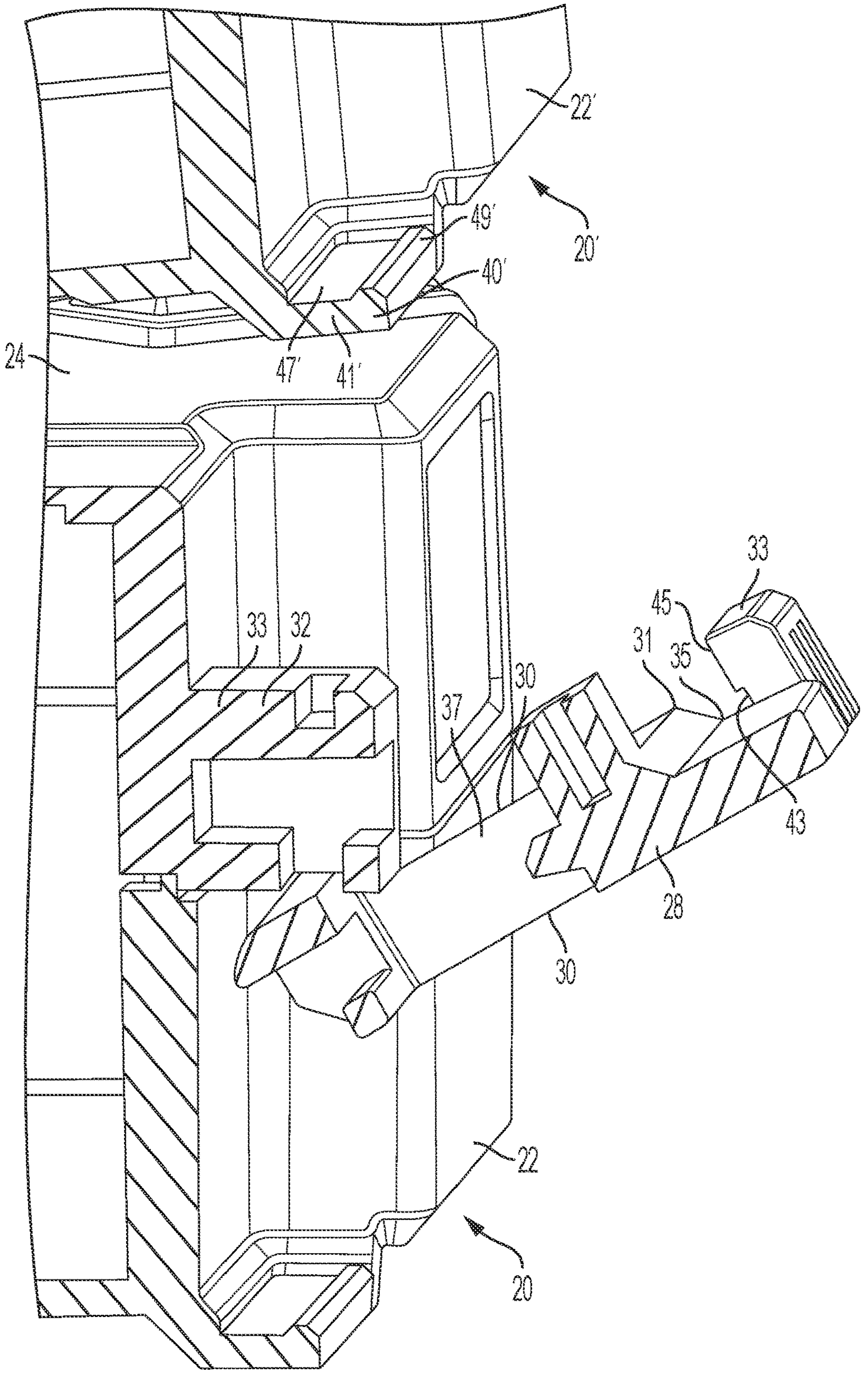
FIG. 5B is a close-up view showing a latch of the tool container of FIG. 1.

As shown in more detail in FIG. 5B, the downward projection 41' of the second locking member 40' of the second container 20' may include a rectangular projection 47' and an upward projecting lip 49'. The second locking latch portion 31 of the latch 28 may include a lateral projection 45 configured to engage a top surface of the rectangular projection 47 and a lateral groove or recess 43 configured to be engaged by the upward projecting lip 49. Movement of the latch 28 into the locked position operates to also lock the cover 24 and the base 22 of one container 20 in the closed position via engagement of the first locking latch portion 30 and the first locking member 32 and also lock an appropriately positioned second container 20' to the first container 20 via engagement of the second latch portion 38 of the latch 28 and the second locking member 40' of the second container 20'. Similarly, the latch 28 can also disengage the second container 20' from the first container 20 and the cover 24 and the base 22 of the first container 20. Thus, only a single movement of the latch 28 is required to both lock and unlock the containers 20, 20' and to couple or uncouple containers together. Also, the latch 28' of the second container 20' may be unlocked while the second container 20' is locked to the first container 20, enabling the cover 24' of the second container 20' to be opened while the second container 20' is locked to the first container 20.

Each of the containers 20, 20' may additionally include at least one first coupling interlocking member 34, 34' (e.g., a first lip) on an opposite side of the container from the latch 28, 28'. As examples, the latch 28, 28' can be positioned at the front of the container 20, 20' and the first coupling interlocking member 34, 34' can be positioned at a rear (or hinge side) of the container 20, 20' opposite the latch 28, 28'. Each of the containers 20, 20' may also include a second, cooperating coupling interlocking member 36, 36' (e.g., a second lip) that is engageable with one of the corresponding first coupling interlocking members 34, 34' of the other container 20', 20 to interlock the first container 20 to the second container 20'.

In the illustrated example, the first coupling interlocking members 34, 34' are provided at a top of the cover 24, 24' and the second coupling interlocking member(s) 36, 36' are provided at a bottom of the base 22, 22'. Alternatively, the first coupling interlocking members 34, 34' may be provided on the base 22, 22', and the second coupling interlocking members 36, 36' may be provided on the cover 24, 24'. The coupling interlocking members 34, 34' and 36, 36' may extend substantially entirely or partially along an edge of the base 22, 22' and/or cover 24, 24'. The first coupling interlocking member 34 of the first container 20 may engage the second coupling interlocking member 36' of the second container 20' prior to the latch 28 of the first container 20 being moved to the locked position to engage the second locking member 40' of the second container 20' to help align and lock the containers 20, 20' to one another.

In alternative embodiments, each container may include more than one latch and some of the latches on a container may not include the second locking portion, such that these latches only serve to lock the base to the cover but not one container to the other. In other alternative embodiments, each container may include more than one latch and some of the latches on a container may not include the first locking portion, such that these latches only serve to lock one container to the other, but not to lock the base to the cover. In other examples, the coupling interlocking members 34, 36 and the second latch portion 38 and coupling latch member 40 can each comprise a variety of configurations of protrusions, recesses, or both. In addition, a protrusion of the coupling interlocking member 36 and a protrusion of the opposing coupling member 40 of an individual container can comprise lips that protrude in opposite directions from each other.

Referring to FIGS. 6-9, in another embodiment, the tool container system 10 may further include one or more tool containers 120, 120', each having a relatively medium size as compared to the tool containers 20, 20'. Each container 120, 120' includes a base 122, 122' and a cover 124, 124' that are pivotably connected together about a hinge 126, 126' moveable between an open position and a closed position. An exterior of the base 122, 122' and the cover 124, 124' each has a generally rectangular shape with chamfered corners 170, 170', 172, 172' defined by peripheral walls 190, 190' and 188, 188'. The containers 120, 120' each have a length L1 and a width W1 that are greater than the length L and width W of the containers 20, 20'. Although not shown, the interior of the bases 122, 122' and covers 124, 124' of the tool containers 120, 120' each may comprise recessed cavities 80 and 82, each defined by base walls 184, 184', 186, 186' and peripheral walls 188, 188', 190, 190'. The peripheral walls 188, 188', 190, 190' each may each define cooperating interlocking elements (not shown) similar to interlocking elements 62, which may include a plurality of alternating dovetail tenons and recesses. The dovetail shaped tenons and recesses are adapted to receive corresponding dovetail recesses and tenons on the ends of tool bit retaining inserts (inserts) similar to tool bit retaining inserts 50, 52, 54, and 56. The design of the interior of the bases 122, 122' and covers 124, 124' and the inserts may be similar to corresponding designs shown in U.S. Pat. No. 6,213,296, which is hereby incorporated by reference.

Figure 7:
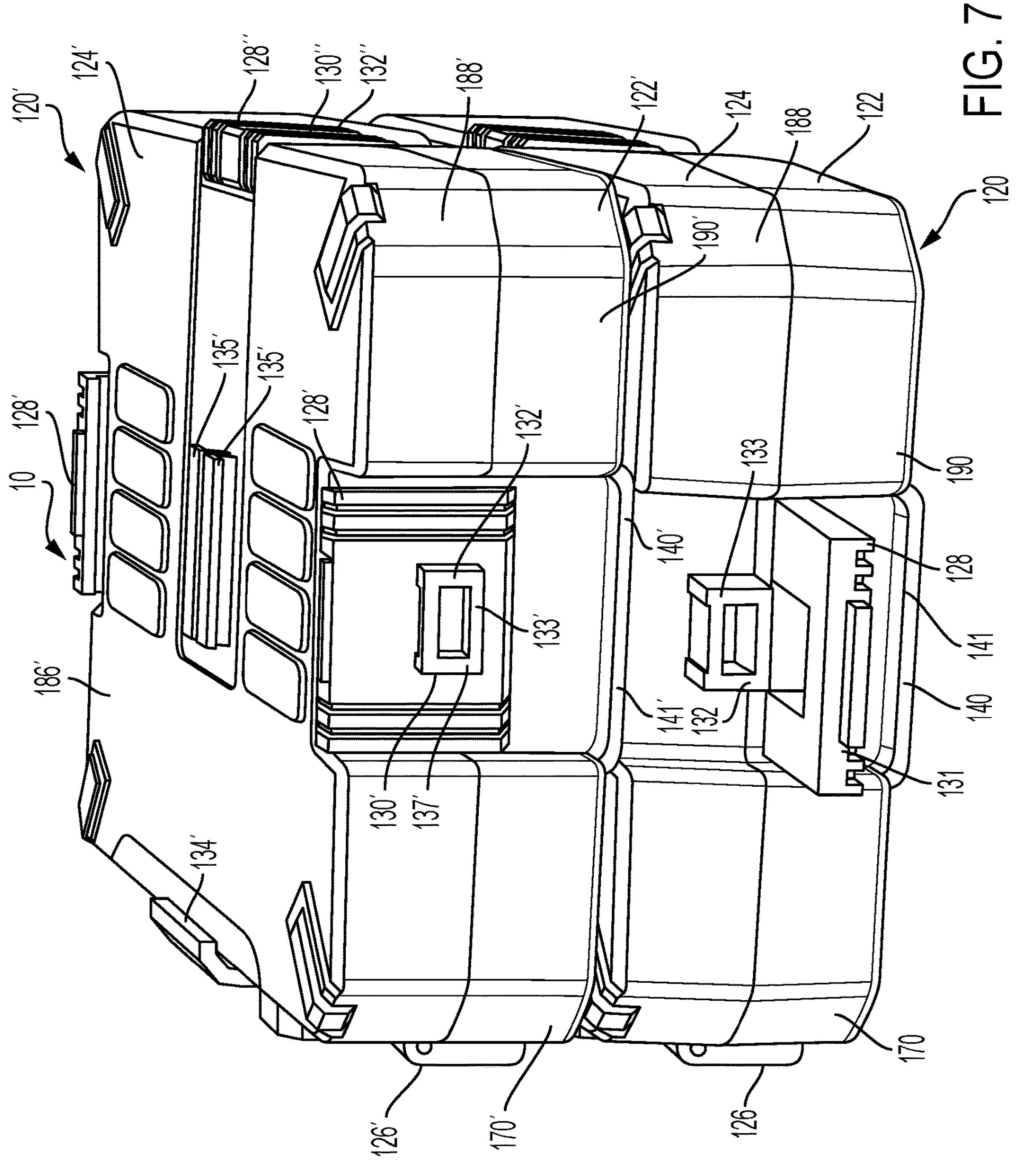
FIG. 7 is a side perspective view of the tool containers of FIG. 6, stacked and unlocked.
Figure 8:
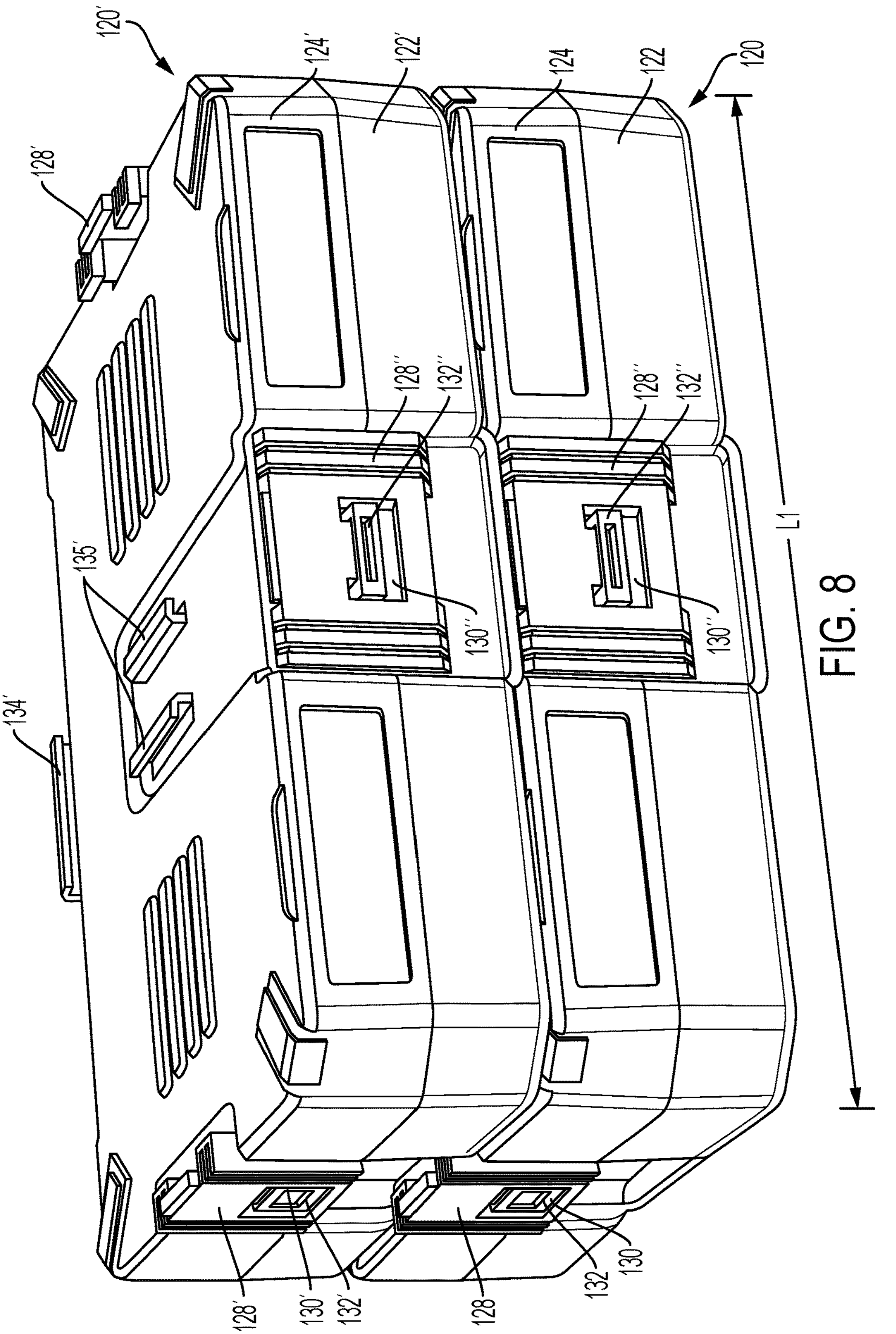
FIG. 8 is a front perspective view of the tool containers of FIG. 6, stacked and locked together.
Figure 9:
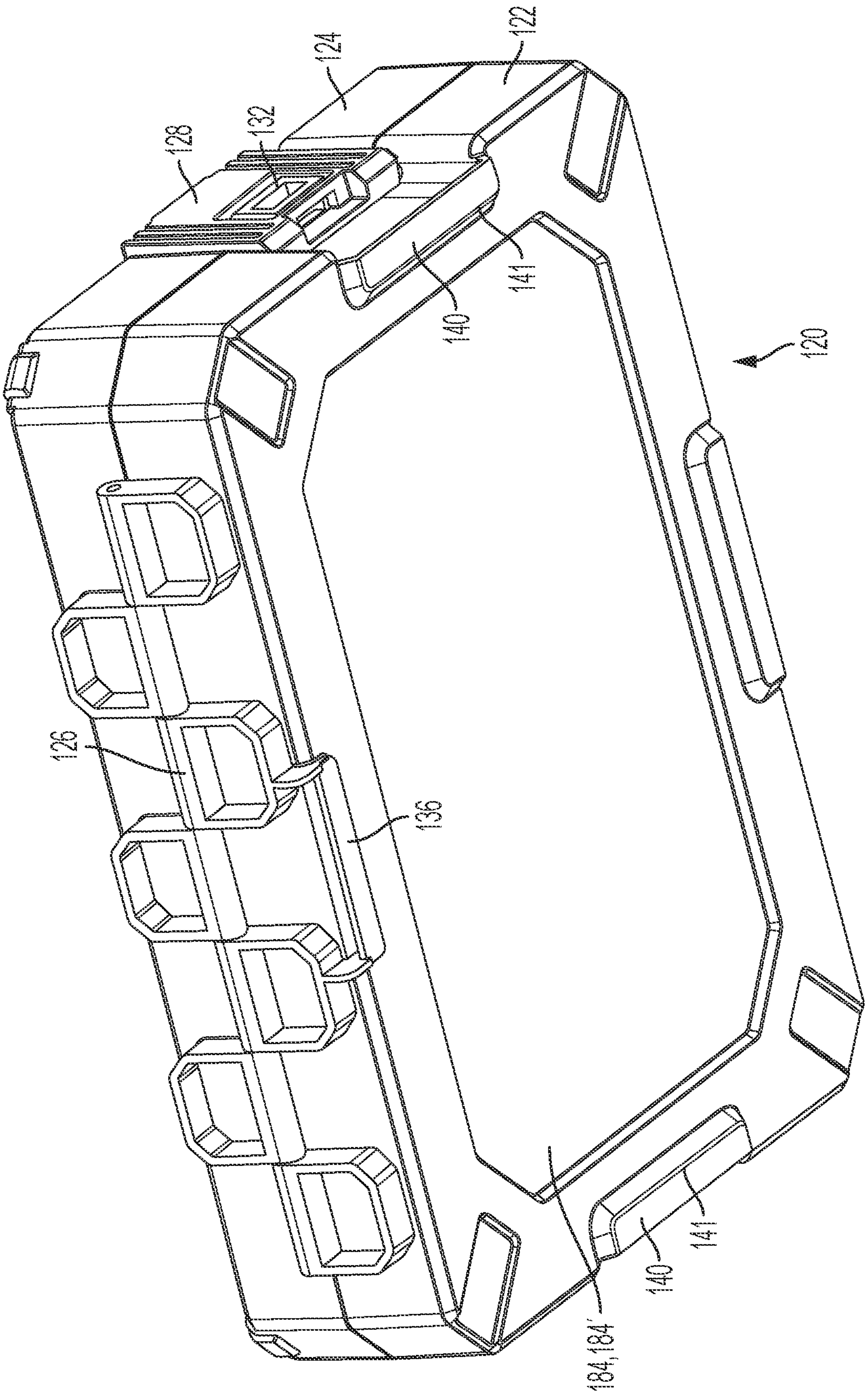
FIG. 9 is a bottom perspective view of one of the tool containers of FIG. 6.

For each case 120, 120', an exterior of the base 122, 122' or the cover 124, 124' includes two first locking members 132, 132' (e.g., rectangular locking projections 133, 133') and the other of the base 122, 122' and the cover 124, 124' includes two second locking members 140, 140' (e.g., downward projections 141, 141'), similar to the locking members 32, 40 on the container 20. The exterior of one of the base 122, 122' and the cover 124, 124' also includes two latches 128, 128' (similar to latch 28) configured to lock the cover 124, 124' and the base 122, 122' together in the closed position. The latches 128, 128' can be coupled to either the base 122, 122' or the cover 124, 124' and movable (e.g., pivotably) between an unlocked position (as shown in FIG. 7) and a locked position (as shown in FIG. 8). The latches 128, 128' each include a first locking latch portion 130, 130' (e.g., a rectangular aperture or recess 137, 137'), similar to first locking latch portion 30, that is engageable with a first locking member 132, 132' on the other of the base 122, 122' or cover 124, 124' when the latch 128 is in the locked position, in a similar manner to latch 28.

The second container 120' may be stacked on and removably locked to the first container 120 by the latches 128 of the first container 120 in a similar manner to the containers 20' and 20. Similar to latch 28, each latch 128 includes a second locking latch portion 131 (similar to locking latch portion 31) that is engageable with the second locking member 140' on the second container 120' to lock the two containers 120, 120' together. As other examples, the first and second locking members 132, 140 on the base 122 and cover 124 and the first and second locking latch portions 130, 131 on the latches 128 can each comprise a variety of other configurations of protrusions, recesses, or both.

The containers 20, 20' may each also include a third latch 128" having a third locking latch portion 130" (similar to locking latch portions 130, 130') coupled to one of the base 122, 122' and the cover 124, 124' and a third locking member 132" (similar to locking members 132, 132') coupled to the other of the base 122, 122' and the cover 124, 124'. Each latch 128" is moveable between an unlocked position and a locked position in which the first locking latch portion 130" engages the third locking member 132" to lock the base 122, 122' and the cover 124, 124' in the closed position. The third latch 128" differs from the latches 128, 128' in that they do not have second locking latch portions 131, 131' and are not used to lock the tool containers 120, 120' together.

Each of the containers 120, 120' may optionally include a first coupling interlocking member 134, 134' (e.g., a first lip) positioned at a rear (or hinge side) of the container 120, 120' opposite the latch 128, 128'. Each of the containers 120, 120' may also include a second, cooperating coupling interlocking member 136, 136' (e.g., a second lip) that is engageable with one of the corresponding first coupling interlocking member 134, 134' of another one of the medium sized containers 120, 120' to interlock one container 120 to another container 120'. In the illustrated example, the first coupling interlocking members 134, 134' are provided at a top of the cover 124, 124' and the second coupling interlocking member(s) 136, 136' are provided at a bottom of the base 122, 122'. The coupling interlocking members 134, 134' and 136, 136' may extend substantially entirely or partially along an edge of the base 122, 122' and/or cover 124, 124'. The first coupling interlocking member 134 of the first container 120 may engage the second coupling interlocking member 136' of the second container 120' prior to the latches 128 of the first container 120 being moved to the locked position to help align and lock the containers 120, 120' to one another. In other examples, the coupling interlocking members 134, 134', 136, 136' and the second latch portions 138, 138' and coupling latch members 140, 140 can each comprise a variety of configurations of protrusions, recesses, or both. In addition, a protrusion of the coupling interlocking members 136, 136' and a protrusion of the opposing coupling members 140, 140' of an individual container can comprise lips that protrude in opposite directions from each other.

Referring also the FIGS. 10-14, the system 10 may further include two or more of the medium sized containers 120 stacked on one another, and two or more of the small size containers 20 stacked on one of the medium sized containers. Advantageously, the length L of one of the small sized containers 20 is approximately the same as the width W1 of one of the medium sized containers 120. The width W of one of the small size containers 20 is approximately half or somewhat less than half of the length L1 of one of the medium size containers 120. This enables two of the small size containers to be stacked on one of the medium size containers 20, with the length L of the small size containers 20 parallel to the width W1 of the medium size container 120. The side latches 128 of one of the medium sized containers 120 can engage the second locking member 140 of each of the small sized containers 20 in the same manner as latch 28, while at the same time locking the cover 124 of the medium size container 120 in the closed position.

To further facilitate alignment and retention of the small sized containers 20 on the medium sized container 120, the medium container 120 may additionally include two or more third coupling interlocking members 135 (e.g., a third lip) positioned in the middle of the container 120, parallel to and between the side latches 128. In the illustrated example, the third coupling interlocking members 135 are provided on the cover 124. The third coupling interlocking members 135 may extend substantially entirely or partially between the hinge 126 and the latch 128". The third coupling interlocking members 135 may engage the second coupling interlocking members 36 of the small size containers 20 prior to the side latches 128 of the medium sized container 120 being moved to the locked position to help align and lock the containers 20, 120 to one another. In other examples, the coupling interlocking members 135 may comprise a variety of configurations of protrusions, recesses, or both. In addition, protrusions of the coupling interlocking members 135 can comprise lips that protrude in opposite directions from the second coupling interlocking members 36 of the small sized containers 20.

Figure 6:
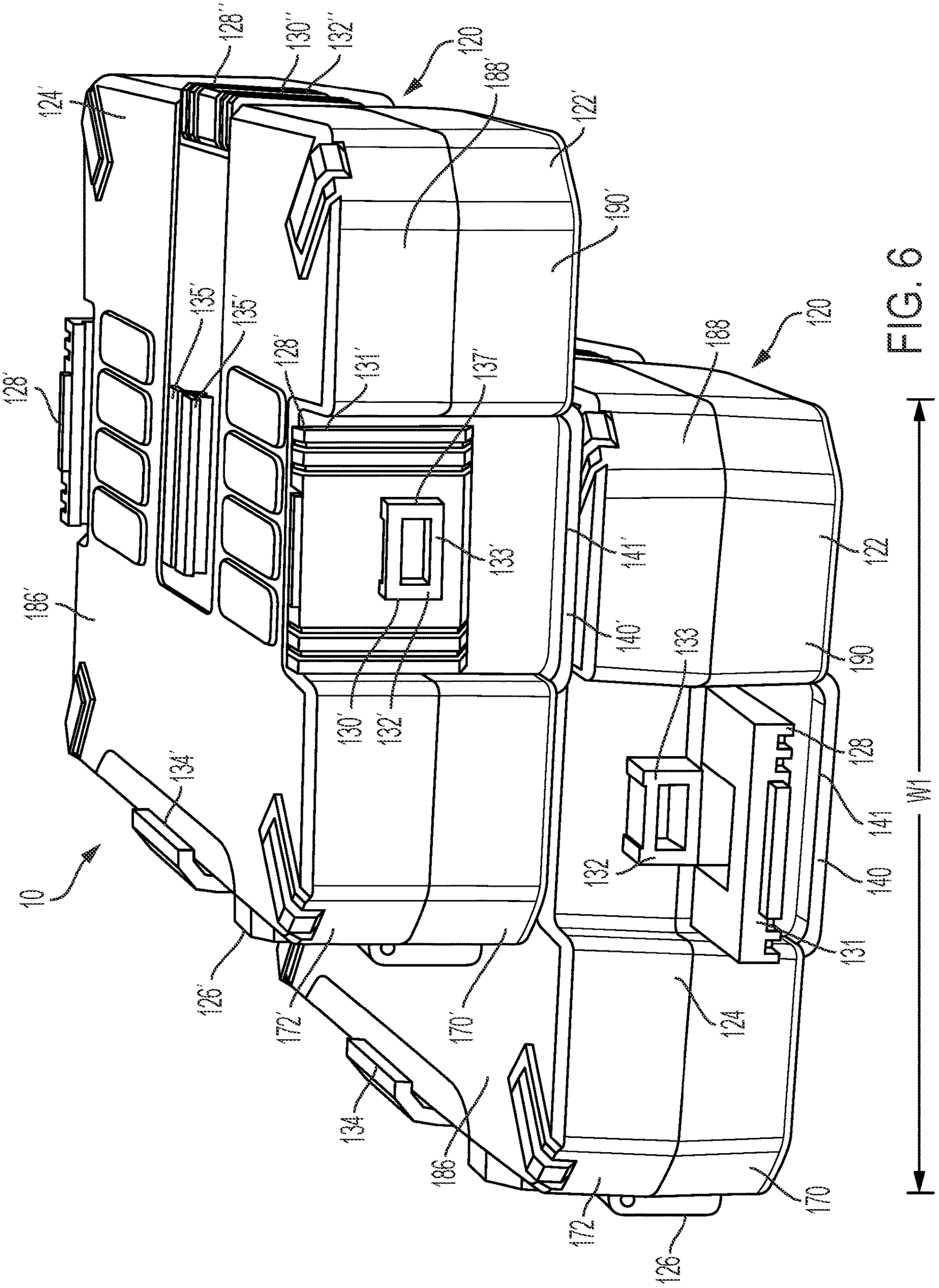
FIG. 6 is a side perspective view of an embodiment of two tool containers having a relatively medium size, stacked on one another.
Figure 10:
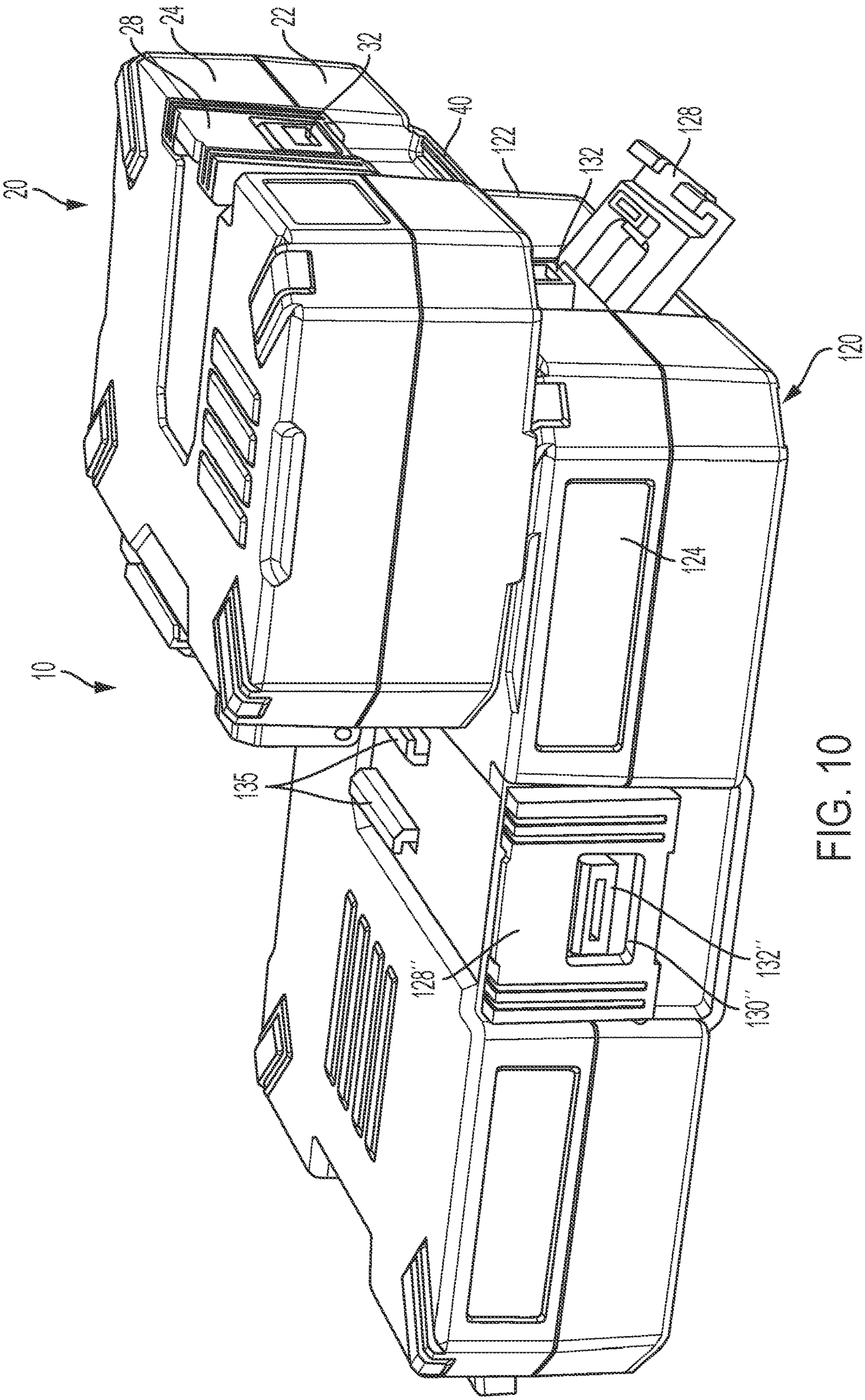
FIG. 10 is a front perspective view of the tool container of FIG. 1 being stacked on one of the tool containers of FIG. 6.
Figure 11:
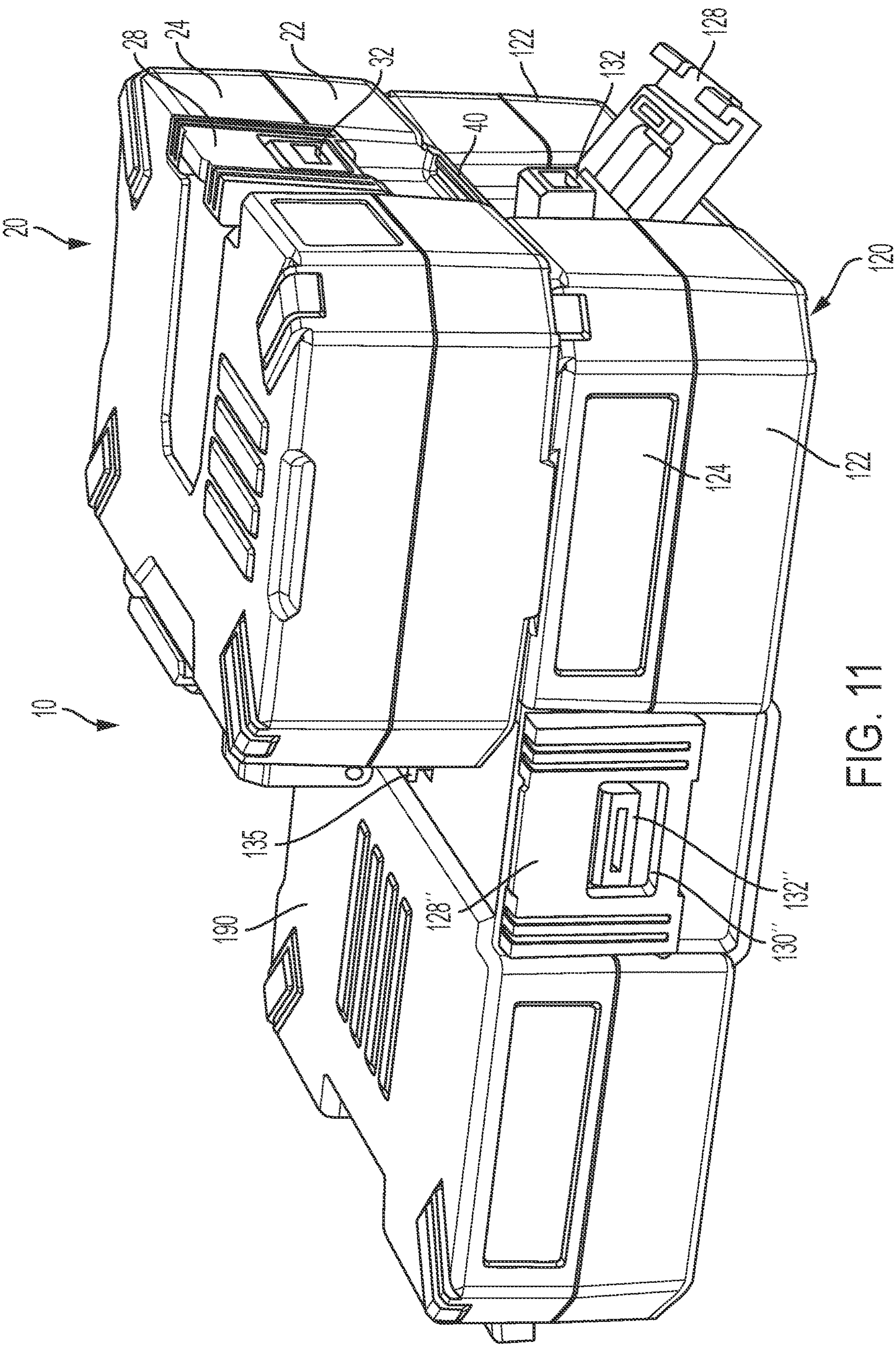
FIG. 11 is a front perspective view of the tool containers of FIG. 10, stacked and unlocked.
Figure 12:
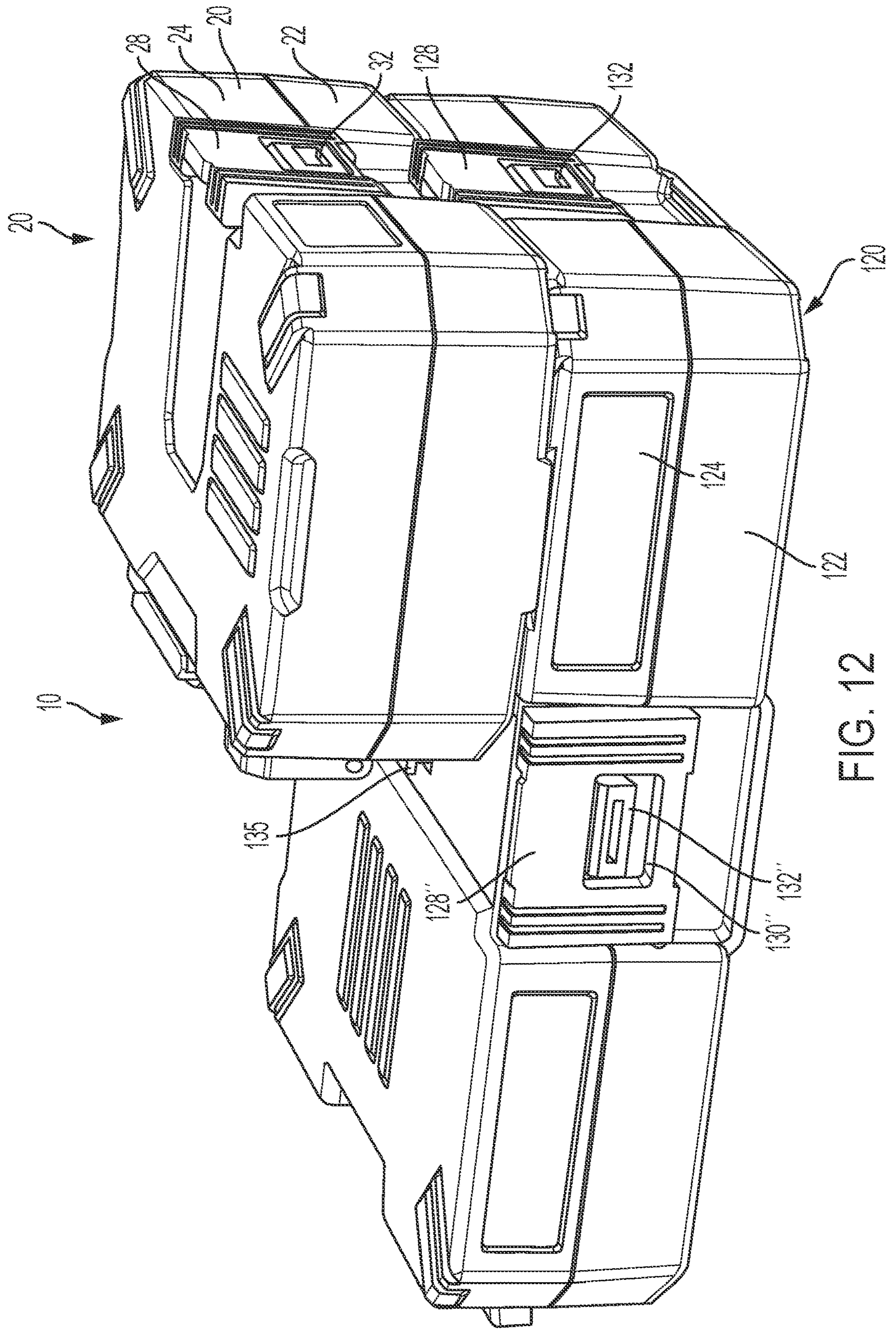
FIG. 12 is a front perspective view of the tool containers of FIG. 10, stacked and locked together.
Figure 13:
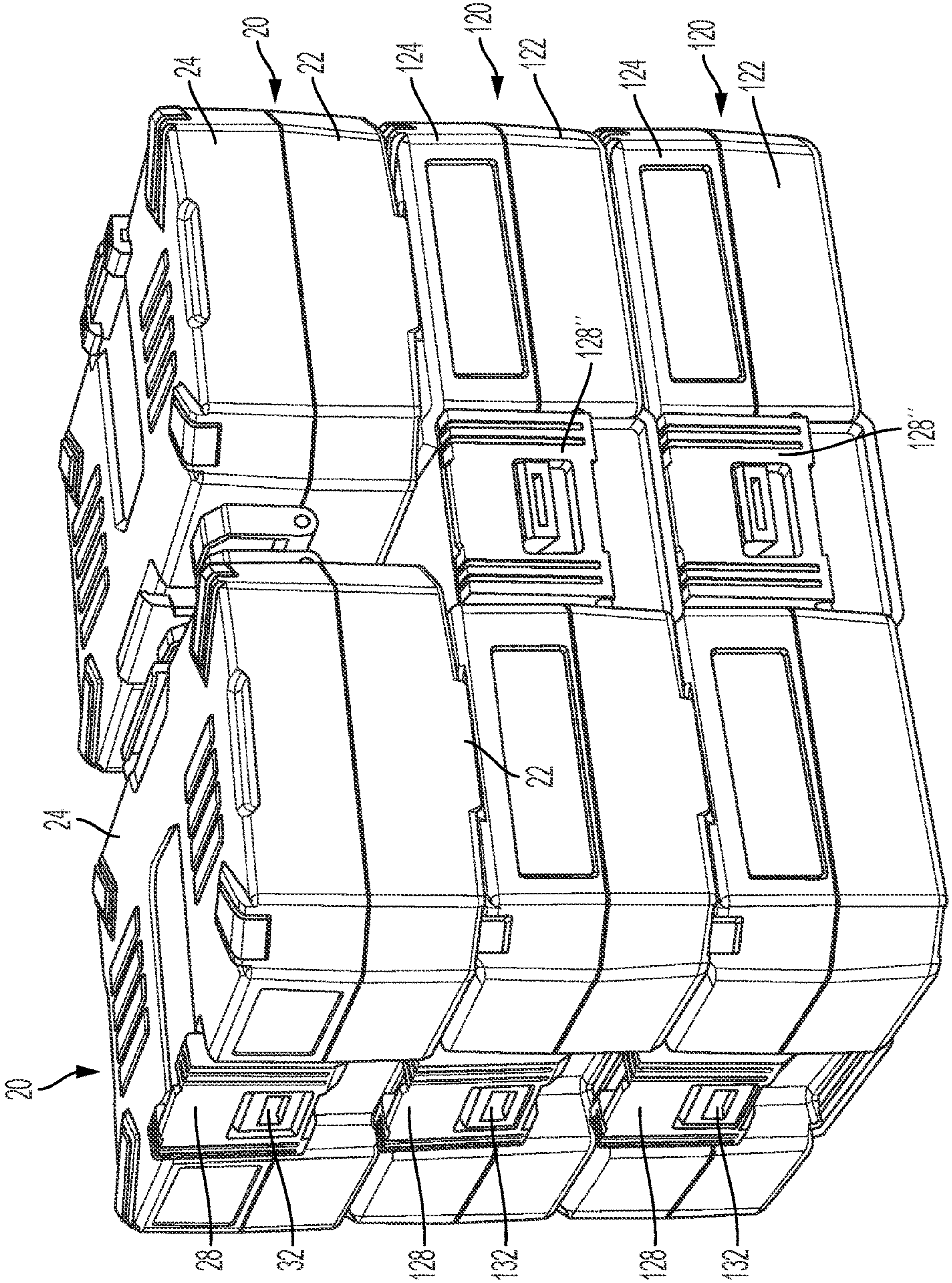
FIG. 13 is a front perspective view of two of the tool containers of FIG. 1 stacked and locked on one of the tool containers of FIG. 6, which is stacked and locked on another tool container of FIG. 6.

FIGS. 6-8 show an example of two of the medium sized container 120, 120' stacked and locked on one another. FIGS. 10-12 show an example of one small sized container 20 stacked and locked on one medium sized container 120. FIG. 13 shows an example of two small sized containers 20 stacked an locked on a medium sized container 120, which is stacked and locked on another medium sized container 120. It should be understood that the containers 20, 120 may be stacked and locked on one another in a variety of additional different combinations.

Figure 14:
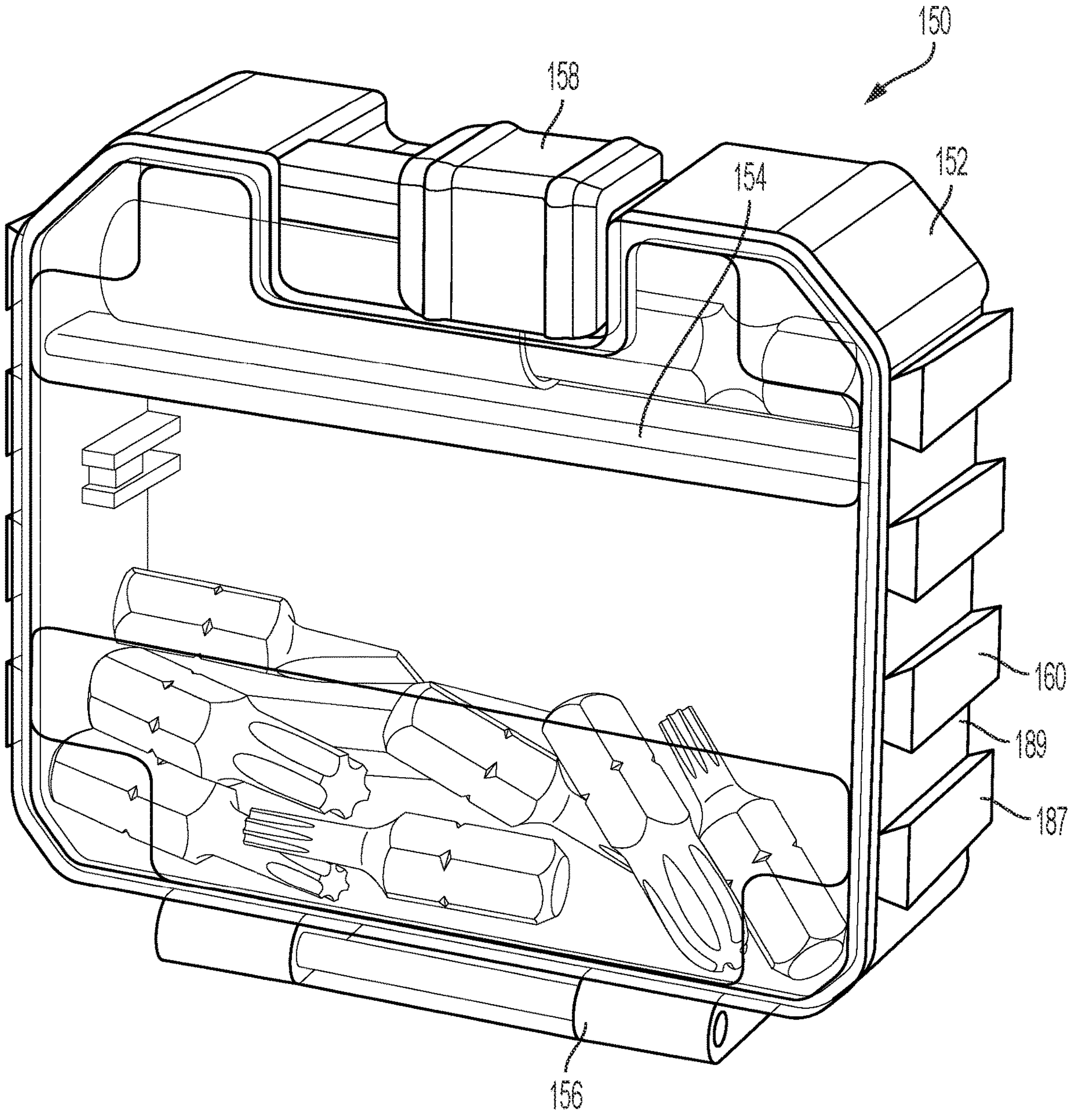
FIG. 14 is a front perspective view of an embodiment of a bulk storage container.
Figure 17:
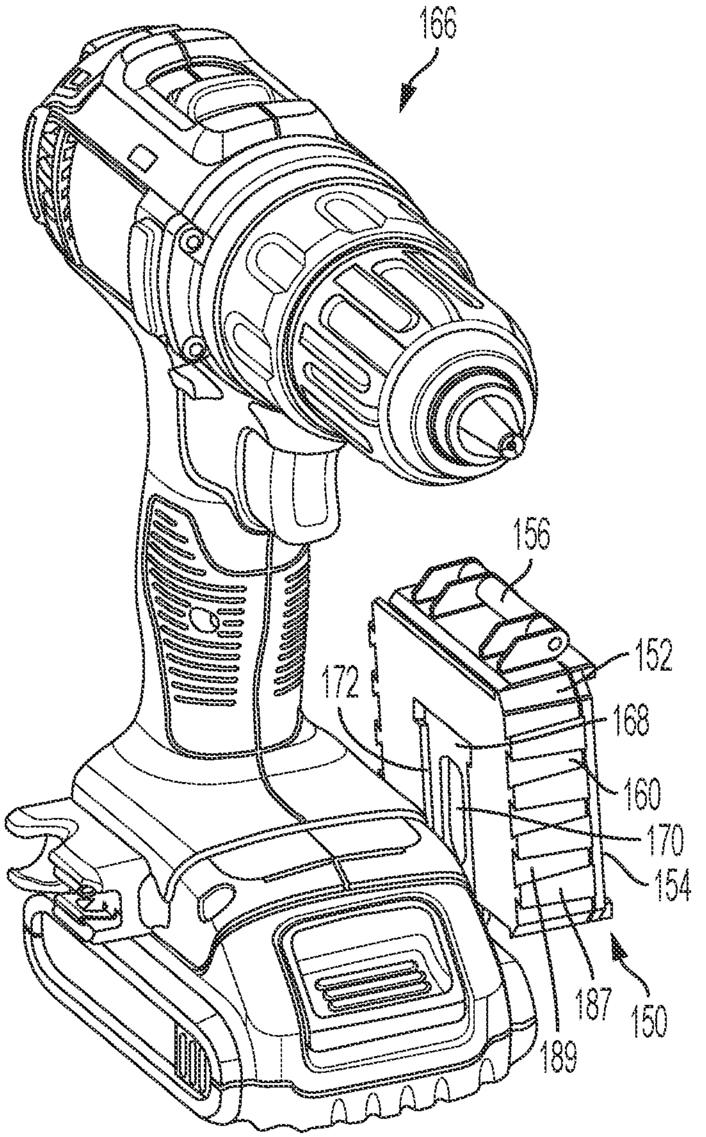
FIG. 17 is a perspective view of the bulk storage container of FIG. 14 coupled to an embodiment of a belt clip of a power tool.

Referring to FIGS. 14-15 and 17, the system 10 may further include a bulk storage container 150 that can fit inside one of the previously described tool containers 20, 120. For example, the bulk storage container 150 can be half the size or less of one of the small size containers 20 of FIGS. 1-5. The bulk storage container 150 is configured to contain multiple tool accessories 164 together in bulk (as opposed to being individually held within the inserts 50 described above). The bulk storage container 150 includes a base 152 (which may be opaque) and a cover 154 (which may be transparent or translucent) pivotably coupled to the base via a hinge 156 and moveable between an open position and a closed position. A container latch 158 selectively locks the cover 154 in the closed position relative to the base 152. The latch 158 may be slidable between its locked and unlocked positions. Alternatively, the latch 158 may be pivotable, similar to the latches 28, 128 on the containers 20, 120.

Figure 16:
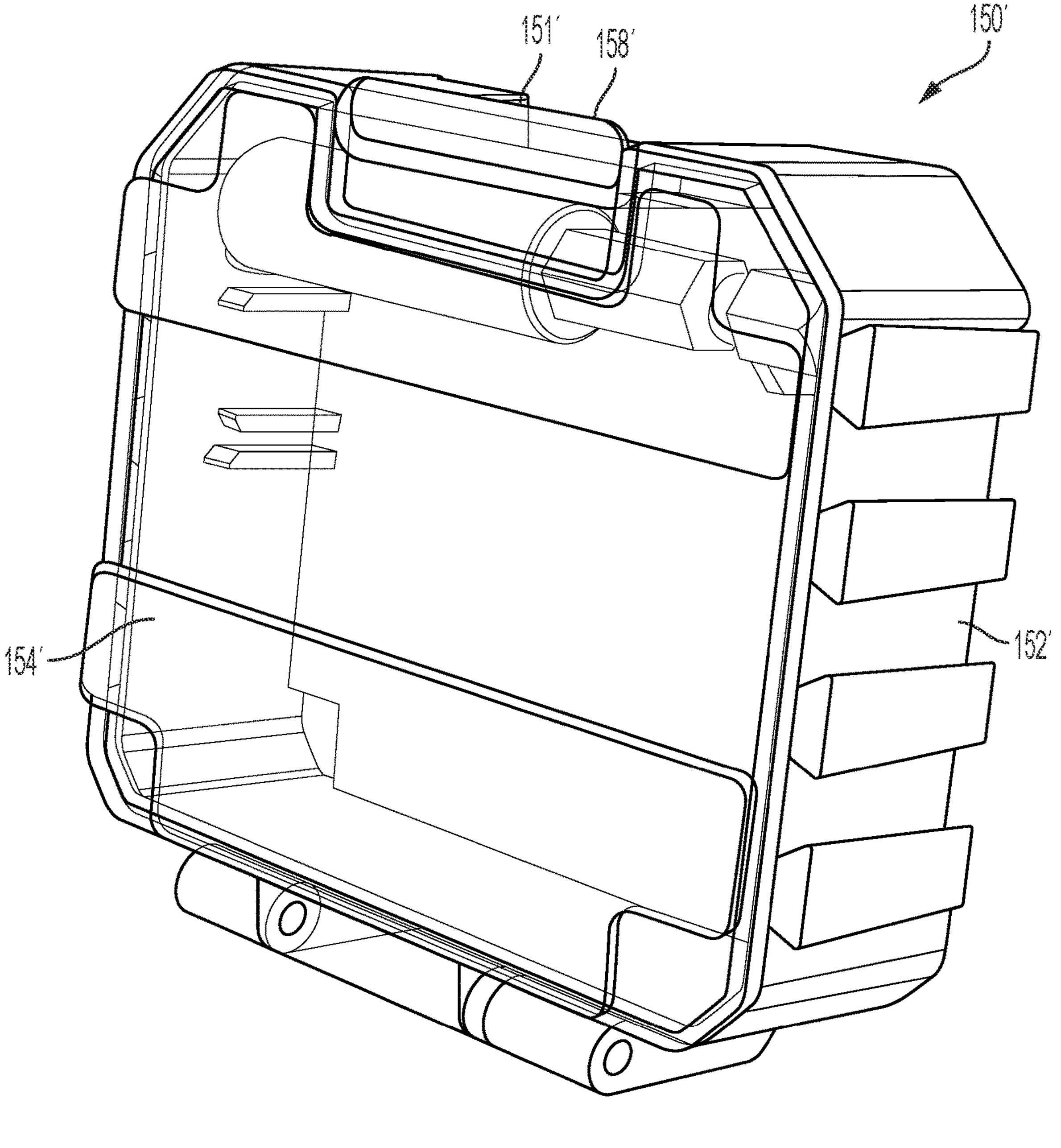
FIG. 16 is a front perspective view of another embodiment of a bulk storage container.

Referring to FIG. 16, in another embodiment, a bulk storage container 150' has the substantially the same design as bulk storage container 150, with the following differences. The bulk storage container 150' has a latch 158' comprised of a lip 151' on the cover 154' that engages a recess (not shown) on the base 152' to lock the cover 154' to the base 152' in a closed position.

The small bulk storage containers 150, 150' may have dimensions enabling them to fit inside either one of the bases 22, 122 or covers 24, 124 of the containers 20, 120. The bulk storage containers 150, 150' each may include exterior interlocking elements 160, 160' that can engage cooperating interior interlocking elements 62 of the container 20. The exterior interlocking elements 160, 160' can cooperate with the interior interlocking elements 62 to removably but securely retain the storage containers 150, 150' in one of a plurality of positions inside the tool containers 20, 120. The exterior interlocking elements 160, 160' may be positioned, e.g., on opposite exterior sides of the bulk storage containers 150, 150', and the interior interlocking elements 62 may be positioned on interior sides of the containers 20, 120. These interior and exterior interlocking elements 160, 160', 62 can each comprise a protrusion, a recess, or both. For example, the exterior interlocking elements 160, 160' may include alternating dovetail projections 187 and recesses 189 that can engage the dovetail projections 88 and recesses 90 on the interior walls of the containers 20, 120. This enables the bulk storage containers 150, 150' to be removably retained in one of the containers 20, 120 and may further enable the covers 154, 154' of the bulk storage containers 150, 150' to be opened while they are retained in one of the containers 20, 120.

Referring to FIG. 17, each bulk storage container 150, 150' can house a plurality of tool bits (e.g., fastening bits or drill bits), blades, or other accessories 164 for use for a power tool, e.g, a drill 166. Such power tools may have a belt clip 168 that can be used to clip the tool to a tool belt (not shown). The container 150 can additionally include a coupling recess 170 for receiving and retaining the belt clip 168 of the power tool 166. The coupling recess 170 can be provided on the base 152 of the storage container 150 (as shown) or on the cover 154. Opposite sides of the recess 170 can include opposing lips 172 that capture opposite peripheral edges of the belt clip 168 as it slides into the recess 170. Thus, the container 150 can include both container interlocking elements 160 and a belt clip interlocking elements 170, 172.

Figure 18A:
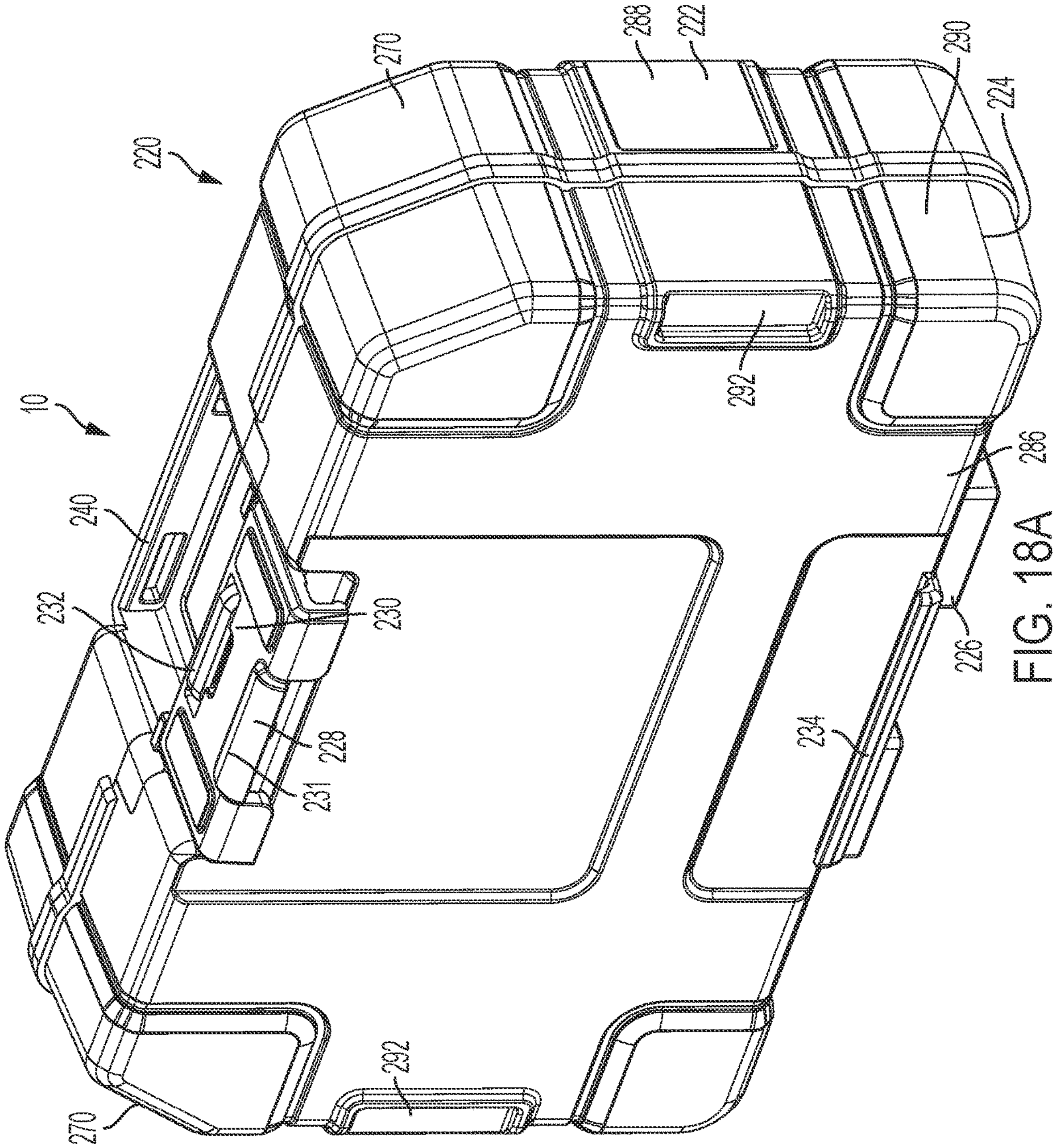
FIGS. 18A, 18B, and 18C are front, top, and bottom perspective views, respectively, of another embodiment of a tool container having a relatively small size.
Figure 18B:
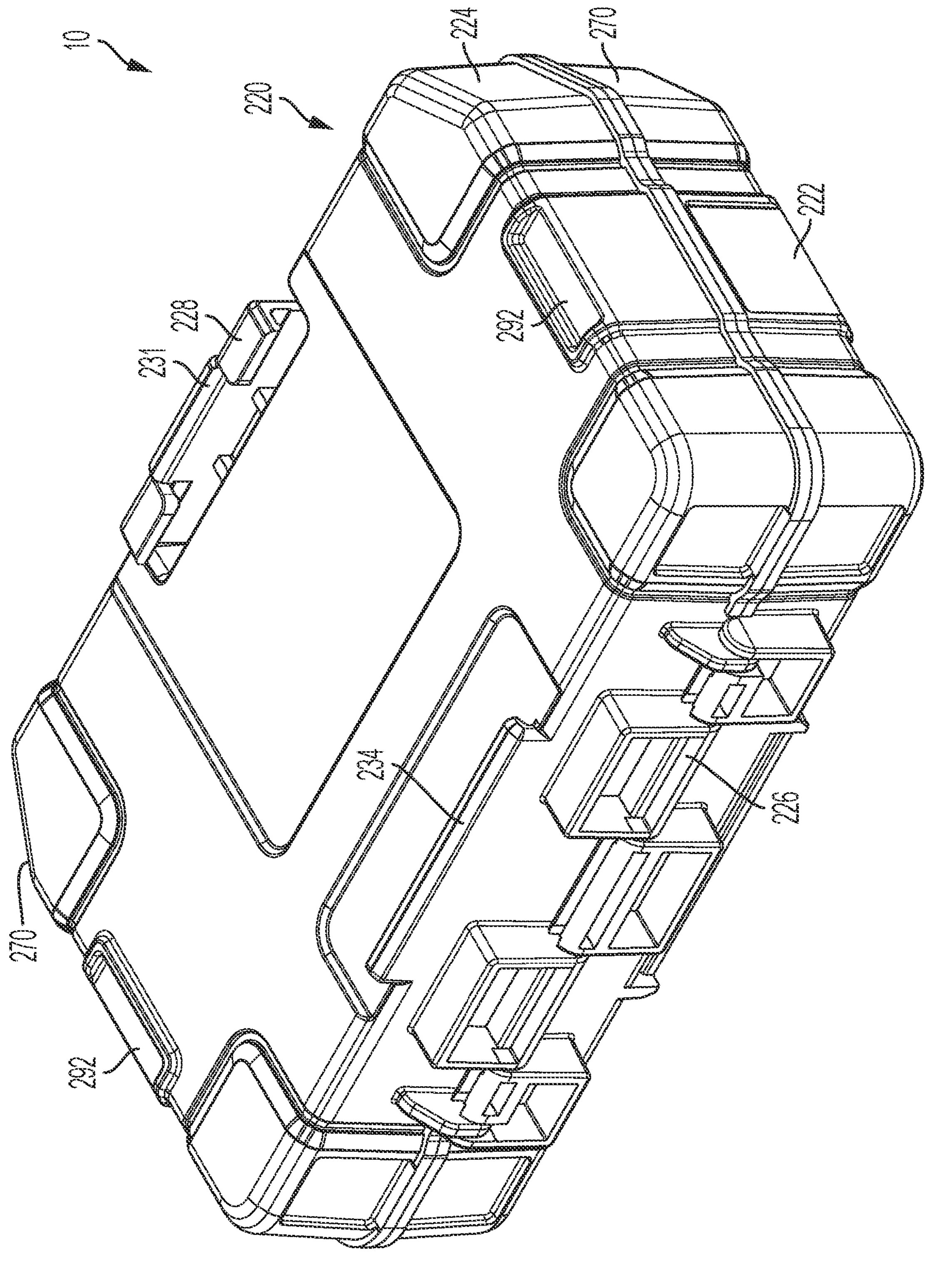
Figure 18C:
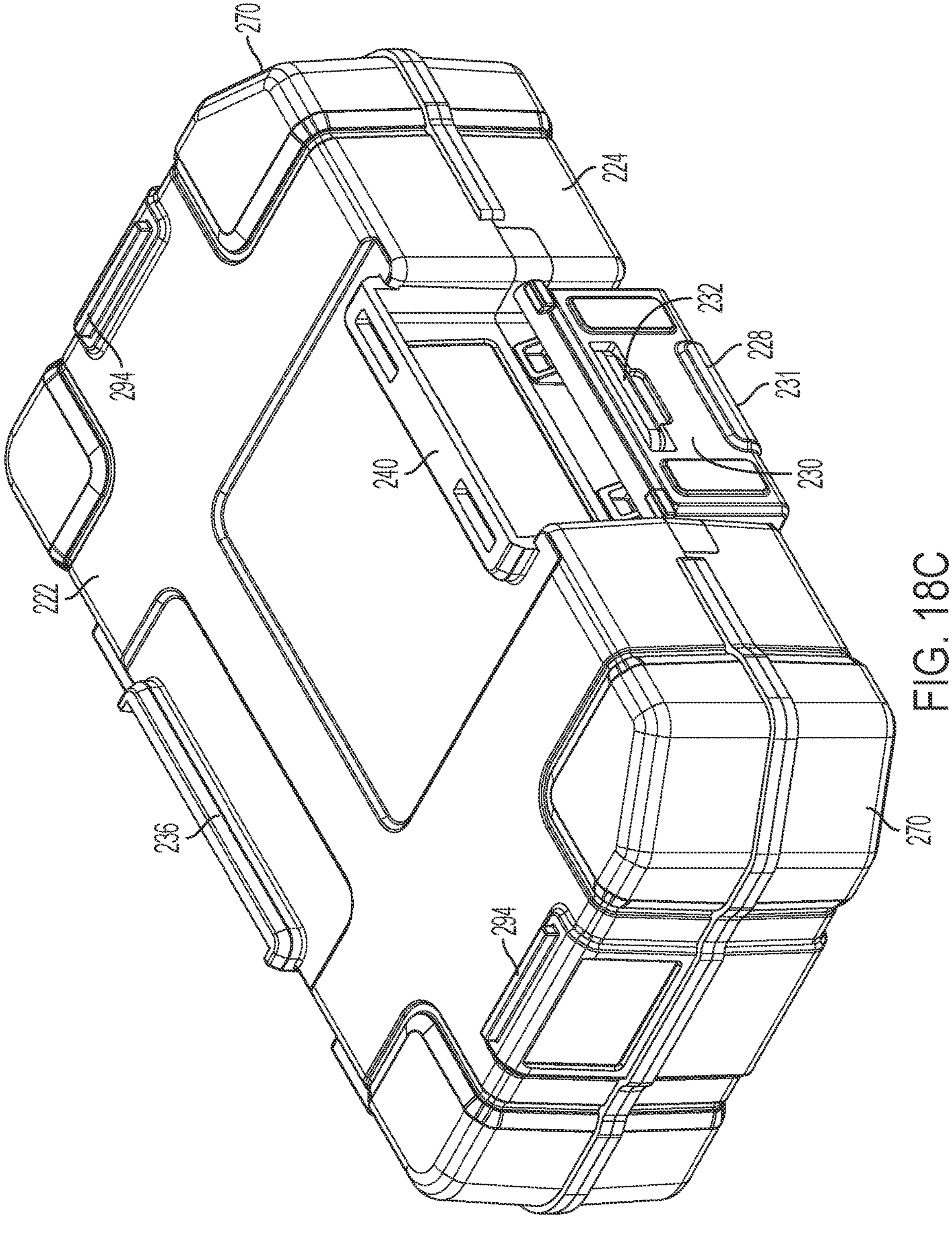
Figure 19A:
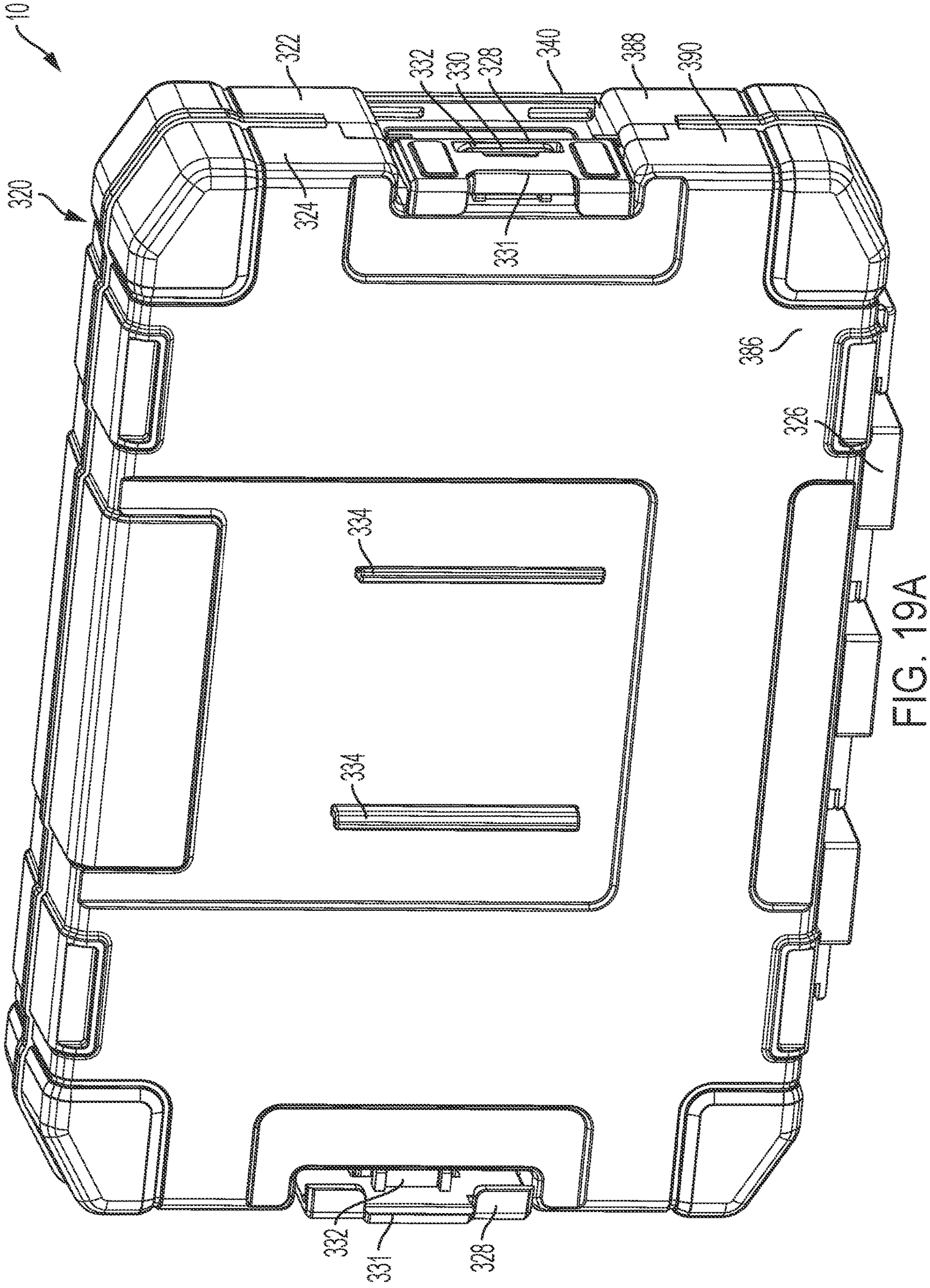
FIGS. 19A, 19B, and 19C are front, top, and bottom perspective views, respectively, of another embodiment of a tool container having a relatively medium size.
Figure 19B:
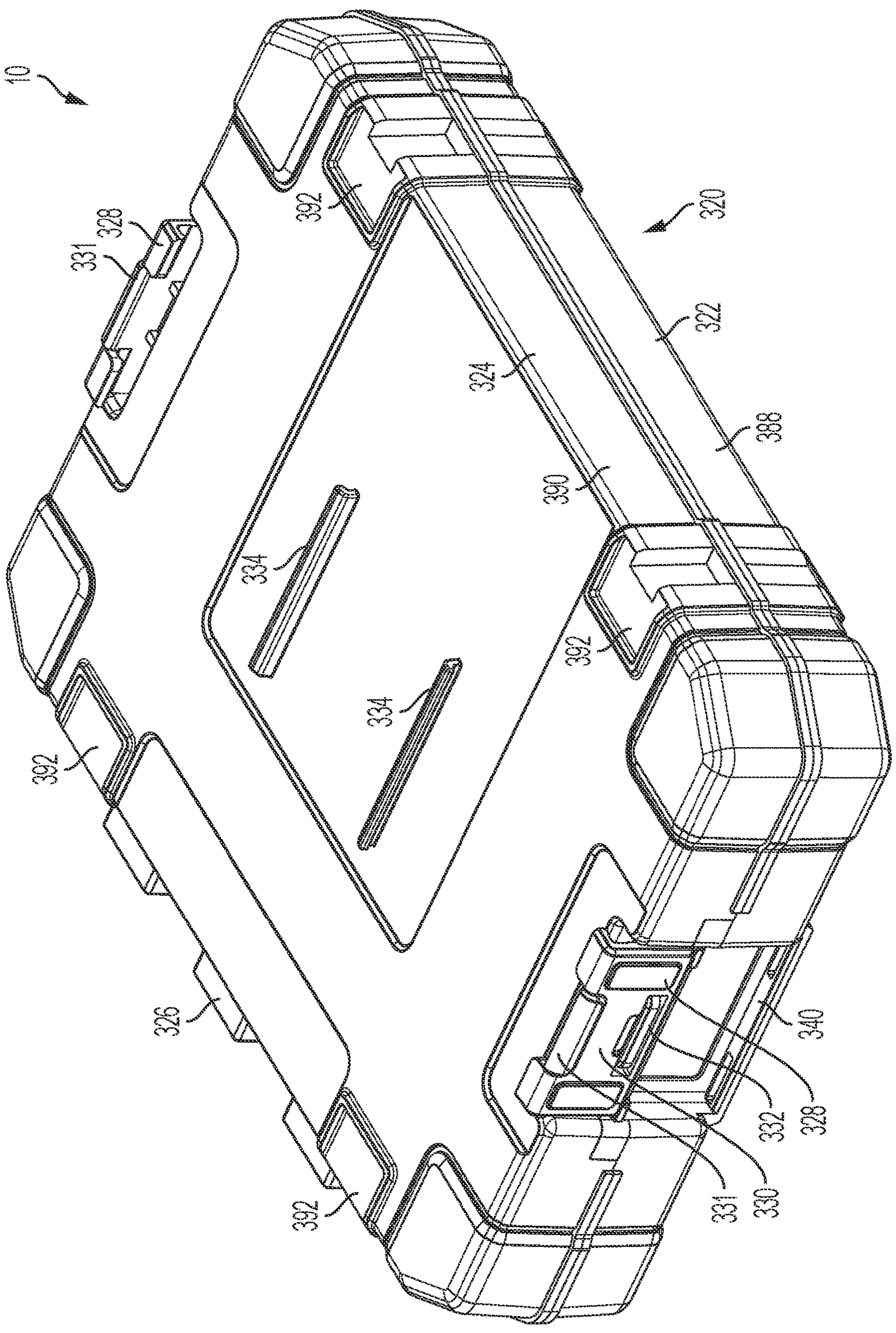
Figure 19C:
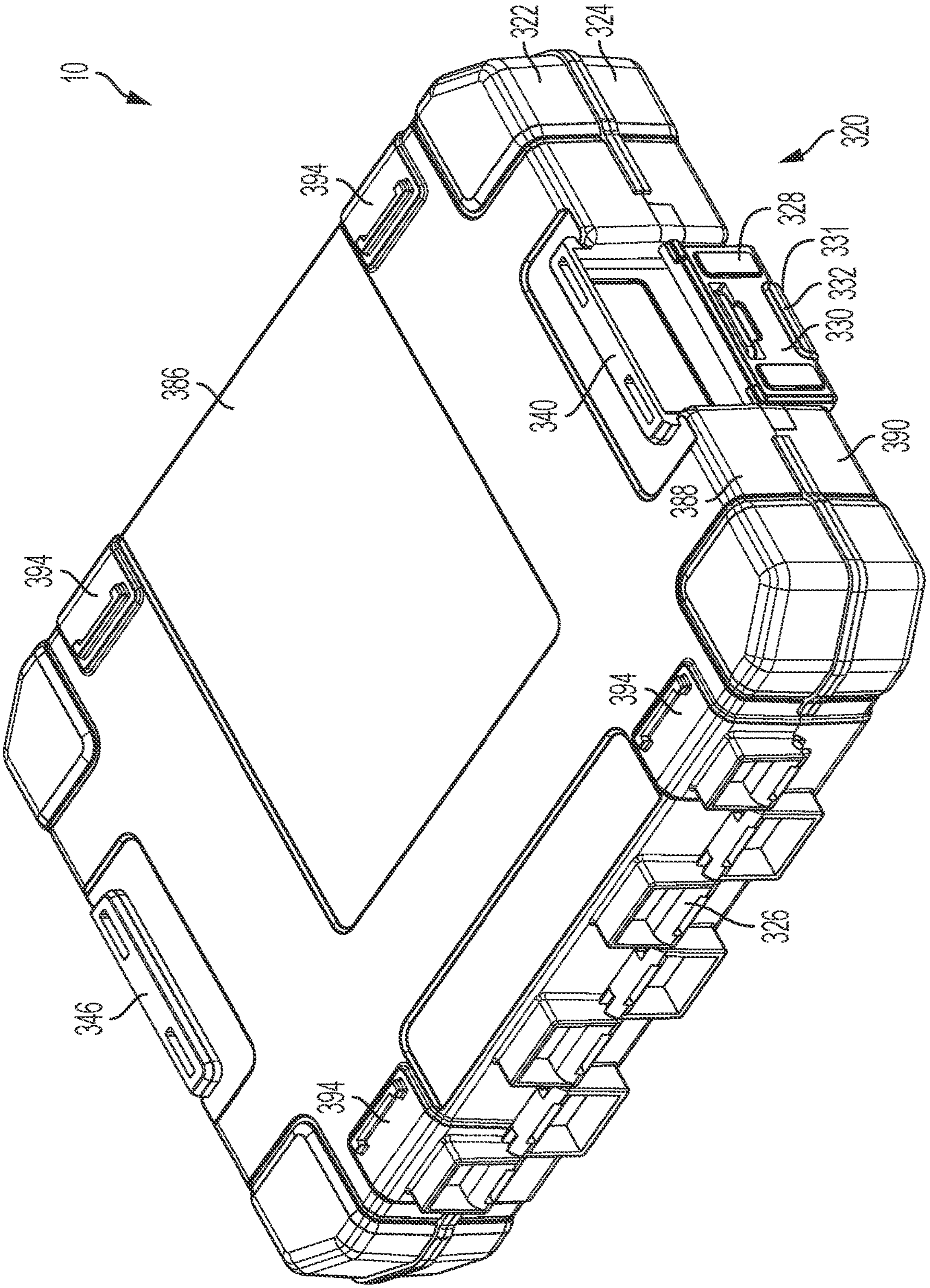

Referring to FIGS. 18A-18C, in another embodiment, the tool container system 10 may include one or more tool containers 220, each having a relatively small size similar to tool container 20. Each tool container 220 includes a base 222, a cover 224, a hinge 226, base walls 284, 286, and peripheral walls 288, 290, similar to the base 22, a cover 24, hinge 26, base walls 84, 86, and peripheral walls 88, 90 of the tool container 20 of relatively small size shown in FIGS. 1-5B. Like the tool container 20, the tool container 220 includes a first locking member 232 (e.g., a rectangular locking projection) on one of the base 222 and the cover 224, a second locking member 240 (e.g., a downward projection) on the other of the base 222 and the cover 224, and a latch 228 configured to lock the cover 224 and the base 222 together in the closed position.

Like the latch 28, the latch 228 can be coupled to either the base 222 or the cover 224 and is movable (e.g., pivotably) between an unlocked position and a locked position. Like the latch 28, the latch 228 includes a first locking latch portion 230 that is engageable with a first locking member 232 on the other of the base 222 or cover 224 when the latch 228 is in the locked position. In addition, like the latch 28, the latch 228 includes a second locking latch portion 231 that is engageable with a second locking member 240 on a second container 220 to lock two of containers 220 when one is stacked on the other. Like the containers 20, Each of the containers 220 may additionally include a first coupling interlocking member 234 (e.g., a first lip) on one of the cover 224 and the base 222, and a second, cooperating coupling interlocking member 236 (e.g., a second lip) on the other of the cover 224 and the base 222 that is engageable the first coupling interlocking members 234 of another container 220 when they are stacked on one another.

The container 220 differs from the container 20 in the following respects. First, the container 220 only has two chamfered corners 270 on the latch side of the container 220, instead of having four chamfered corners 70 on the container 20. Second, at least one recess or depression 292 is defined in one of the base 222 and the cover 224 and at least one protrusion or foot 294 is formed in the other of the base 222 and the cover 224. When one container 220 is stacked on another container 220, the at least one protrusion or foot 294 is received in the at least one recess or depression 292 to help align one container 220 with the other container.

Referring to FIGS. 19A-21, in another embodiment, the tool container system 10 may include one or more tool containers 320, each having a relatively medium size similar to tool container 120. Each tool container 320 includes a base 322, a cover 324, a hinge 326, base walls 384, 386, and peripheral walls 388, 390, similar to the base 122, cover 124, hinge 126, base walls 184, 186, and peripheral walls 188, 190 of the medium-size tool container 120 shown in FIGS. 6-9. Like the tool container 120, the tool container 320 includes two first locking members 332 (e.g., a rectangular locking projection) on one of the base 322 and the cover 224, two second locking members 340 (e.g., a downward projection) on the other of the base 322 and the cover 324, and two latches 328 configured to lock the cover 324 and the base 322 together in the closed position.

Figure 20A:
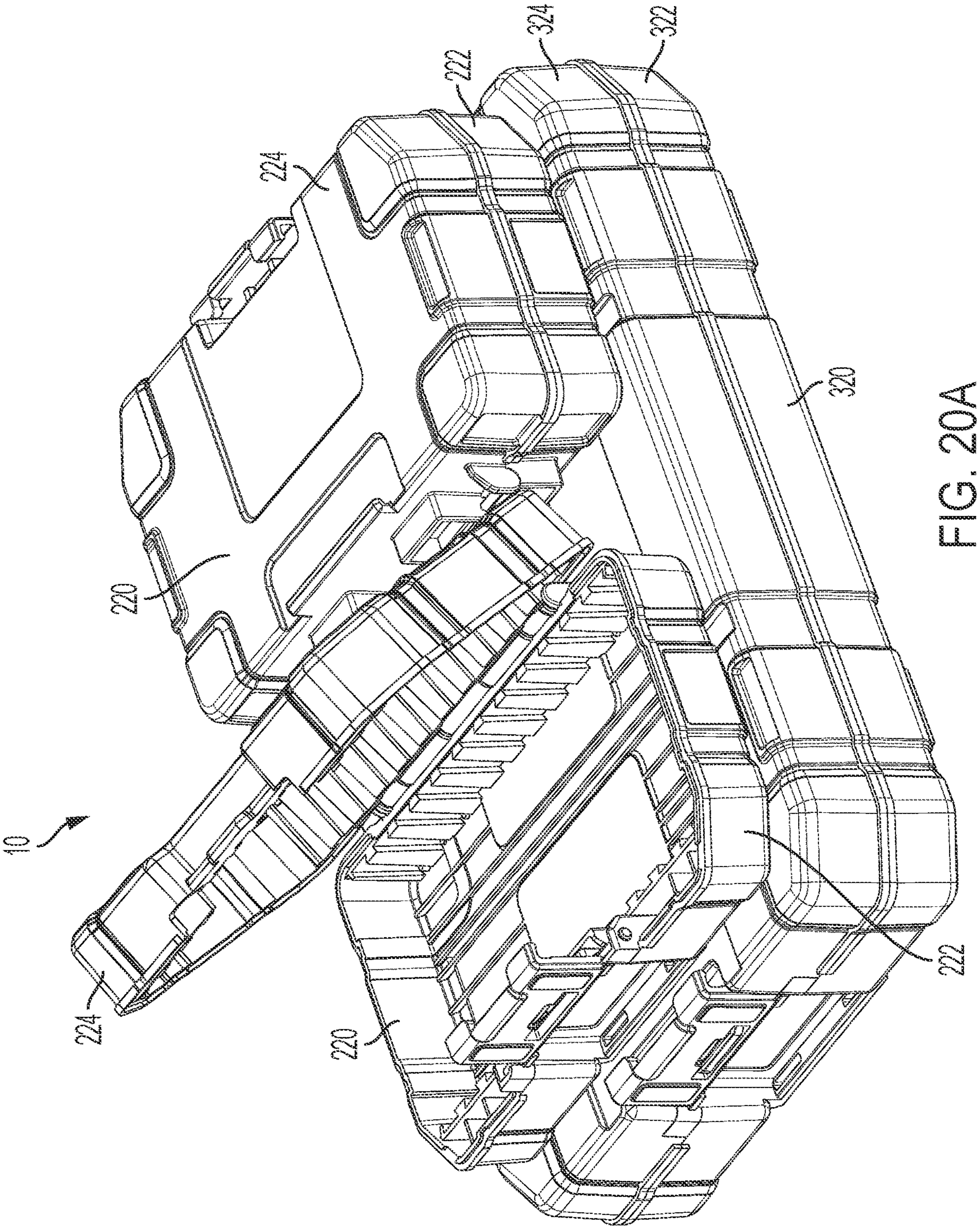
FIGS. 20A and 20B are top perspective views of two of the tool containers of FIGS. 18A-18C stacked and locked on one of the tool containers of FIGS. 19A-19C.
Figure 20B:
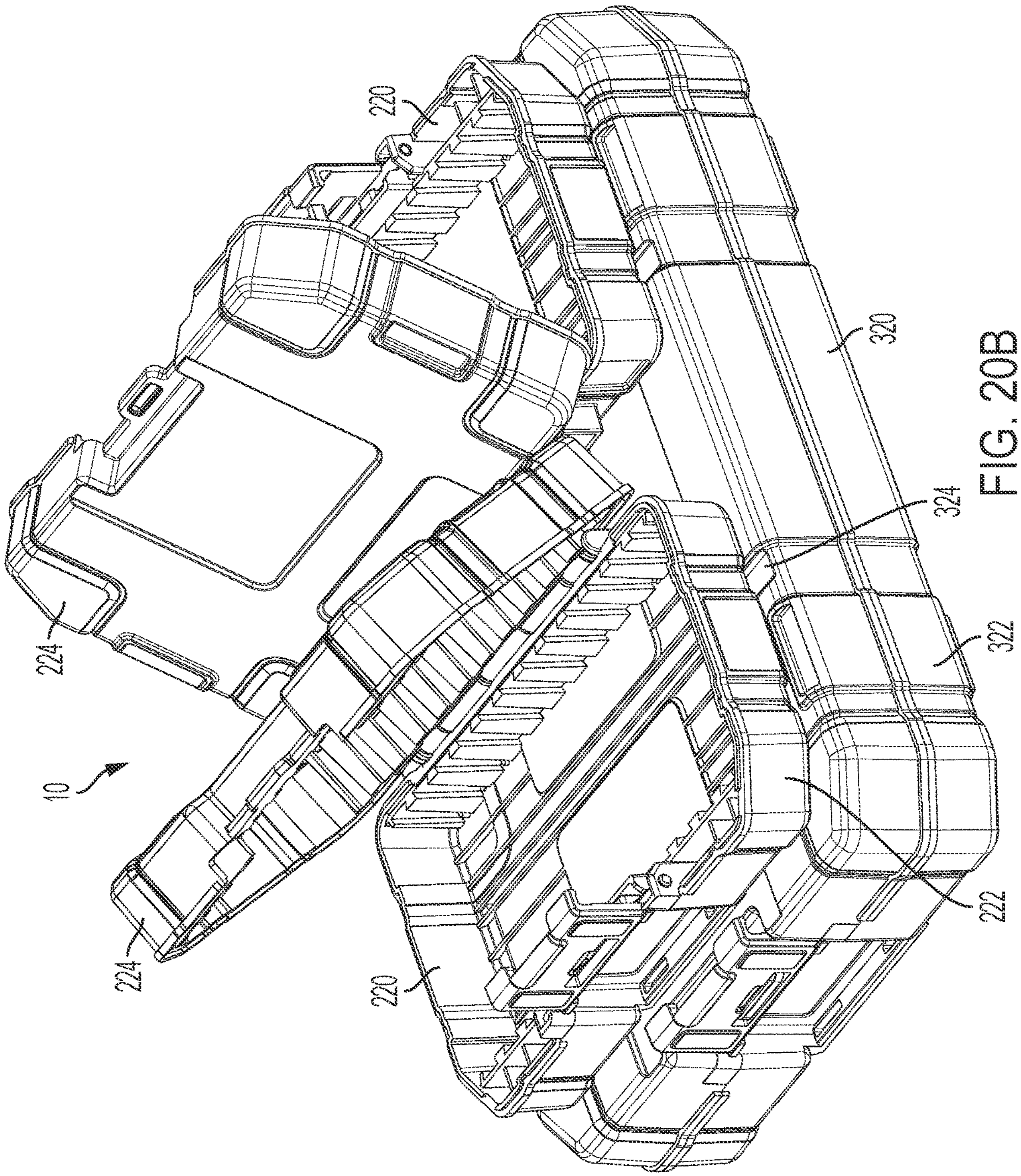
Figure 21:
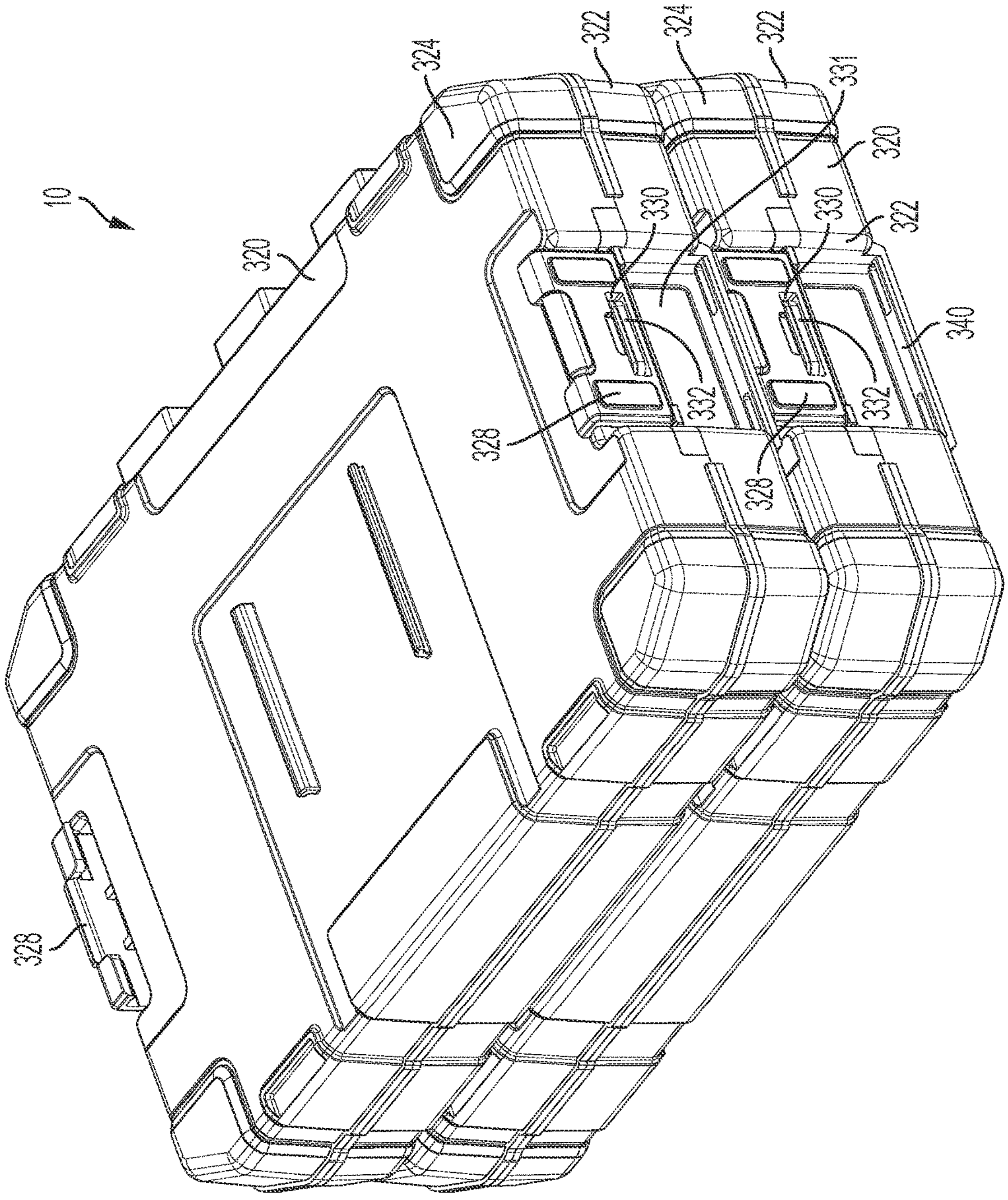
FIG. 21 is a top perspective view of two of the tool containers of FIGS. 19A-19C, stacked and locked to one another.
Figure 22A:
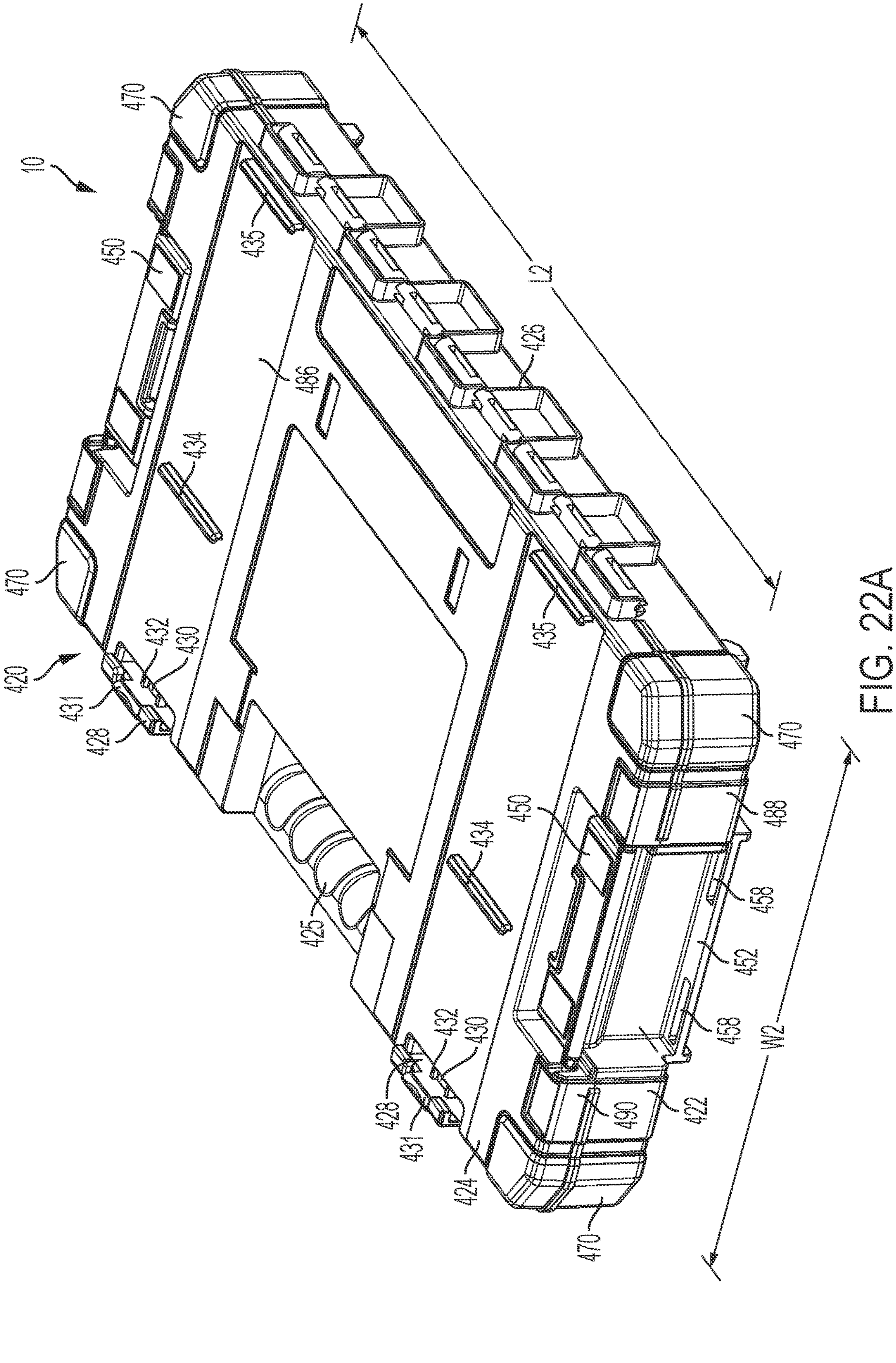
FIGS. 22A and 22B are top and bottom perspective views, respectively, of an embodiment of a tool container having a relatively large size.
Figure 22B:
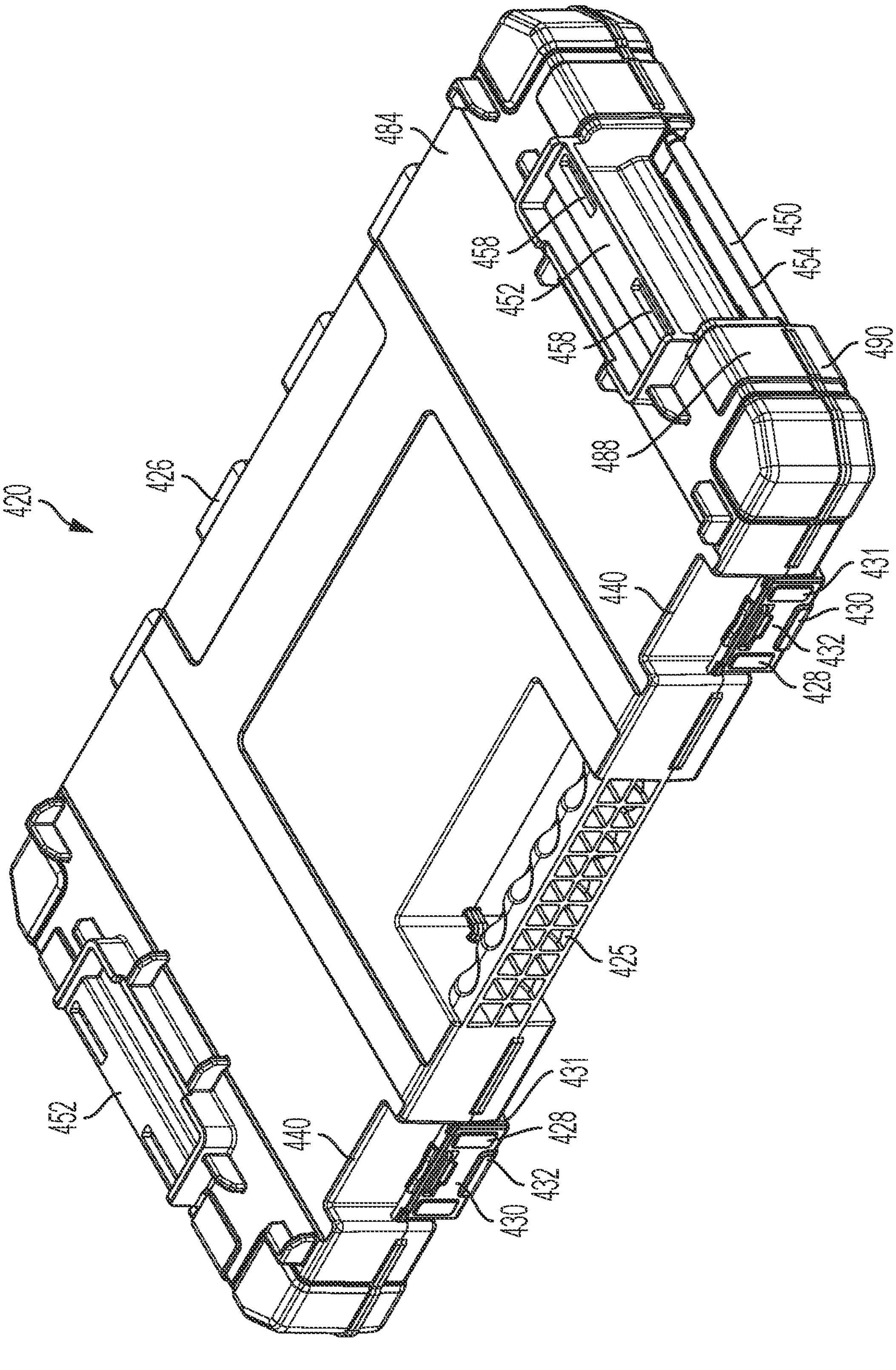

Like the latches 128, the latches 328 can be coupled to either the base 322 or the cover 324 and are movable (e.g., pivotably) between an unlocked position and a locked position. Like the latch 128, each latch 328 includes a first locking latch portion 330 that is engageable with a first locking member 332 on the other of the base 322 or cover 324 when the latch 328 is in the locked position. In addition, as shown in FIG. 21, each latch 328 includes a second locking latch portion 331 that is engageable with a second locking member 340 on a second tool container 320 to lock two of tool containers 320 when one is stacked on the other. Like the container 120, the container 320 may additionally include two first coupling interlocking members 334 (e.g., each a first lip) on one of the cover 324 and the base 322. The first coupling interlocking members 334 each are engageable with the second coupling interlocking members 236 (e.g., a second lip) on the cover 224 or the base 222 of the small size tool container 220 when one of the containers 220 is stacked on one of the tool containers 320, as shown in FIGS. 20A-20B.

The container 320 differs from the container 120 in the following respects. First, at least one recess or depression 392 is defined in one of the base 322 and the cover 324 and at least one protrusion or foot 394 is formed in the other of the base 322 and the cover 324. When one container 320 is stacked on another container 320, the at least one protrusion or foot 394 is received in the at least one recess or depression 392 to help align one container 320 with the other container. Second, the two first coupling interlocking members 334 (e.g., each a first lip) on the cover 324 or the base 322 are spaced further apart than the first coupling interlocking member 122 on the container 120, so that when two of the small containers 220 are stacked on and locked to the medium container 320, the covers 224 of the small containers 220 can be fully opened at the same time, e.g., to somewhat less than 90 degrees or more, as shown in FIGS. 20A-20B. Third, unlike the container 120, the container 320 does not include a third latch (like third latch 128") that engages a third locking member 232" to lock the base and the cover in a closed position.

Referring to FIGS. 22A-23B, in another embodiment, the tool container system 10 may further include one or more tool containers 420, each having a relatively large size as compared to the tool containers 20, 120, 220, and 320. Each container 420 includes a base 422 and a cover 424 that are pivotably connected together about a hinge 426 and moveable between an open position and a closed position. An exterior of the base 422 and the cover 424 each has a generally rectangular shape with chamfered corners 470 defined by peripheral walls 488, 490. The container 420 has a length L2 and a width W2 that are greater than the lengths L, L1 and widths W, W1 of the containers 20, 120. Although not shown, the interior of the base 422 and cover 424 each may comprise recessed cavities, each defined by base walls 484, 486, and the peripheral walls 488, 490. The design of the interior of the base 422 and cover 424 may be similar to the corresponding designs shown in U.S. Pat. No. 6,213,296, which is incorporated by reference.

Figure 23A:
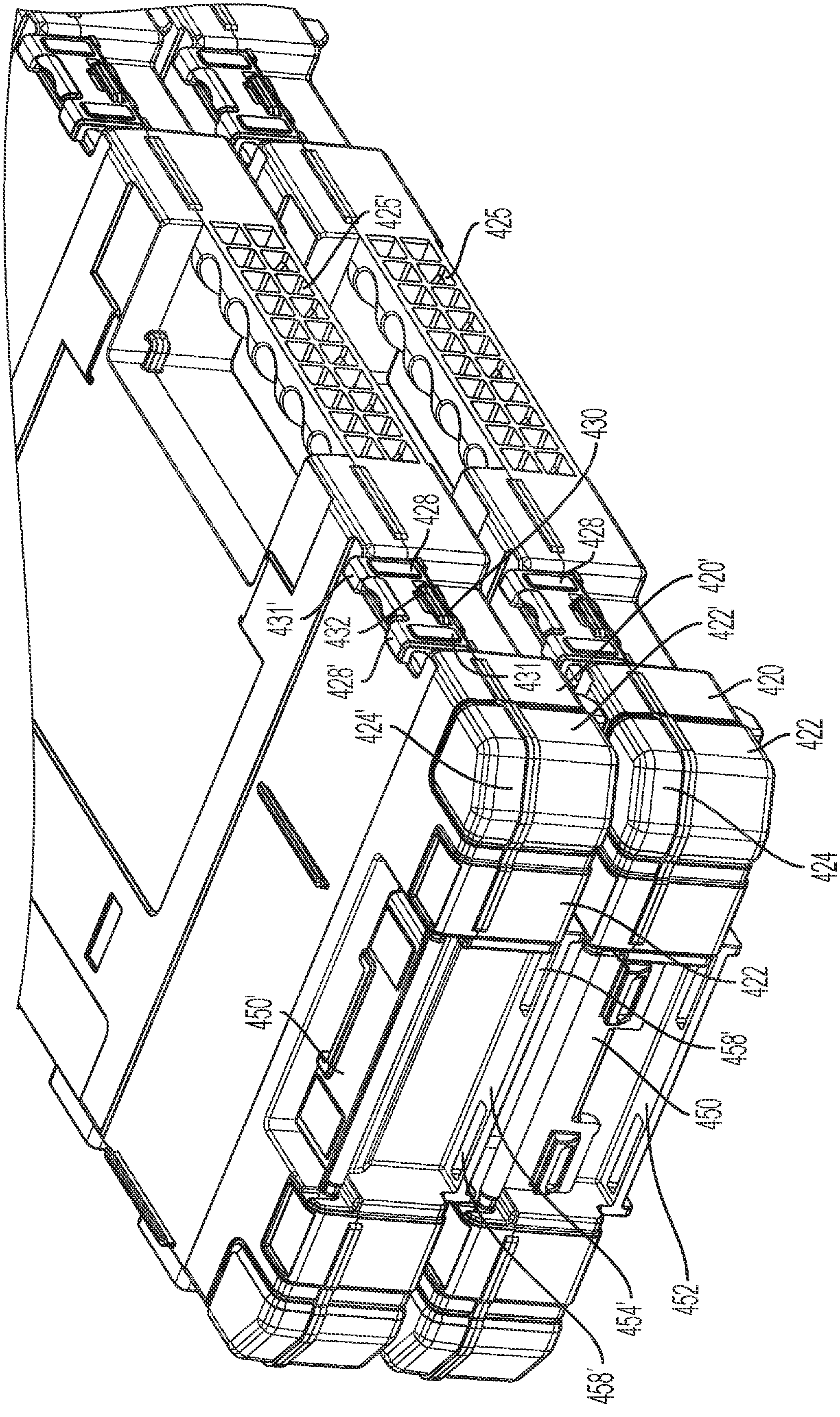
FIG. 23A is a close-up perspective view of two of the tool containers of FIGS. 22A-22B, stacked and unlocked.
Figure 23B:
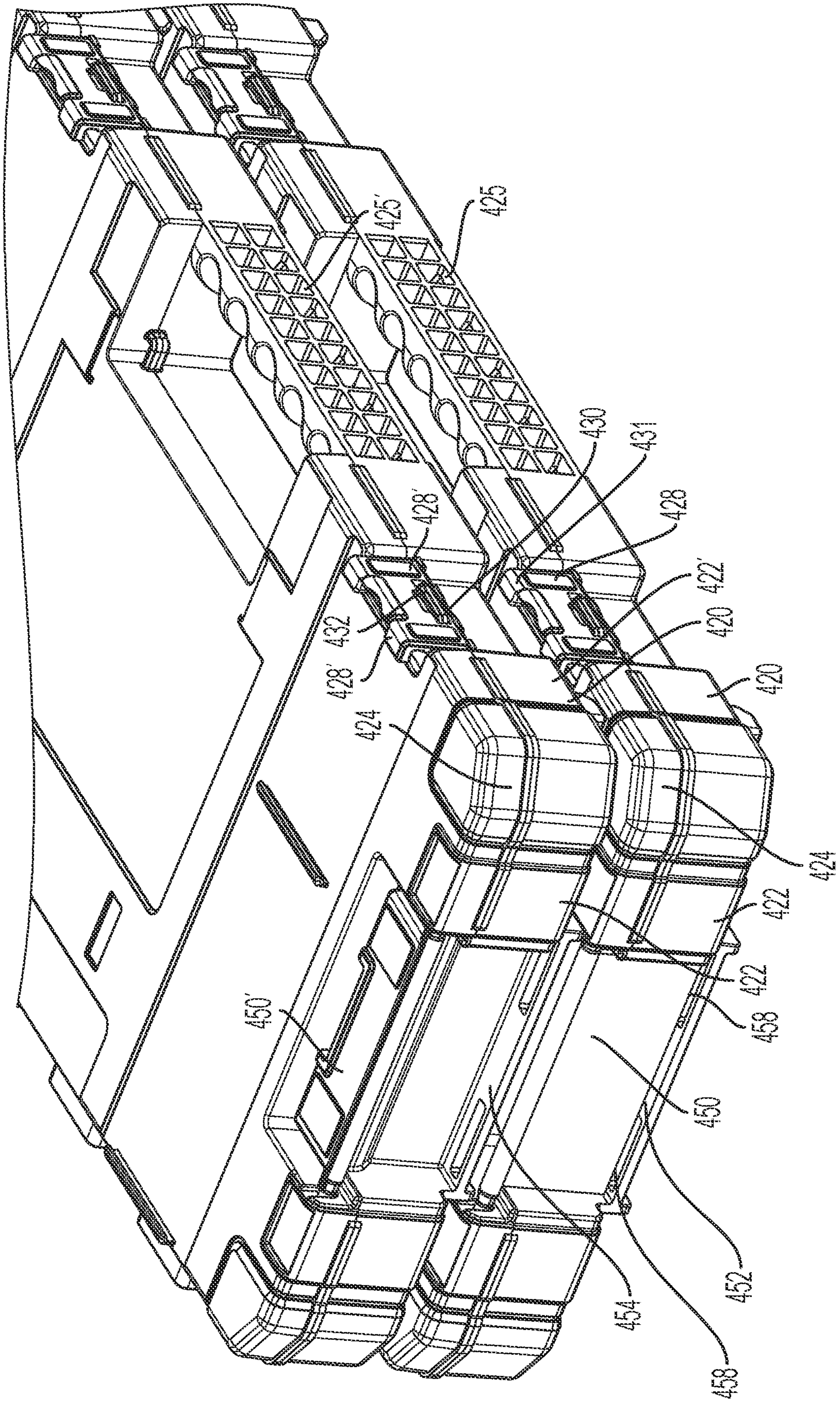
FIG. 23B is a close-up perspective view of two of the tool containers of FIGS. 22A-22B, stacked and locked.

When in the closed position, the base 422 and 424 may together define a carrying handle 425. On the same side as the carrying handle 425, an exterior of the base 422 or the cover 424 includes two first locking members 432 (e.g., rectangular locking projections similar to locking members 32, 132, 232, 332) and the other of the base 422 and the cover 424 includes two second locking members 440 (e.g., downward projections similar to locking members 40, 140, 240, 340). The exterior of one of the base 422 and the cover 424 also includes two latches 428 (similar to latches 28, 128, 228, 328) configured to lock the cover 424 and the base 422 together in the closed position. The latches 428 can be coupled to either the base 422 or the cover 424 and are movable (e.g., pivotably) between an unlocked position and a locked position (similar to latches 28, 128, 228, 328). The latches 428 each include a first locking latch portion 430 (e.g., a rectangular aperture or recess similar to first locking latch portions 30, 130, 230, 330) that is engageable with the first locking member 432 on the other of the base 422 or cover 424 when the latch 428 is in the locked position, in a similar manner to latches 28, 128, 228, 328. Each latch 128 also includes a second locking latch portion 431 (similar to locking latch portions 31, 131, 231, 331) that is engageable with the second locking member 440 on a second one of a container 420 to lock the two containers 420 together (as shown in FIGS. 23A-23B). As other examples, the first and second locking members 432, 440 on the base 422 and cover 424 and the first and second locking latch portions 430, 431 on the latches 428 can each comprise a variety of other configurations of protrusions, recesses, or both.

Figure 24A:
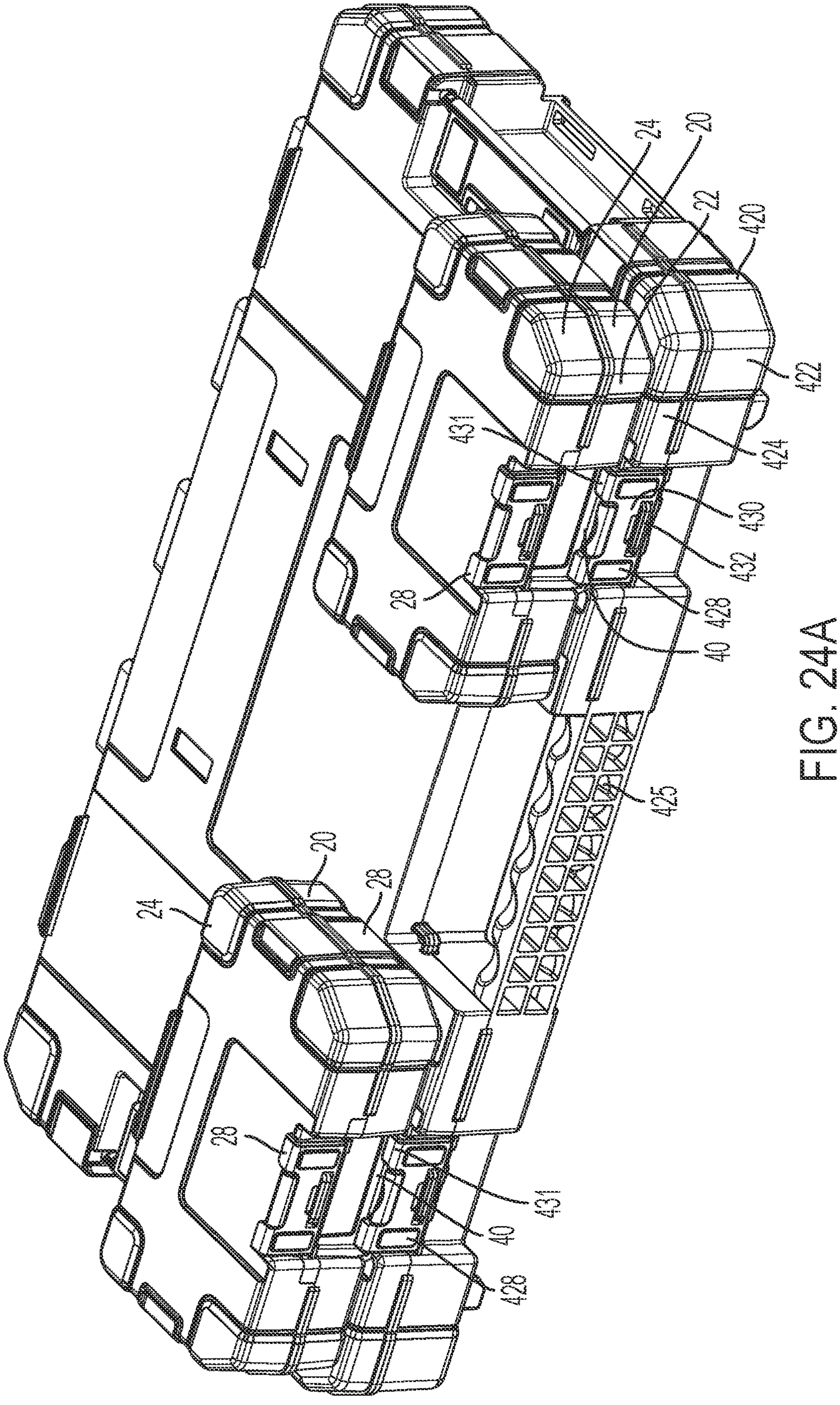
FIGS. 24A and 24B are top perspective views of two of the tool containers of FIGS. 18A-18C stacked and locked on one of the tool containers of FIGS. 22A-22B.
Figure 24B:
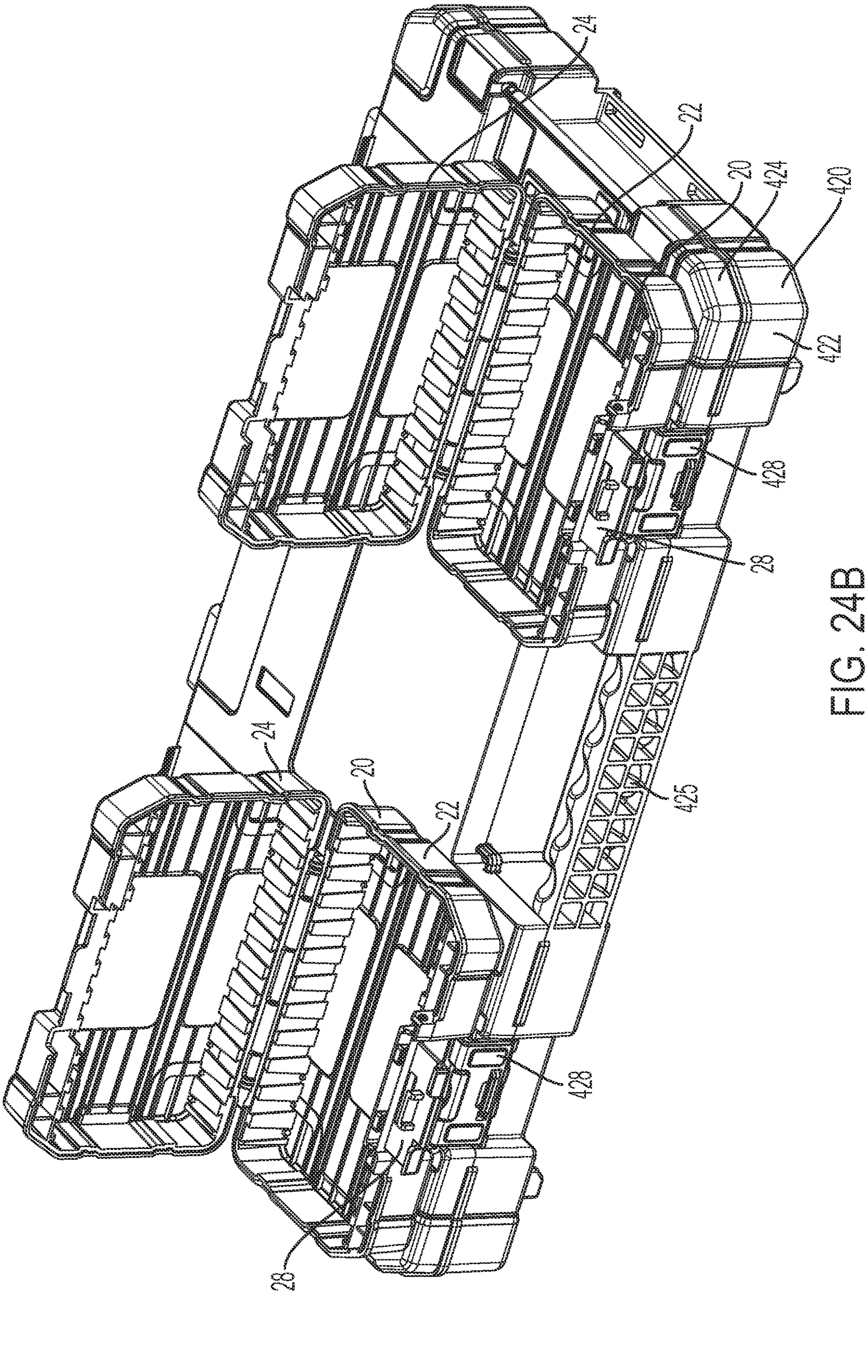

The large size container 420 may additionally include two first coupling interlocking members 434 (e.g., first lips) positioned in a middle portion of the container 420, opposite the latch 428, and two second coupling interlocking members 435 (e.g., second lips) positioned on a hinge side of the container 420, opposite the latch 428. As shown in FIGS. 24A-24B, one or more small size containers 20 may be stacked and locked to the large size container 420 with the first coupling interlocking members 434 of the large size container 420 engageable with the cooperating coupling interlocking members 36 (e.g., second lips) on the small size containers 20, and the second locking latch portion 431 of the large size container 420 engageable with the second locking members 40 on the small size containers 20. Thus, the latches 428 of the large size container 420 may be operable to lock two small size containers 20 to one large size container 420, while also locking the large size container 420 in the closed position. The covers 24 of the small size containers 20 can be fully opened, e.g., to at least 90 degrees, while they are locked to the large size container 420.

Figure 25A:
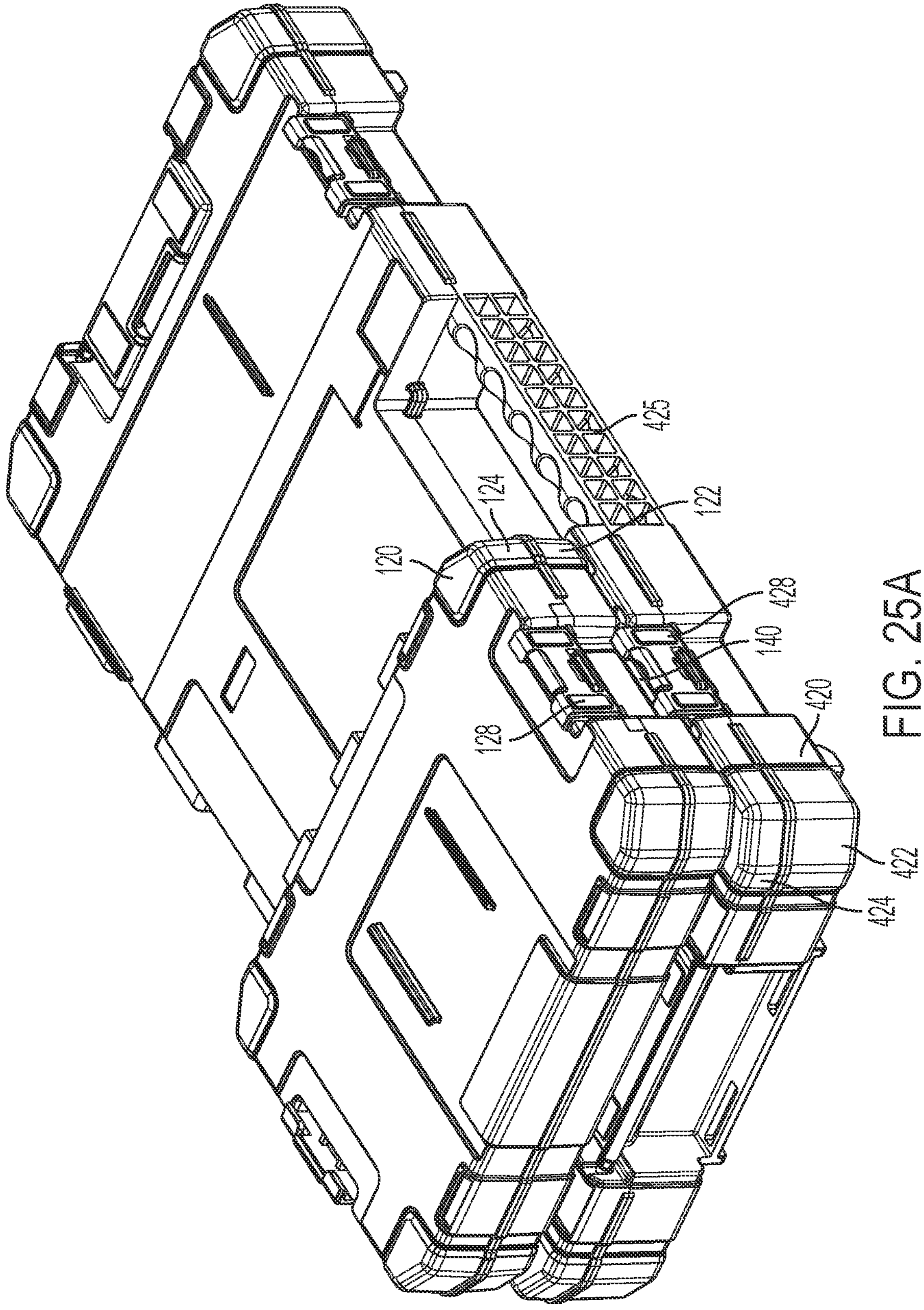
FIGS. 25A and 25B are top perspective views of two of the tool containers of FIGS. 19A-19C stacked and locked on one of the tool containers of FIGS. 22A-22B.
Figure 25B:
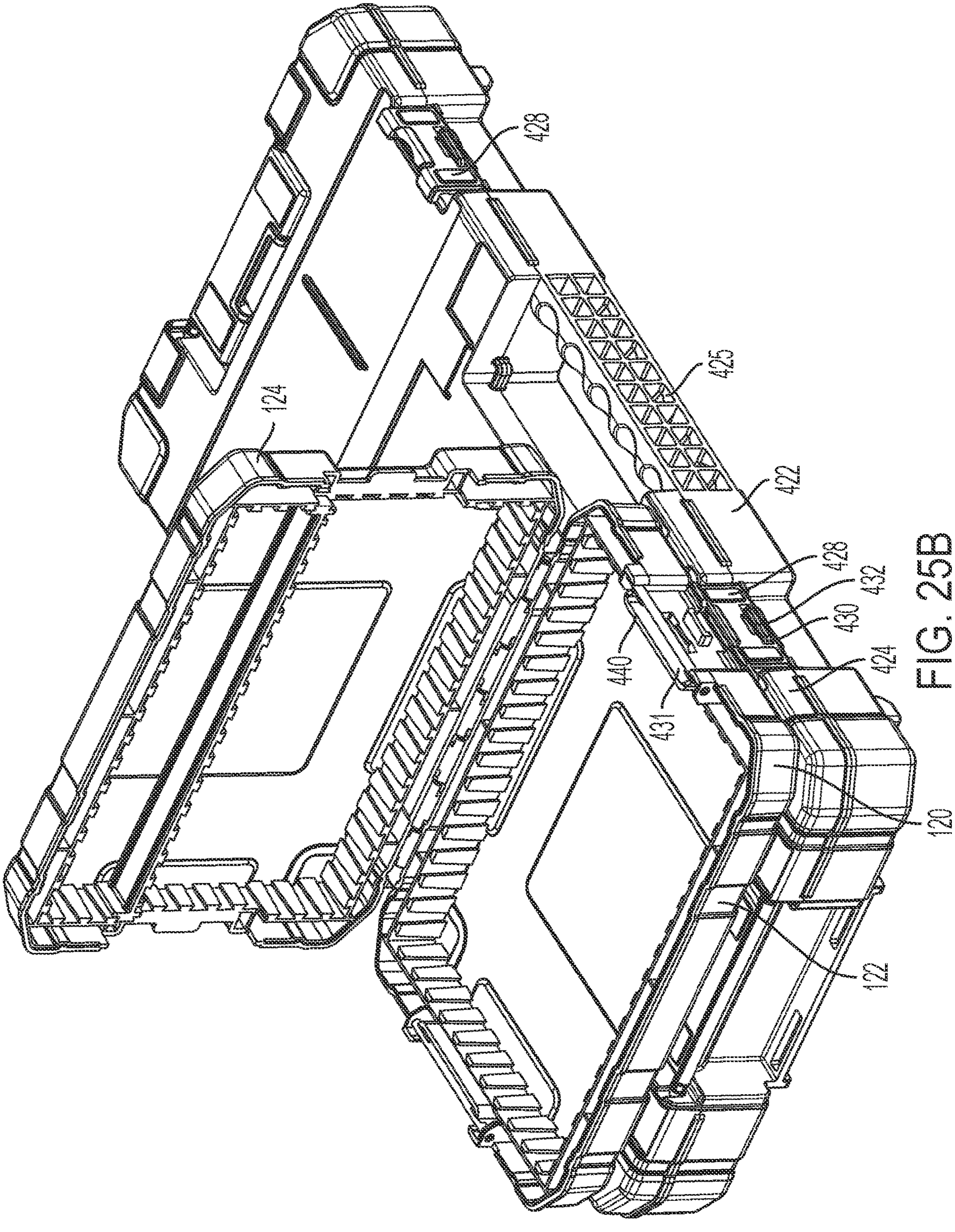

As shown in FIGS. 25A-25B, one or more medium size containers 120 may be stacked and locked to the large size container 420 with the second coupling interlocking members 435 of the large size container 420 engageable with the cooperating coupling interlocking members 136 (e.g., second lips) on the medium size containers 120, and the second locking latch portion 431 of the large size container 420 engageable with the second locking members 140 on the medium size containers 120. Thus, the latches 428 on the large size container 420 are operable to lock two medium size containers 120 and one large size container 420 together, while also locking the large size container 420 in the closed position. The covers 124 of the medium size containers 120 can be fully opened, e.g., to at least 90 degrees, while they are locked to the large size container 420.

Referring to FIGS. 22A-23B, each of the large size containers 420 may additionally include a pair of side latches 450 and a pair of side latch engaging structures 452 that have substantially the same structure and function to the latches 28 and latch engaging structures 31 on the container modules 70, 72, 74 disclosed in U.S. Pat. No. 8,657,307, which is incorporated by reference herein. Each side latch 450 includes an upper engaging member 454 (e.g., one or more protrusions) constructed and arranged to engage with the latch engaging structure 452' (e.g., one or more slots 458') of another large size container 420' so as to non-releasably connect one large size container 420 to another large size container 420' (as shown in FIGS. 23A-23B). In one embodiment, the upper engaging member 454 may be curved inwardly or at an angle relative to the rest of the latch 450, such that the upper engaging member 454 may be received in the latch engaging structure 452' during the releasable connection.

Figure 26A:
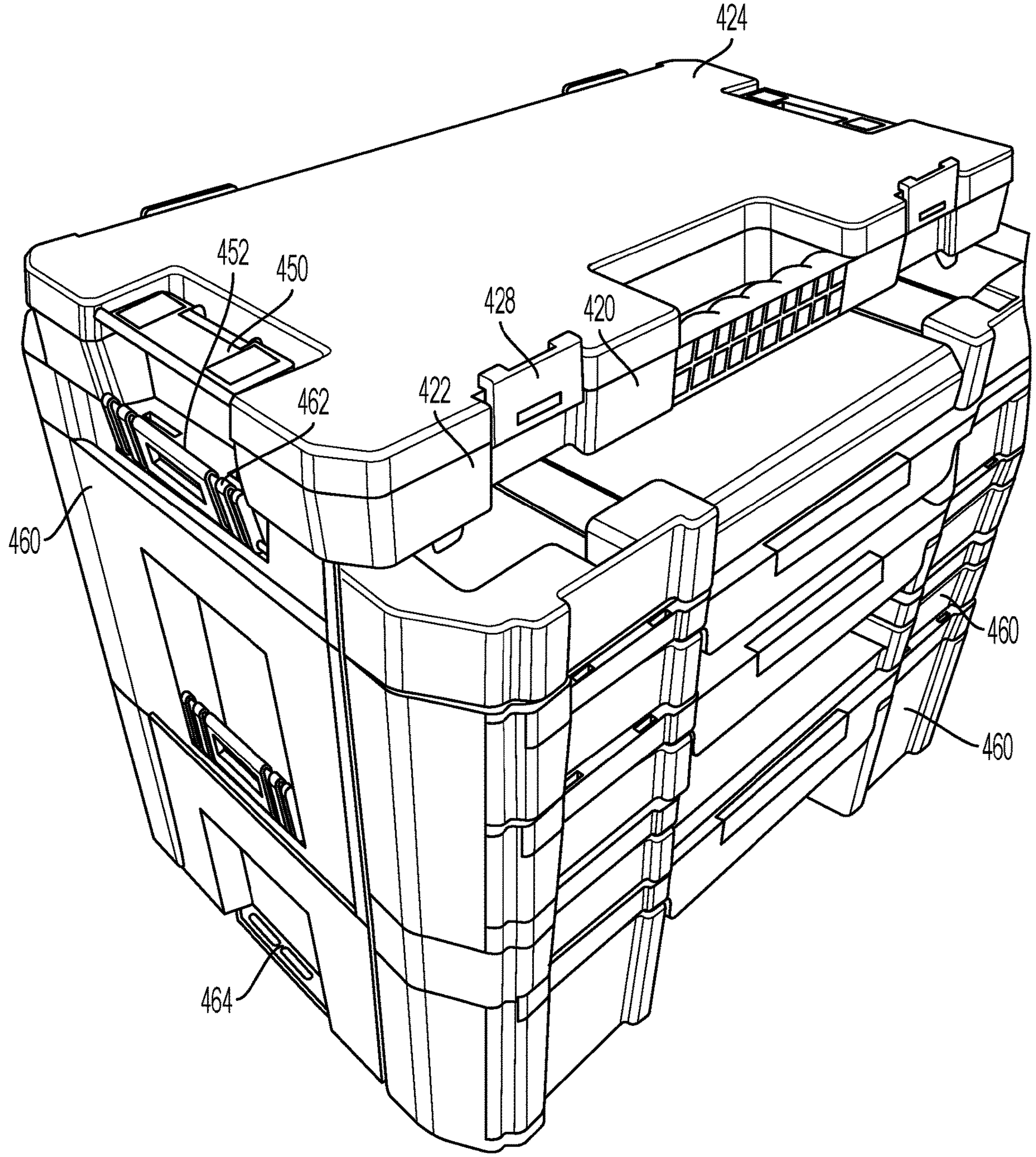
FIG. 26A is a perspective view of the tool container of FIGS. 22A-22B stacked and unlocked on container modules similar to the container modules disclosed in U.S. Pat. No. 8,657,307, which is incorporated by reference.
Figure 26B:
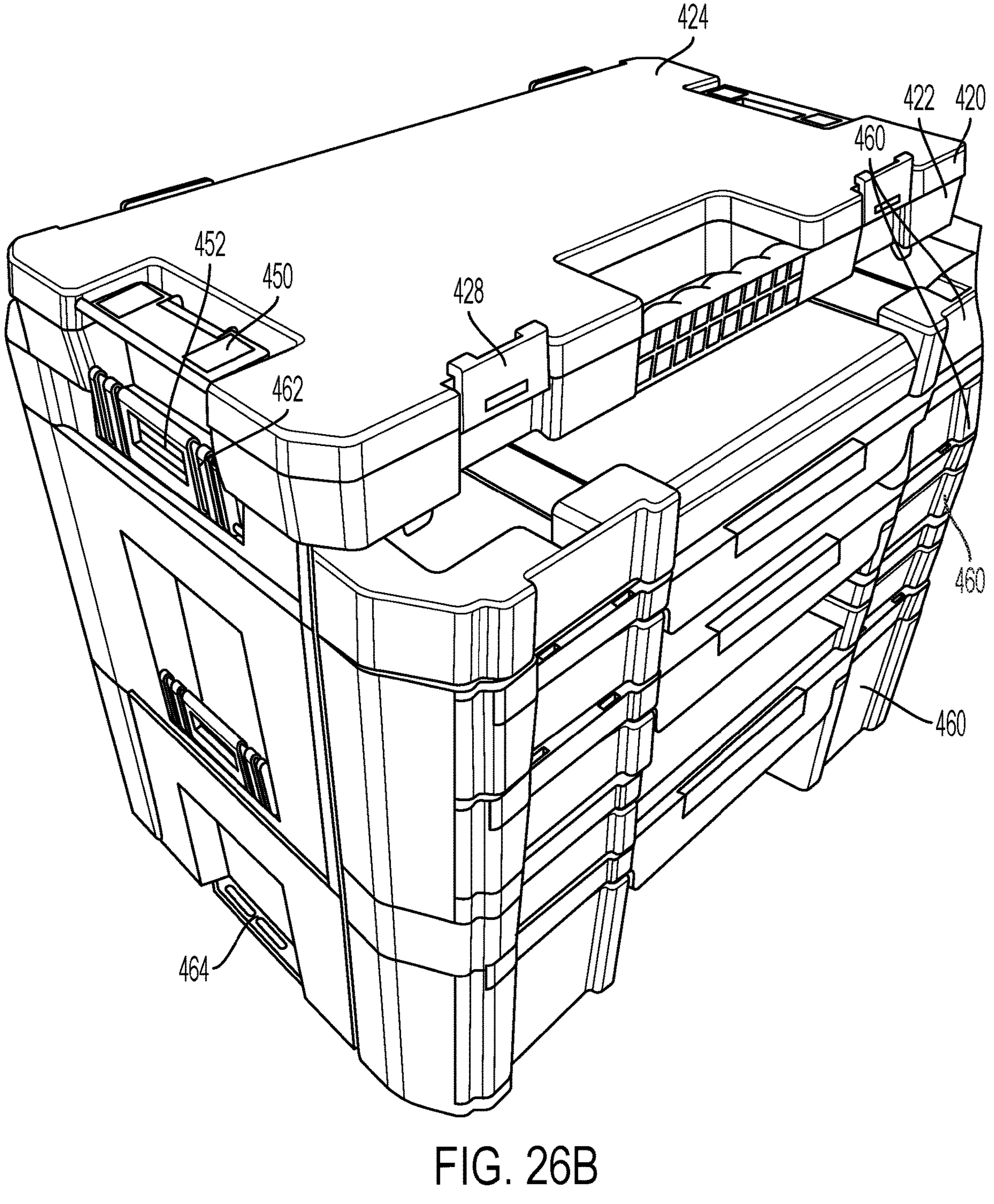
FIG. 26B is a perspective view of the tool container of FIGS. 22A-22B stacked and locked on the container modules of FIG. 26A.
Figure 27:
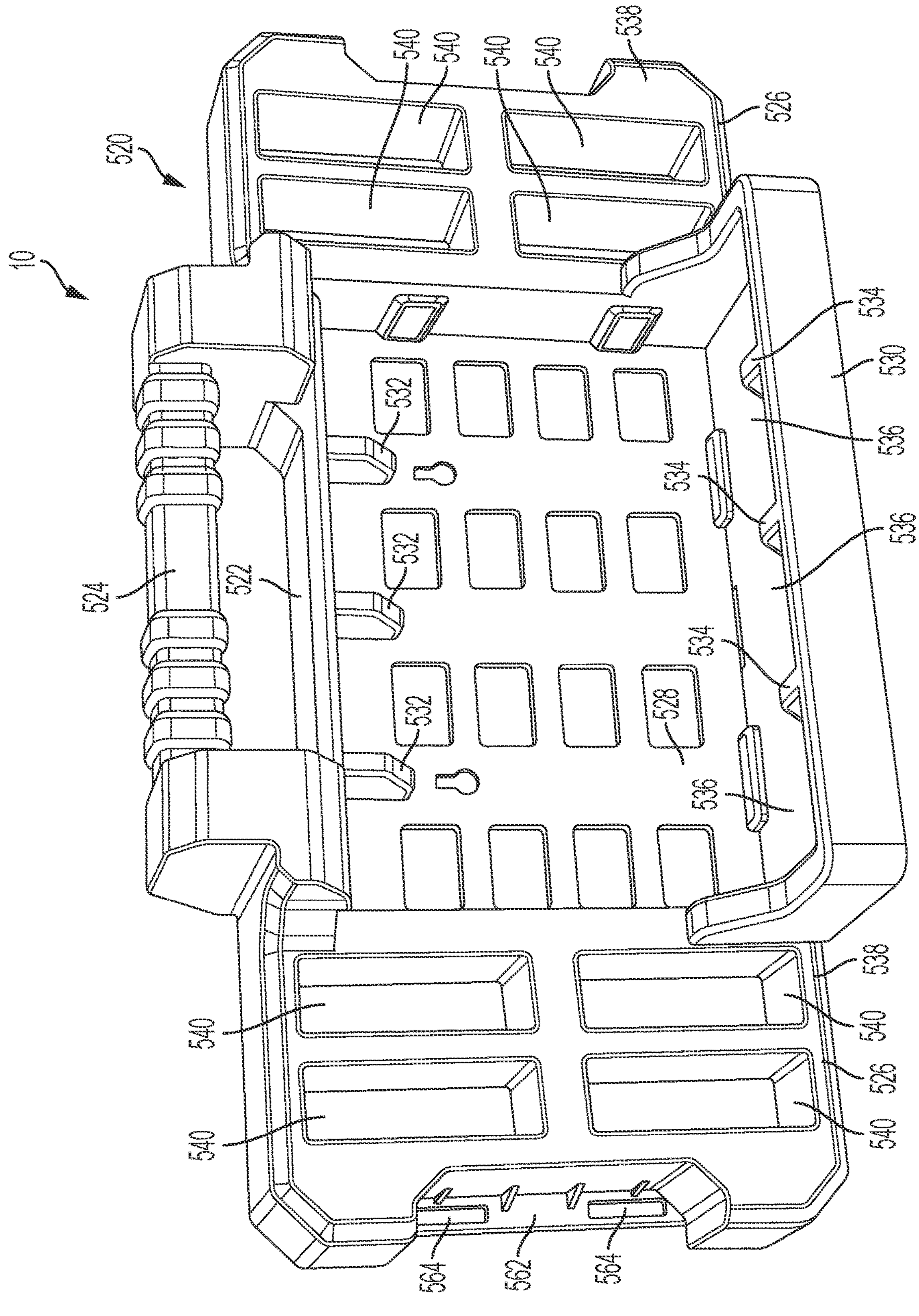
FIG. 27 is a front perspective view of an embodiment of a caddy.

Referring also to FIGS. 26A-26B, each side latch engaging structure 452 of the large size container 450 may alternatively be stacked on and engaged by a latch 462 of one or more container modules 460 similar to the container modules 70, 72, 74 in U.S. Pat. No. 8,657,307. Each latch 462 has substantially the same structure and function as side latch 450 on the large size container 420. Alternatively, one or more of the container modules 460 may be stacked on a large size container 420, with the side latch 450 engaging a latch engaging structure 464 (which is substantially the same as the latch engaging structure 452 of the large size container 420) on the container module 460. In one embodiment, each container module 460 may be a storage container module sold under the registered trademark TSTAK® by DEWALT Industrial Tool Co. of Towson, Maryland, and each side latch 450 and side latch engaging structure 452 may be substantially the same as the latches and latch engaging structures on the TSTAK® container modules.

Figure 28:
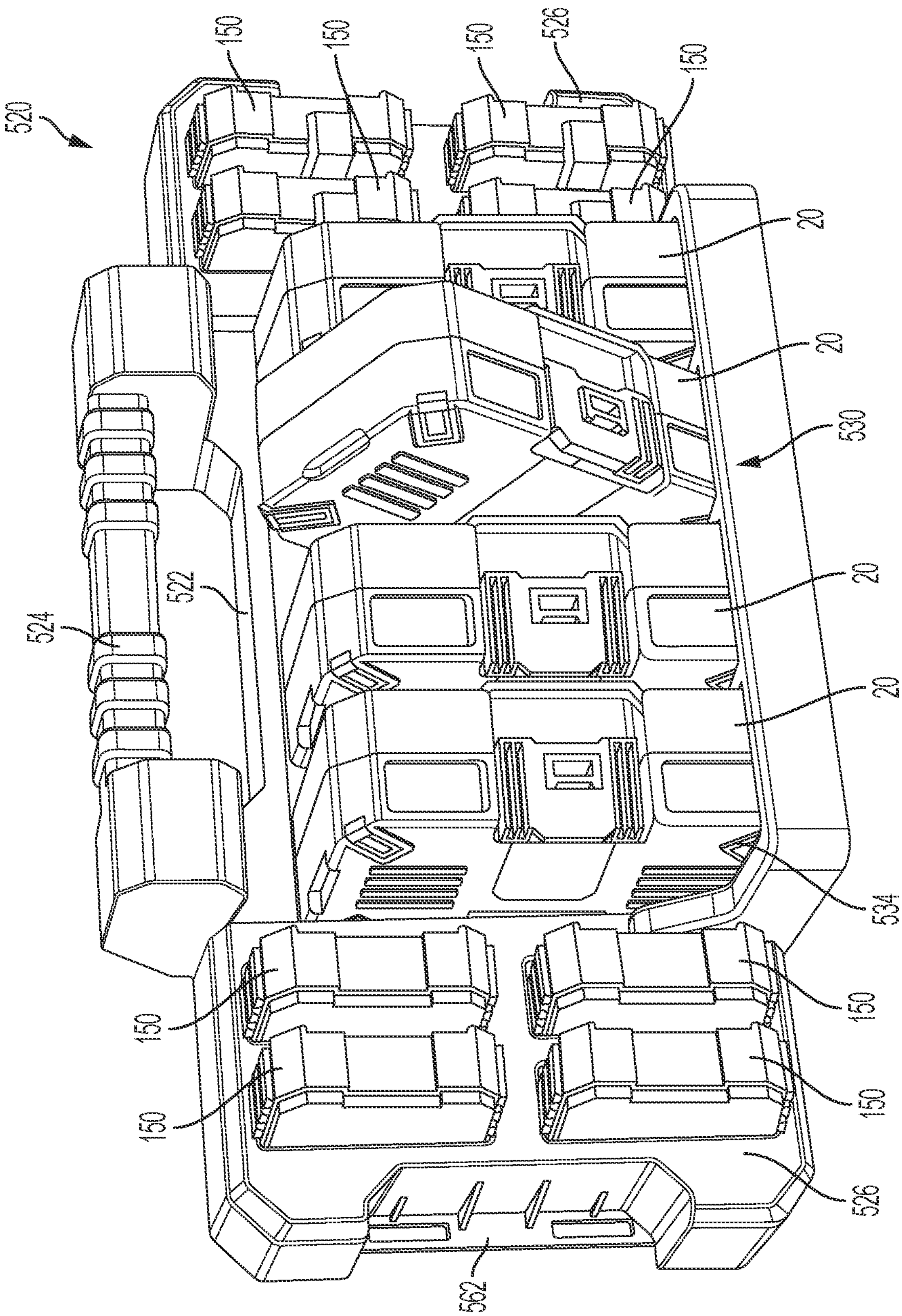
FIG. 28 is a front perspective view of the caddy of FIG. 27 holding a plurality of the small tool containers of FIG. 1 and bulk storage containers of FIG. 14.
Figure 29B:
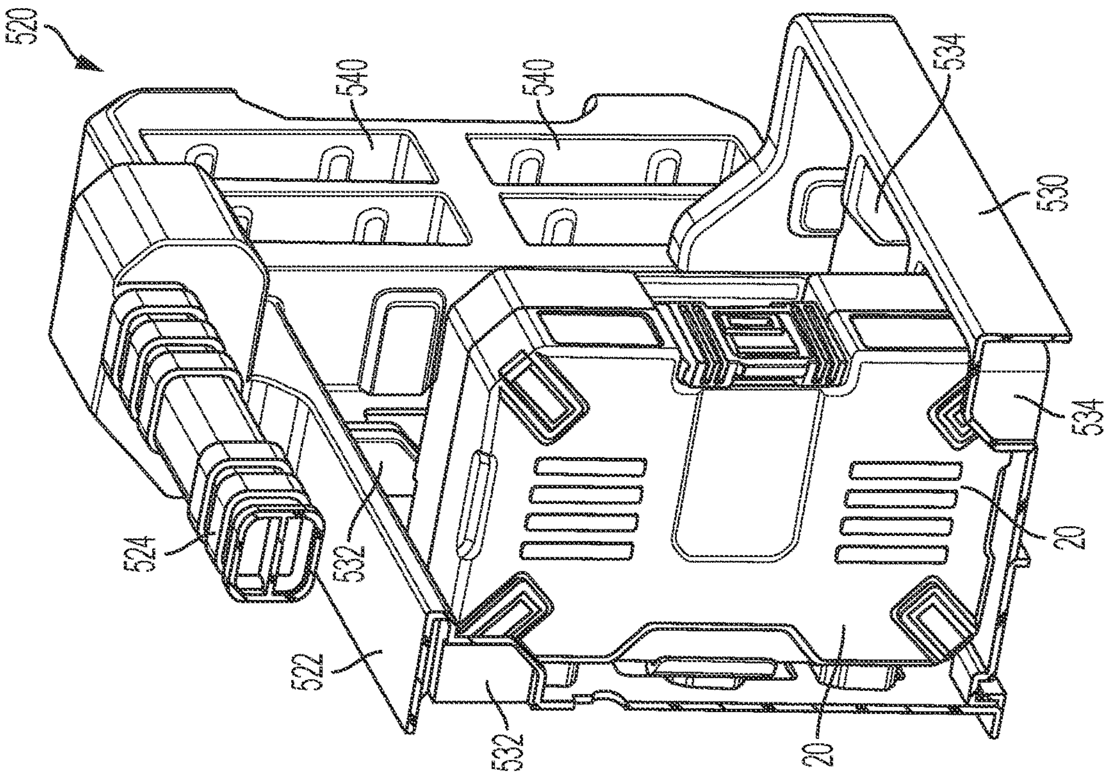
FIGS. 29A and 29B are cross-sectional views of the caddy of FIG. 27 showing insertion of one of the tool containers of FIG. 1.
Figure 29A:
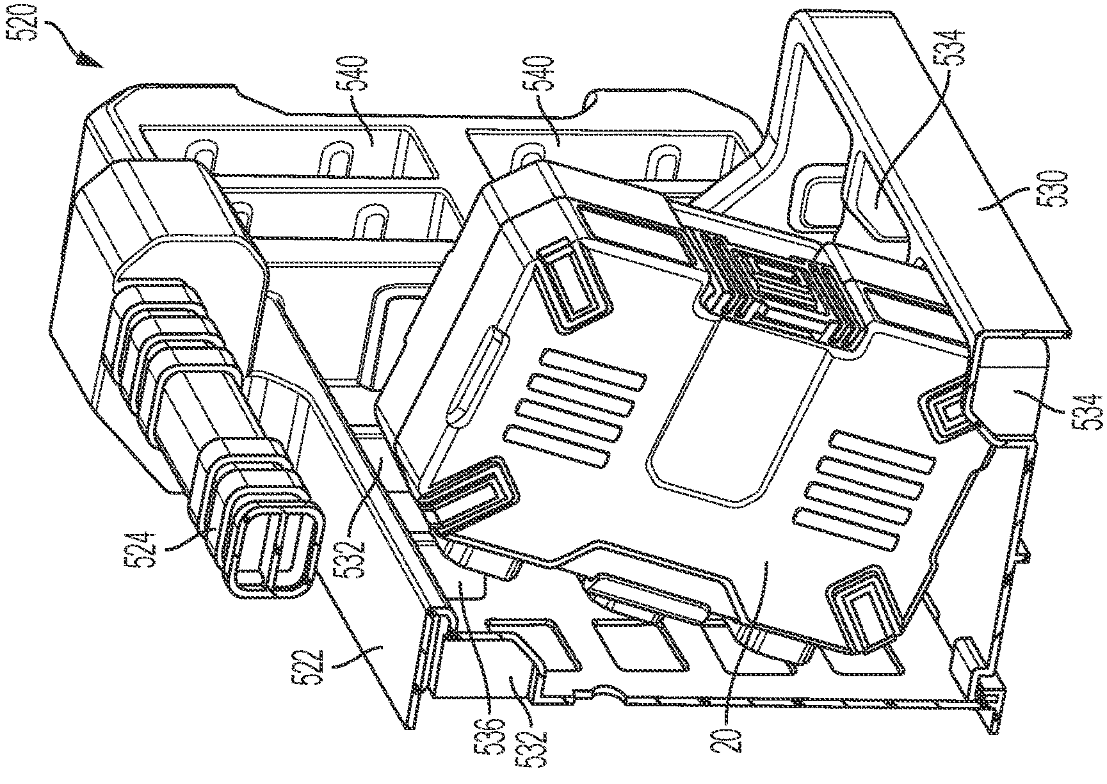
Figure 30B:
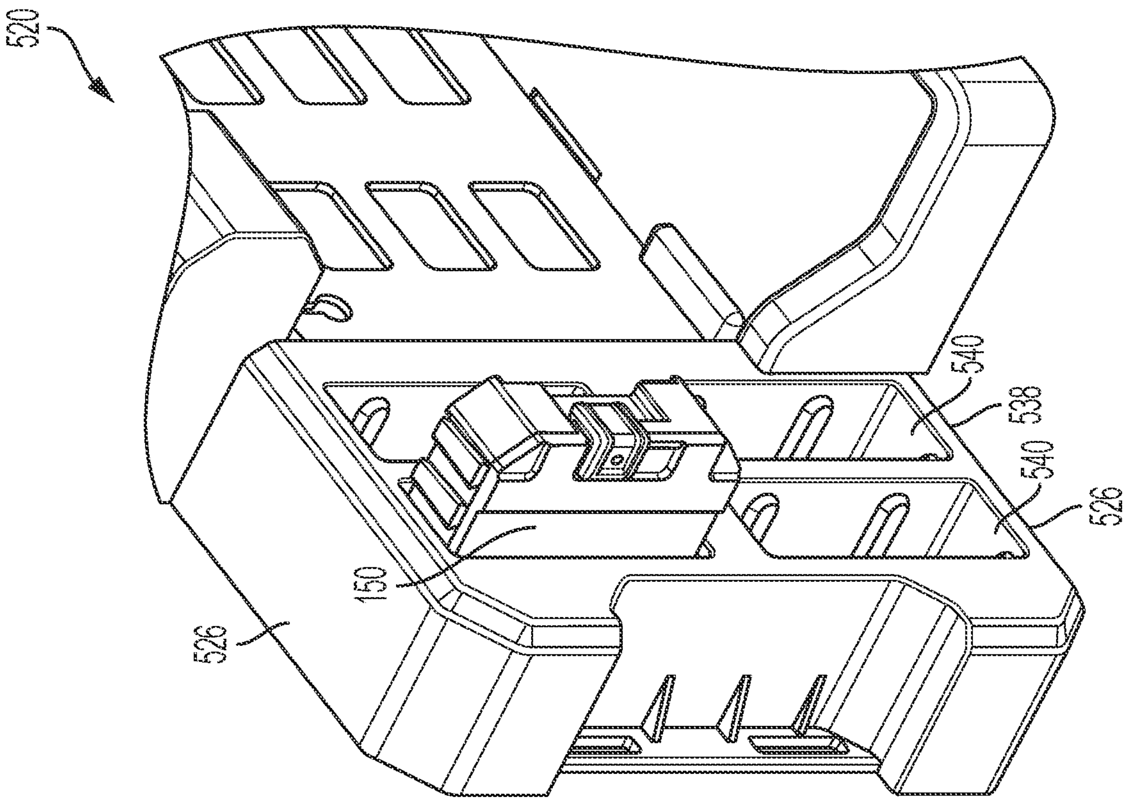
FIGS. 30A and 30B are cross-sectional views of the caddy of FIG. 27 showing insertion of one of the bulk storage containers of FIG. 14.
Figure 30A:
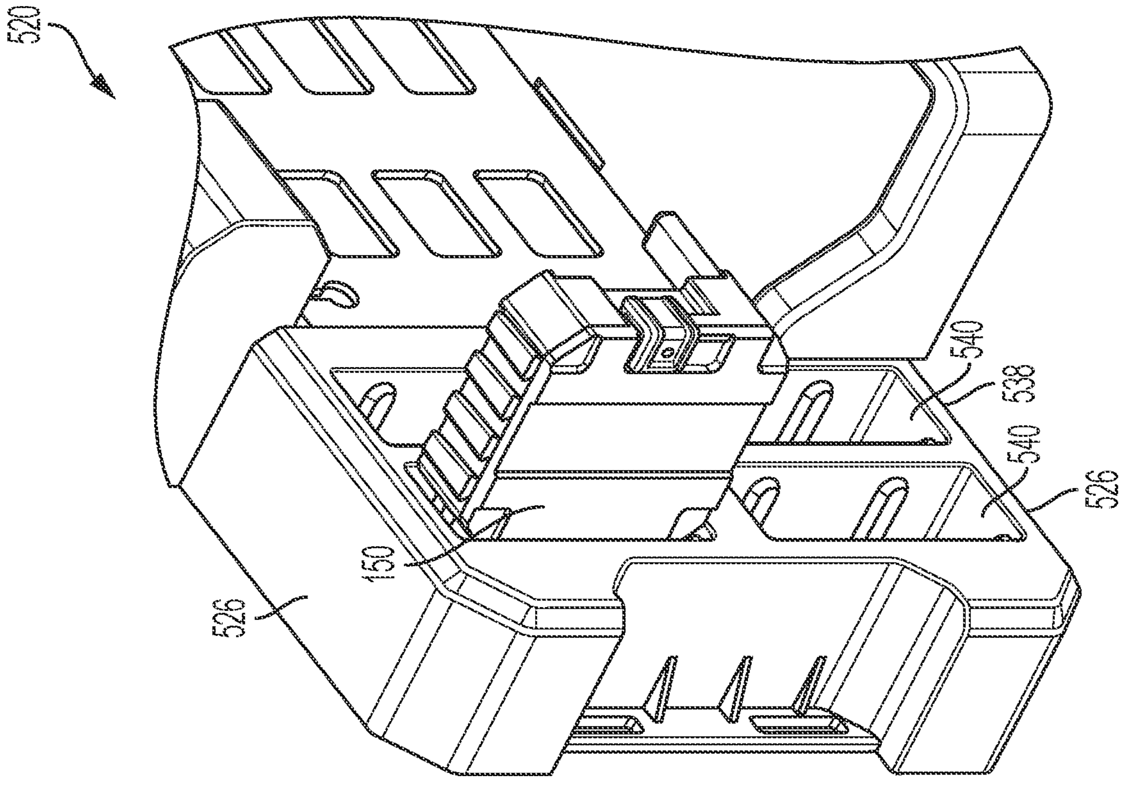
Figure 31:
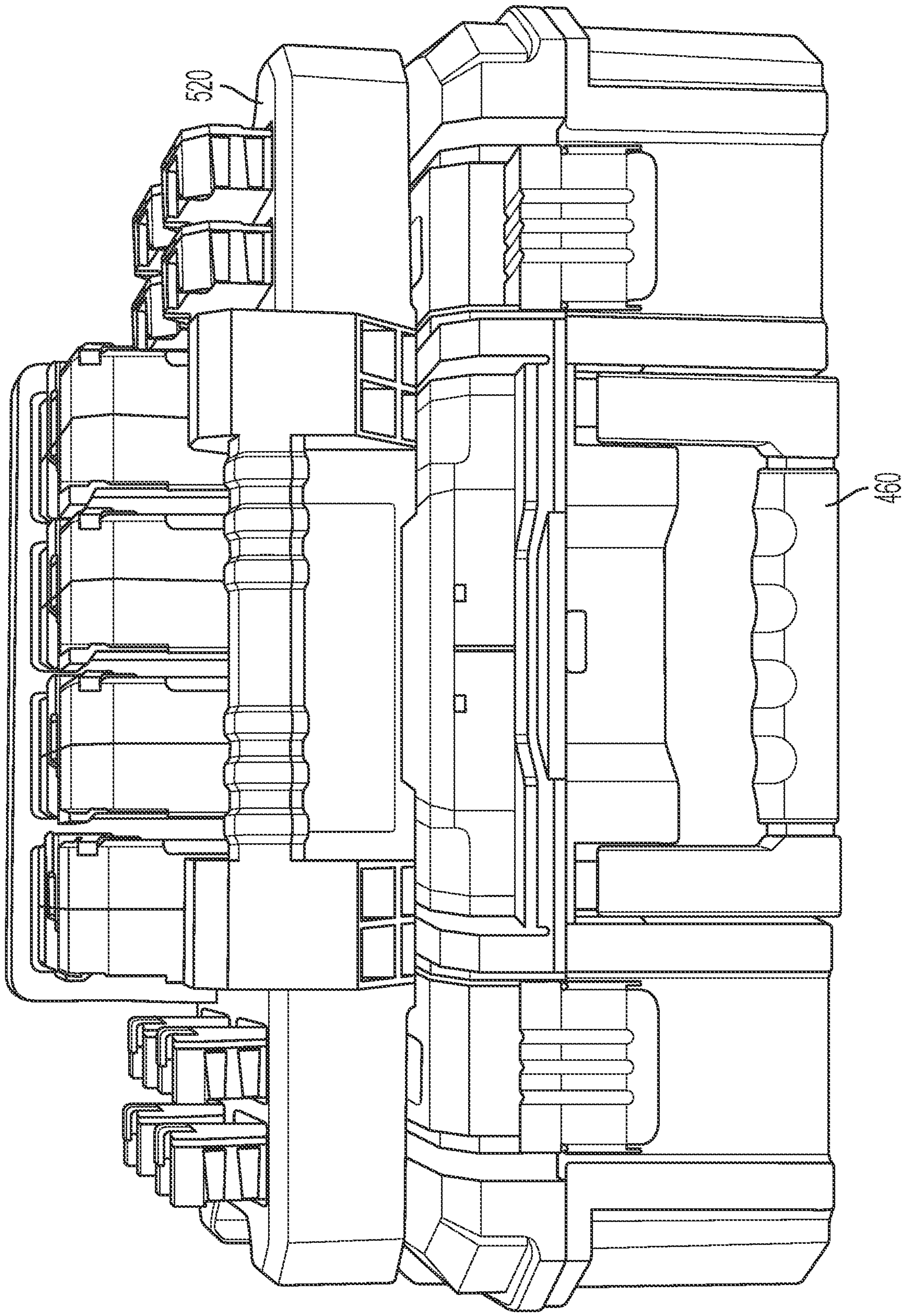
FIG. 31 is a front view of the caddy of FIG. 27 stacked and locked on one of the container modules of FIG. 26A.

Referring to FIGS. 27-32B, in another embodiment, the tool container system 10 may further include a storage caddy 520. The storage caddy 520 has a center base portion 522, a handle 524 coupled to the center base portion 522, and a pair of lateral wing portions 526. The center base portion 522 includes a bottom wall 528, a forwardly protruding base wall 530, and a plurality of partitions 532, 534 on the bottom wall 528 and the base wall 530. The partitions 532, 534 divide the bottom wall 528 and the base wall 530 to define a plurality of receptacles 536. Each receptacle 536 is sized and configured to receive and frictionally retain one of the small size containers 20 or 220 (as shown in FIGS. 28-29B). As illustrated in FIGS. 29A and 29B, a container 20 may be retained in a receptacle 536 by inserting one corner of the container 20 into the receptacle 536 and then pivoting the container 20 so that it is frictionally received in the receptacle 536. Each lateral wing portion 526 includes a side wall 538 defining a plurality of slots 540. Each slot is configured to receive and frictionally retain one of the small bulk storage containers 150 or 150' (as shown in FIGS. 30A-30B). As illustrated in FIGS. 30A and 30B, a small bulk storage container 150 may be retained in a slot 540 by sliding a portion of the small bulk storage container 150 into the slot.

Figure 32A:
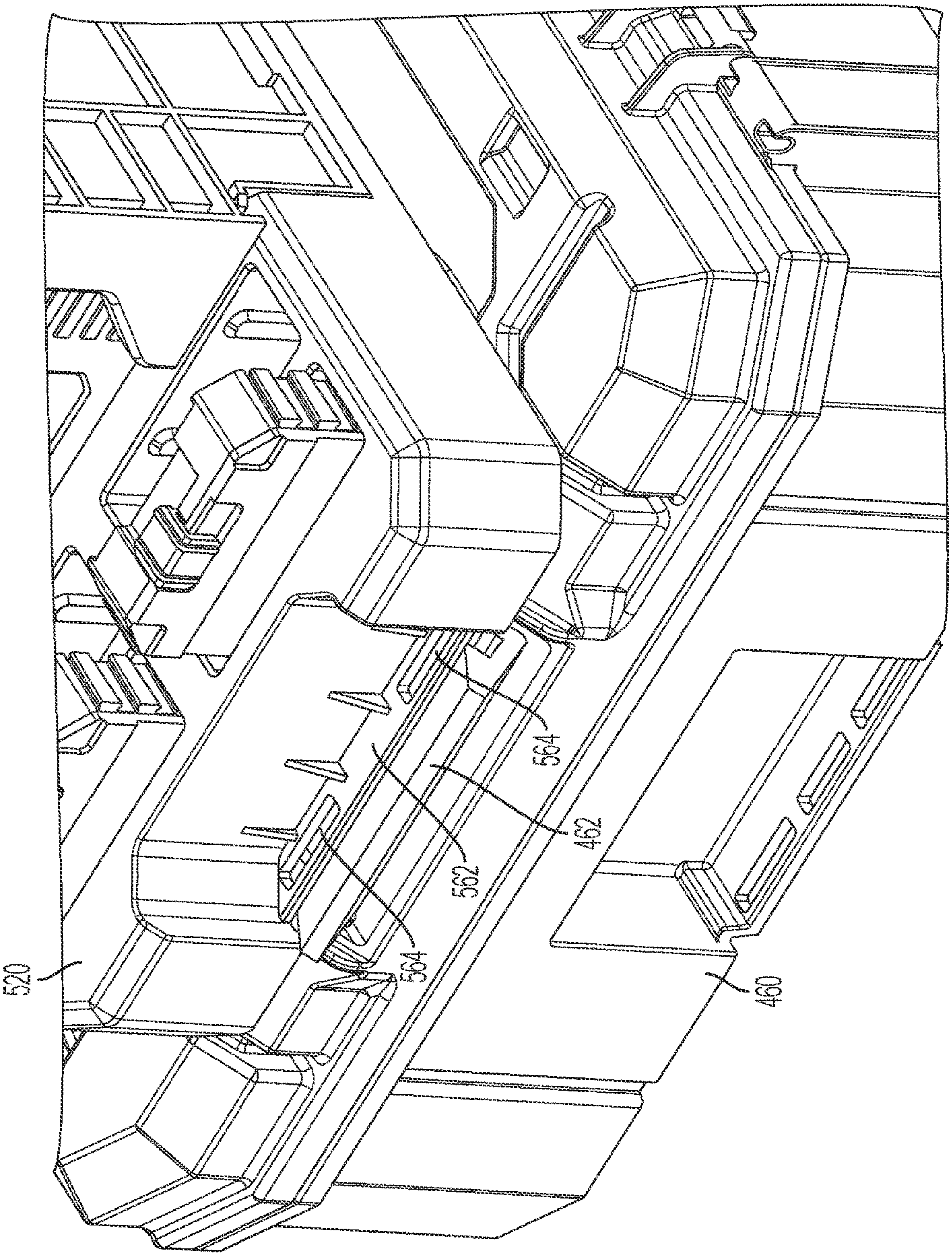
FIG. 32A is a close-up perspective view of the caddy of FIG. 27 and container module of FIG. 26A, stacked and unlocked.
Figure 32B:
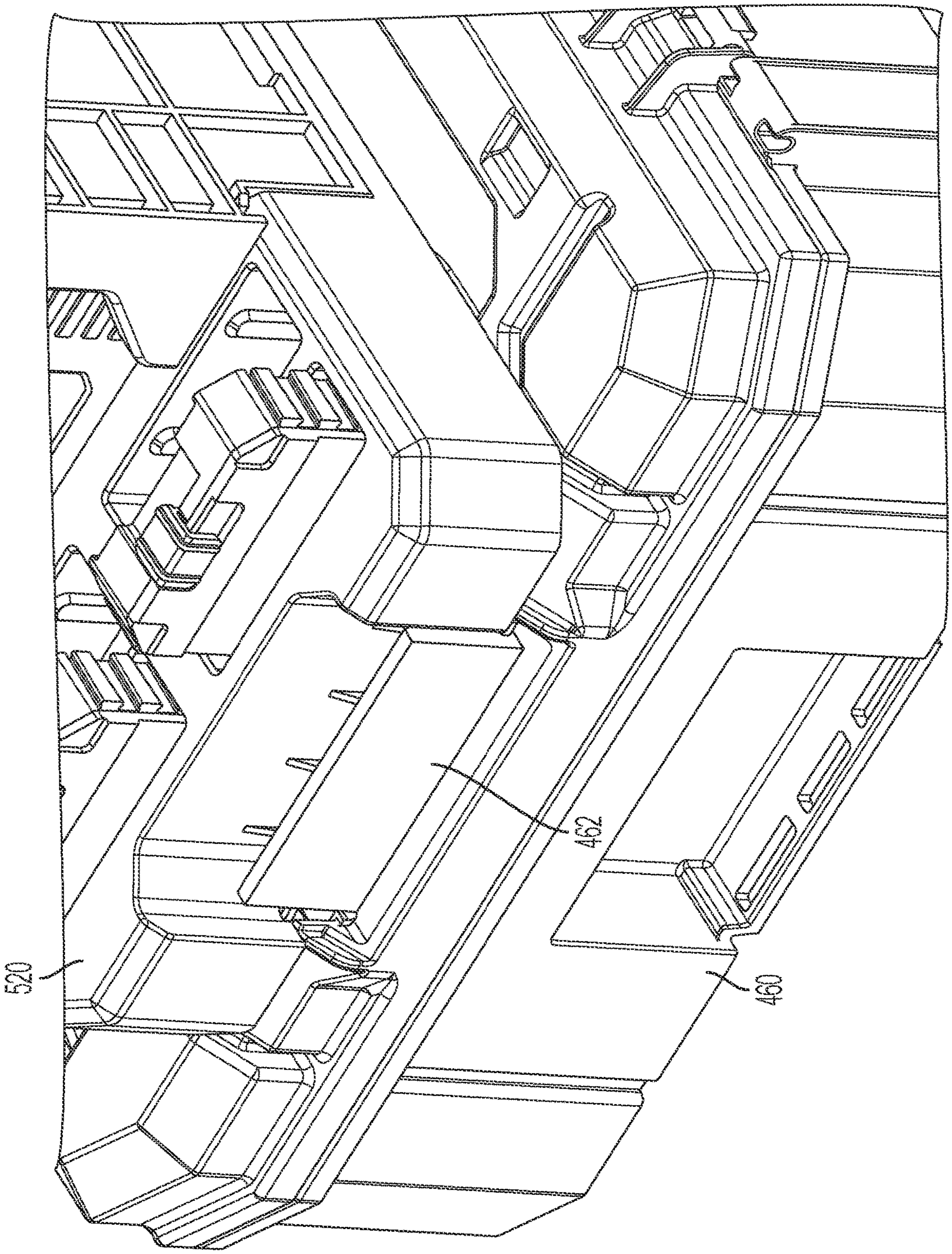
FIG. 32B is a close-up perspective view of the caddy of FIG. 27 and container modules of FIG. 26A, stacked and locked.

As shown in FIGS. 32A-32B, each lateral wing portion 526 also includes a side latch engaging structure 562, which is substantially the same as side latch engaging structure 452 of the large size container 420. The side latch engaging structure 562 (e.g., a protrusion with one or more slots 564) is constructed and arranged to be engaged by the side latch 450 of one of the large size containers 420 or the latch 462 of one of the container modules 460 when the caddy 520 is stacked on one of the large size containers 420 or one of the container modules 460. In one embodiment, each container module 460 may be a storage container module sold under the registered trademark TSTAK® by DEWALT Industrial Tool Co. of Towson, Maryland.

Figure 33A:
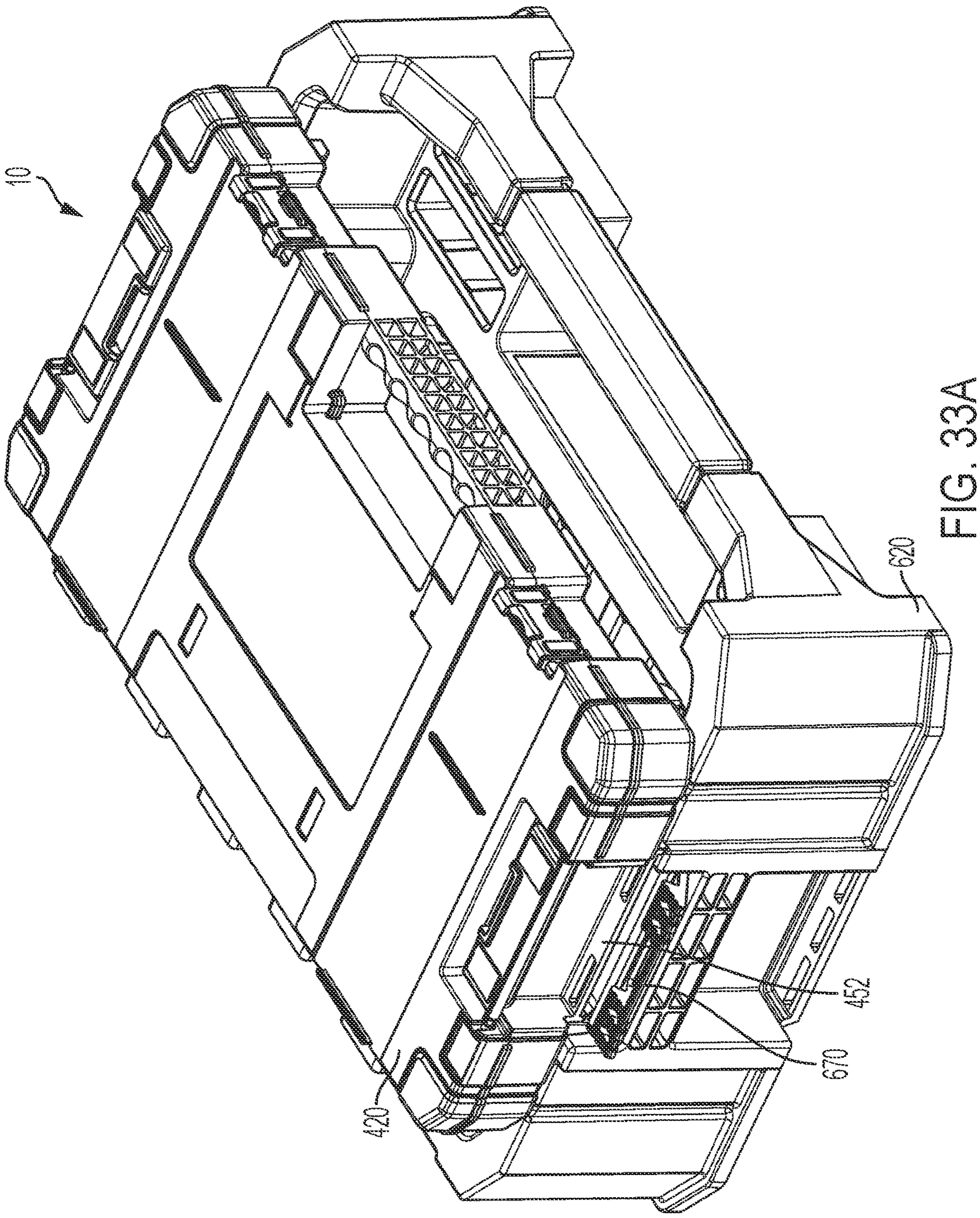
FIG. 33A is a perspective view of the tool container of FIGS. 18A-18B stacked on another embodiment of a caddy and unlocked.
Figure 33B:
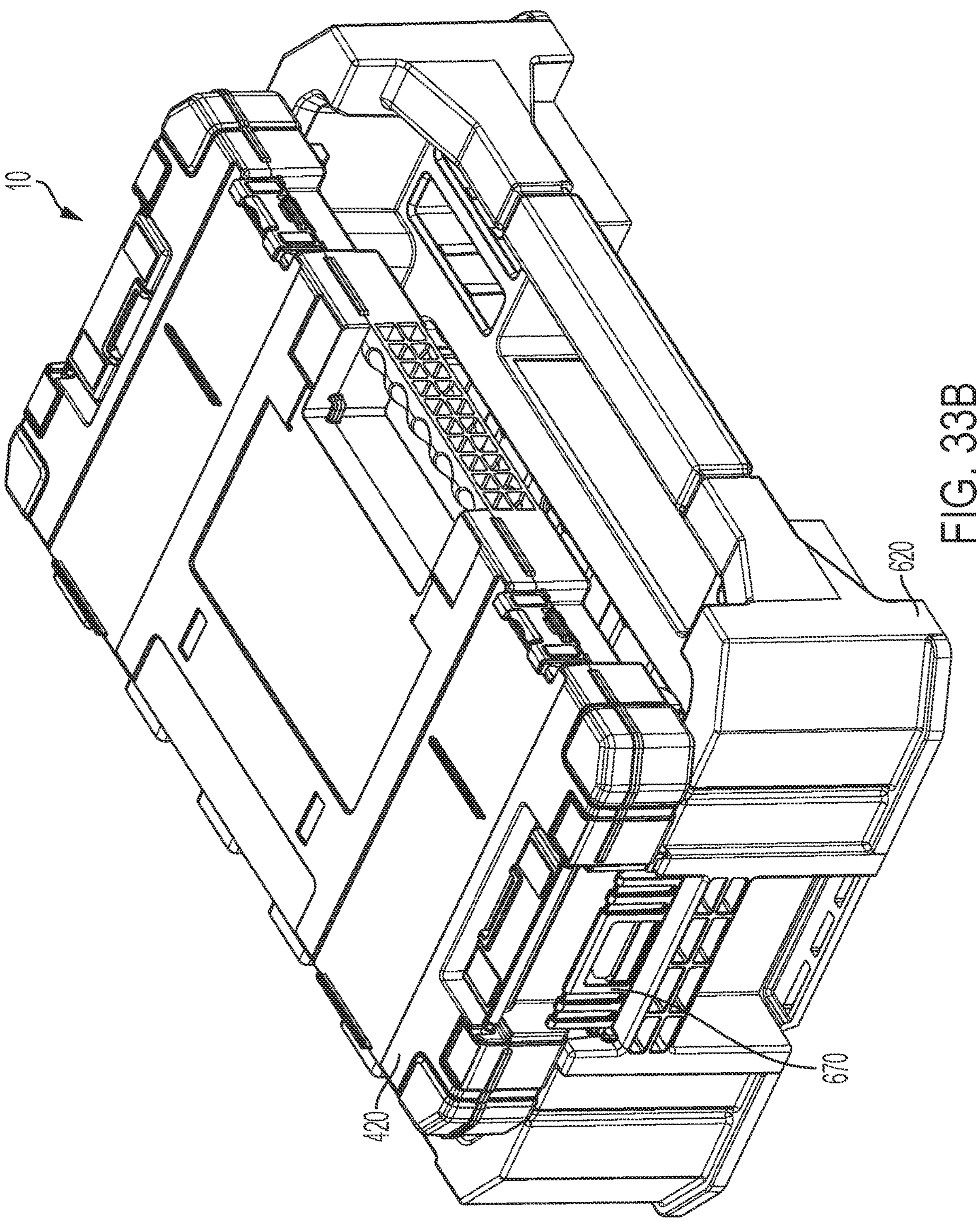
FIG. 33B is a perspective view of the tool container of FIGS. 18A-18B stacked on the caddy of FIG. 33A and locked.

Referring to FIGS. 33A-33B, in another embodiment, the tool container system 10 may include another embodiment of a caddy 620 that is substantially the same as the caddy 520 with the following differences. The caddy 620 may additionally include a side latch 670 on each of the lateral wing portions 626. Each side latch 670 may have substantially the same structure and function as the side latches 450 on the large size container 420 and as the latches 464 on the container modules 460 described above. This enables the side latches 670 to releasably engage and lock the latch engaging structure 452 on one of the large size containers 420 or the latch engaging structure 464 on one of the container modules 460 when one of the large size containers 420 or one of the container modules 460 is stacked on the caddy 620. As can be seen in FIGS. 33A-33B, one of the large size containers 420 or one of the container modules 460 with one or more small size containers 20, 220 and bulk storage containers 150, 150' received in the caddy 620.

Figure 34:
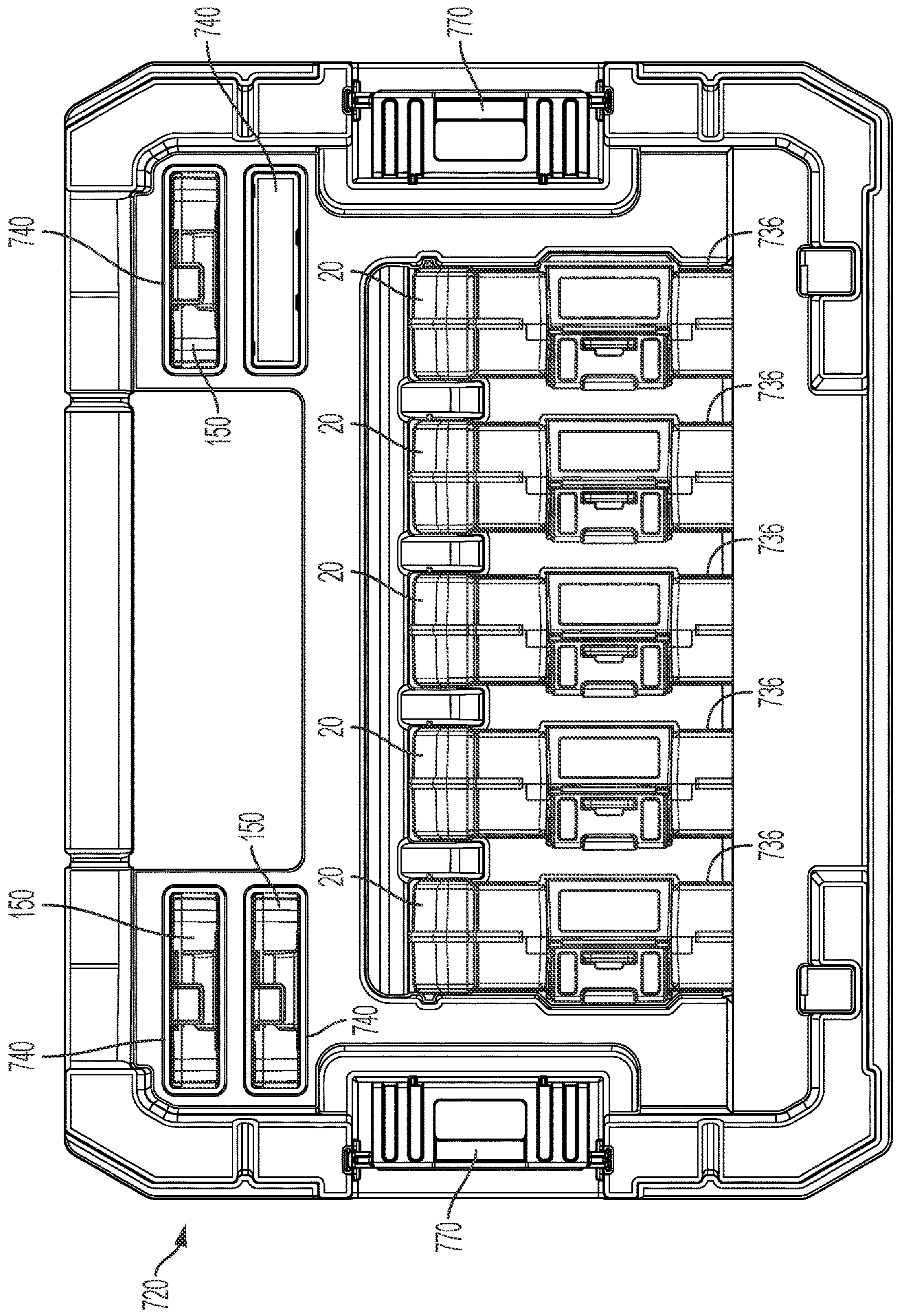
FIG. 34 is a front view of yet another embodiment of a caddy holding a plurality of the small tool containers of FIG. 1 and bulk storage containers of FIG. 14.

Referring to FIG. 34, in another embodiment, the tool container system 10 may include another embodiment of a caddy 720 that is similar to the caddy 620 with the following differences, The caddy 720 may include side latches 770 that are substantially the same as the side latches 670. The caddy 720 may also have a different arrangement of recesses 736 and slots 740 for receiving and frictionally retaining the small size containers 20, 220 and the bulk storage containers 150, 150', respectively. The caddy 720 may be stacked on or under and releasably locked to one of the large size containers 420 or one of the container modules 460 in substantially the same manner as the caddy 620.

It should be understood that the above-described embodiments of small size containers 20, 220, medium size containers 120, 320, large size containers 420, bulk storage containers 150, 150', container modules 460, and caddies 520, 620, 720 may be stacked and releasably locked to one another in a wide variety of arrangements, in addition to the arrangements illustrated in the drawings, as will be apparent to one of ordinary skill in the art. Thus, the tool container system 10 advantageously enables a user to stack and lock containers and caddies in a wide variety of arrangements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of the following claims.

What is claimed is:

1. A tool container storage system comprising:

a tool container caddy including a bottom wall, a peripheral wall extending upward from the bottom wall, a plurality of partition walls extending upward from the bottom wall inside the peripheral wall, and a plurality of generally rectangular receptacles defined by the partition walls, wherein the receptacles are configured to receive a plurality of generally rectangular first tool bit containers, each first tool bit container including a generally rectangular base, a generally rectangular cover pivotably coupled to the base, and a latch moveable between an unlocked position in which the cover is pivotable relative to the base between a closed position and an open position, and a locked position in which the cover is locked to the base in the closed position, wherein each of the first tool bit containers is releasably securable in one of the receptacles by inserting a corner of the first tool bit container into the receptacle and pivoting the tool bit container so that the first tool bit container is releasably secured in the receptacle.

2. The tool container storage system of claim 1, wherein the caddy further comprises a handle coupled to the peripheral wall.

3. The tool container storage system of claim 1, wherein the bottom wall further comprises one or more wing portions extending laterally outward from the peripheral wall, each of the one or more wing portions including a plurality of generally rectangular slots configured to releasably secure a plurality of second tool bit containers that are smaller than the first tool bit containers.

4. The tool container storage system of claim 3, wherein each of the second tool bit containers is releasably securable in one of the slots by friction when sliding the second tool bit container at least partially into the slot.

5. The tool container storage system of claim 1, wherein the caddy further comprises a pair of side latch engaging structures on opposed lateral sides of the bottom wall, the side latch engaging structures configured to receive pivotal latches on a large tool container having approximately the same width as the caddy, on top of which the caddy is configured to be stacked.

6. The tool container storage system of claim 5, wherein each side latch engaging structure comprises a protrusion with one or more slots configured to receive the pivotal latch.

7. The tool container storage system of claim 1, wherein the caddy further comprises a pair of pivotable side latches on opposed lateral sides of the bottom wall, the side latches configured to engage latch engaging structures on a large tool container having approximately the same width as the caddy, on top of which the caddy is configured to be stacked.

8. A tool container storage system comprising:

a tool container caddy including a bottom wall, a peripheral wall extending upward from the bottom wall, a plurality of partition walls extending upward from the bottom wall inside the peripheral wall, and a plurality of generally rectangular receptacles defined by the partition walls; and a plurality of generally rectangular first tool bit containers, each first tool bit container including a generally rectangular base, a generally rectangular cover pivotably coupled to the base, and a latch moveable between an unlocked position in which the cover is pivotable relative to the base between a closed position and an open position, and a locked position in which the cover is locked to the base in the closed position, wherein the receptacles are configured so that each of the first tool bit containers is releasably securable in each of the receptacles by inserting a corner of the first tool bit container into one of the receptacles and pivoting the tool bit container so that the first tool bit container is releasably secured in the one of the receptacles.

9. The tool container storage system of claim 8, wherein the caddy further comprises a handle coupled to the peripheral wall.

10. The tool container storage system of claim 8, further comprising a plurality of second tool bit containers that are smaller than the first tool bit containers.

11. The tool container storage system of claim 10, wherein the bottom wall of the caddy further comprises one or more wing portions extending laterally outward from the peripheral wall, each of the one or more wing portions including a plurality of generally rectangular slots configured to releasably secure the second tool bit containers.

12. The tool container storage system of claim 11, wherein each of the second tool bit containers is releasably securable in one of the slots by friction when sliding the second tool bit container at least partially into the slot.

13. The tool container storage system of claim 8, wherein the caddy further comprises a pair of side latch engaging structures on opposed lateral sides of the bottom wall, the side latch engaging structures configured to receive pivotal latches on a large tool container having approximately the same width as the caddy, on top of which the caddy is configured to be stacked.

14. The tool container storage system of claim 13, wherein each side latch engaging structure comprises a protrusion with one or more slots configured to receive one of the pivotal latches.

15. The tool container storage caddy of claim 8, wherein the caddy further comprises a pair of pivotable side latches on opposed lateral sides of the bottom wall, the side latches configured to engage latch engaging structures on a large tool container having approximately the same width as the caddy, on top of which the caddy is configured to be stacked.

16. A tool container storage system comprising:

a tool container caddy including a bottom wall, a peripheral wall extending upward from the bottom wall, a plurality of partition walls extending upward from the bottom wall inside the peripheral wall, a plurality of generally rectangular receptacles defined by the partition walls;

a generally rectangular first tool bit container that is configured to be received in at least one of the generally rectangular receptacles; and a large tool container having approximately the same width as the tool container caddy on top of which the caddy is configured to be stacked, wherein the first tool bit container is releasably securable in at least one of the receptacles by inserting a corner of the first tool bit container into one of the receptacles and pivoting the tool bit container so that the first tool bit container is releasably secured in the one of the receptacles, and wherein the tool container caddy is releasably securable to the large tool container by a side latch on one of the tool container caddy and the large tool container and a latch engaging structure on the other of the tool container caddy and the large tool container, the latch moveable between a first position in which the latch is disengaged from the latch engaging structure and a second position in which the latch is engaged with the latch engaging structure.

17. The tool container storage system of claim 16, wherein the first tool bit container includes a generally rectangular base, a generally rectangular cover pivotably coupled to the base, and a latch moveable between an unlocked position in which the cover is pivotable relative to the base between a closed position and an open position, and a locked position in which the cover is locked to the base in the closed position.

18. The tool container storage system of claim 16, further comprising one or more wing portions extending laterally outward from the peripheral wall of the caddy, each of the one or more wing portions including a plurality of generally rectangular slots that are smaller than the receptacles; and a second tool bit container that is smaller than the first tool bit container and that is configured to be releasably securable in at least one of the slots.

19. The tool container storage system of claim 18, wherein the second tool bit container is releasably securable inside the first tool bit container.

20. The tool container storage system of claim 19, wherein an interior of the first tool bit container includes first recesses or protrusions and an exterior of the second tool bit container includes second recesses or protrusions that are configured to releasable engage the first recesses or protrusions to releasable secure the second tool bit container inside the first tool bit container.

* * * * *